(12) United States Patent
Hawken

(10) Patent No.: US 12,508,521 B1
(45) Date of Patent: Dec. 30, 2025

(54) EXTRACTOR APPARATUS

(71) Applicant: Jot Labs, LLC, Boulder, CO (US)

(72) Inventor: Palo Hawken, Boulder, CO (US)

(73) Assignee: Jot Labs, LLC, Boulder, CO (US)

( * ) Notice: Subject to any disclaimer, the term of this patent is extended or adjusted under 35 U.S.C. 154(b) by 812 days.

(21) Appl. No.: 17/650,841

(22) Filed: Feb. 11, 2022

Related U.S. Application Data

(63) Continuation-in-part of application No. 17/086,396, filed on Oct. 31, 2020, now Pat. No. 12,053,000.

(60) Provisional application No. 63/148,607, filed on Feb. 11, 2021.

(51) Int. Cl.
 *A23F 5/26* (2006.01)
 *B01D 11/02* (2006.01)

(52) U.S. Cl.
 CPC .......... *B01D 11/0242* (2013.01); *A23F 5/262* (2013.01); *B01D 11/028* (2013.01); *B01D 11/0219* (2013.01)

(58) Field of Classification Search
 CPC ... A23F 5/262; B01D 11/0242; B01D 11/028; B01D 11/0219
 See application file for complete search history.

(56) References Cited

U.S. PATENT DOCUMENTS

| | | |
|---|---|---|
| 2,077,564 A | 4/1937 | Herman et al. |
| 2,145,395 A | 1/1939 | Horvath |
| 2,236,059 A | 3/1941 | Herman et al. |
| 2,599,682 A | 6/1952 | Wirtel et al. |
| 2,888,349 A | 5/1959 | Morrow et al. |
| 3,119,695 A | 1/1964 | Kahan |
| 3,164,474 A | 1/1965 | Gianturco et al. |
| 3,361,571 A | 1/1968 | Lee et al. |
| 3,361,572 A | 1/1968 | Lee et al. |
| 3,458,320 A | 7/1969 | Niven, Jr. et al. |

(Continued)

FOREIGN PATENT DOCUMENTS

| | | |
|---|---|---|
| WO | 9212644 A1 | 8/1992 |
| WO | 9808584 A1 | 3/1998 |

(Continued)

*Primary Examiner* — Reginald Alexander
(74) *Attorney, Agent, or Firm* — Sean Casey

(57) ABSTRACT

An extractor apparatus that incorporates an autoclave that defines an interior, which extends along a longitudinal axis between opposite media inlet and discharge ports. Also included is a feed assembly that is coupled to the inlet port to supply media during operation to the interior, which establishes a media bed movable about the longitudinal axis through the interior to the discharge port. Further incorporated is a solvent supply that is coupled to the autoclave proximate the discharge port to establish during operation pressurized solvent cross flow that is directionally opposite the direction of movement of movable bed. An extract port is also included, which is coupled to the autoclave proximate the inlet port to extract cross-flowed solvent from the movable media bed during operation. Further included is a capture assembly that is sealingly coupled to the discharge port and which during operation, captures spent media, and is movable to discharge the spent media. The capture assembly may also extract residual solvent from the spent media, which may be communicated to the interior between the inlet and discharge ports.

18 Claims, 32 Drawing Sheets

(56) References Cited

U.S. PATENT DOCUMENTS

| | | | |
|---|---|---|---|
| 3,482,989 | A | 12/1969 | Austin et al. |
| 3,607,280 | A | 9/1971 | Durchholz |
| 3,655,398 | A | 4/1972 | Pitchon et al. |
| 3,700,463 | A | 10/1972 | Bolt et al. |
| 3,720,518 | A | 3/1973 | Galdo et al. |
| 3,782,965 | A | 1/1974 | Colton et al. |
| 3,788,860 | A | 1/1974 | Mahlmann et al. |
| 3,796,805 | A | 3/1974 | Lemonnier et al. |
| 3,798,341 | A | 3/1974 | Adler et al. |
| 3,830,940 | A | 8/1974 | Sivetz et al. |
| 4,048,345 | A | 9/1977 | Katz |
| 4,158,067 | A | 6/1979 | Wouda |
| 4,160,042 | A | 7/1979 | Farr et al. |
| 4,160,647 | A * | 7/1979 | Sendov .............. B01D 11/0242 422/106 |
| 4,474,821 | A | 10/1984 | Morrison, Jr. et al. |
| 5,043,178 | A | 8/1991 | Gottesman et al. |
| 5,558,006 | A | 9/1996 | Kuboyama |
| 5,572,923 | A | 11/1996 | Kuboyama |
| 5,840,360 | A | 11/1998 | Larsen |
| 5,878,654 | A | 3/1999 | Kobayashi et al. |
| 5,896,805 | A | 4/1999 | Katou et al. |
| 5,932,101 | A | 8/1999 | Kanel et al. |
| 5,997,929 | A | 12/1999 | Heeb et al. |
| 6,158,328 | A | 12/2000 | Cai |
| 6,165,536 | A | 12/2000 | Heeb et al. |
| 6,202,541 | B1 | 3/2001 | Cai |
| 6,203,837 | B1 | 3/2001 | Kalenian |
| 6,548,094 | B2 | 4/2003 | Kalenian |
| 6,808,731 | B1 | 10/2004 | Gutwein et al. |
| 6,887,506 | B2 | 5/2005 | Kalenian |
| 6,979,472 | B2 | 12/2005 | Apiscopa et al. |
| 7,419,692 | B1 | 9/2008 | Kalenian |
| 7,771,764 | B2 | 8/2010 | Honda et al. |
| 7,833,561 | B2 | 11/2010 | Dria et al. |
| 7,875,304 | B2 | 1/2011 | Kalenian |
| 8,734,884 | B2 | 5/2014 | Matsui |
| 9,480,359 | B1 | 11/2016 | Kalenian |
| 9,549,635 | B1 | 1/2017 | Kalenian |
| 9,801,396 | B2 | 10/2017 | Park |
| 9,855,516 | B2 | 1/2018 | Corey |
| 9,961,917 | B2 | 5/2018 | Van Schyndel et al. |
| 10,051,989 | B2 | 8/2018 | Nakao et al. |
| 10,080,380 | B2 | 9/2018 | Heidebach et al. |
| 10,080,460 | B2 | 9/2018 | Nakao et al. |
| 10,112,124 | B2 | 10/2018 | Corey |
| 10,130,898 | B2 | 11/2018 | Corey |
| 10,188,125 | B2 | 1/2019 | Ozato et al. |
| 10,207,200 | B2 | 2/2019 | Corey |
| 10,293,275 | B2 | 5/2019 | Corey |
| 2003/0066430 | A1 | 4/2003 | Bitar et al. |
| 2003/0099752 | A1 | 5/2003 | Dria et al. |
| 2008/0280023 | A1 | 11/2008 | Kalenian |
| 2010/0203209 | A1 | 8/2010 | Fishbein et al. |
| 2011/0056823 | A1 | 3/2011 | Aoki |
| 2014/0079855 | A1 | 3/2014 | Yokoo et al. |
| 2015/0165490 | A1 * | 6/2015 | Powell ..................... C08H 8/00 134/18 |
| 2016/0270416 | A1 | 9/2016 | Corey |
| 2016/0270418 | A1 | 9/2016 | Corey |
| 2017/0208986 | A1 | 7/2017 | Watanabe |
| 2017/0347827 | A1 | 12/2017 | Almblad |
| 2018/0085685 | A1 | 3/2018 | Corey |
| 2018/0104619 | A1 | 4/2018 | Corey |
| 2018/0207548 | A1 | 7/2018 | Corey |
| 2018/0236375 | A1 | 8/2018 | Corey |
| 2018/0242777 | A1 | 8/2018 | Kim et al. |
| 2018/0249730 | A1 | 9/2018 | Van Schyndel et al. |
| 2018/0249731 | A1 | 9/2018 | Van Schyndel et al. |
| 2018/0318729 | A1 | 11/2018 | Corey |
| 2019/0038066 | A1 | 2/2019 | Kihara et al. |
| 2019/0039096 | A1 | 2/2019 | Kihara et al. |
| 2023/0165397 | A1 * | 6/2023 | Kalenian ................ B01F 31/85 426/433 |

FOREIGN PATENT DOCUMENTS

| | | | |
|---|---|---|---|
| WO | 9953813 | A1 | 10/1999 |
| WO | 0019833 | A2 | 4/2000 |
| WO | 0130173 | A2 | 5/2001 |
| WO | 03032742 | A1 | 4/2003 |
| WO | 2004066745 | A1 | 8/2004 |
| WO | 2010093642 | A1 | 8/2010 |
| WO | 2012098717 | A1 | 7/2012 |
| WO | 2012098725 | A1 | 7/2012 |
| WO | 2012098726 | A1 | 7/2012 |
| WO | 2014141649 | A1 | 9/2014 |
| WO | 2016022484 | A1 | 2/2016 |
| WO | 2016134255 | A1 | 8/2016 |
| WO | 2016191360 | A1 | 12/2016 |
| WO | 2017019742 | A1 | 2/2017 |
| WO | 2017034339 | A1 | 3/2017 |
| WO | 2019030803 | A1 | 2/2019 |
| WO | 2019030805 | A1 | 2/2019 |
| WO | 2019030806 | A1 | 2/2019 |

* cited by examiner

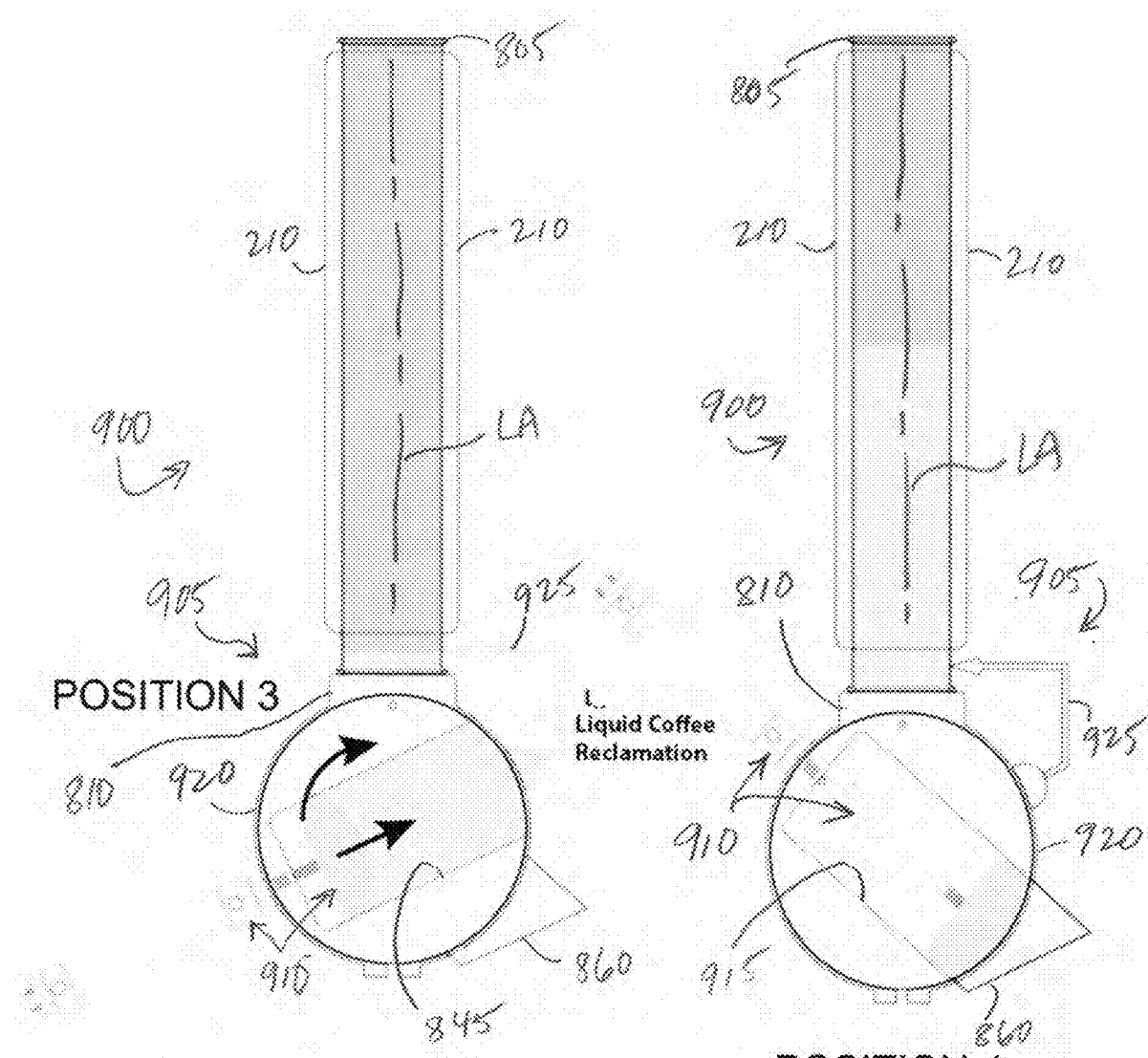
FIG. 35 POSITION 3
FIG. 36 POSITION 4

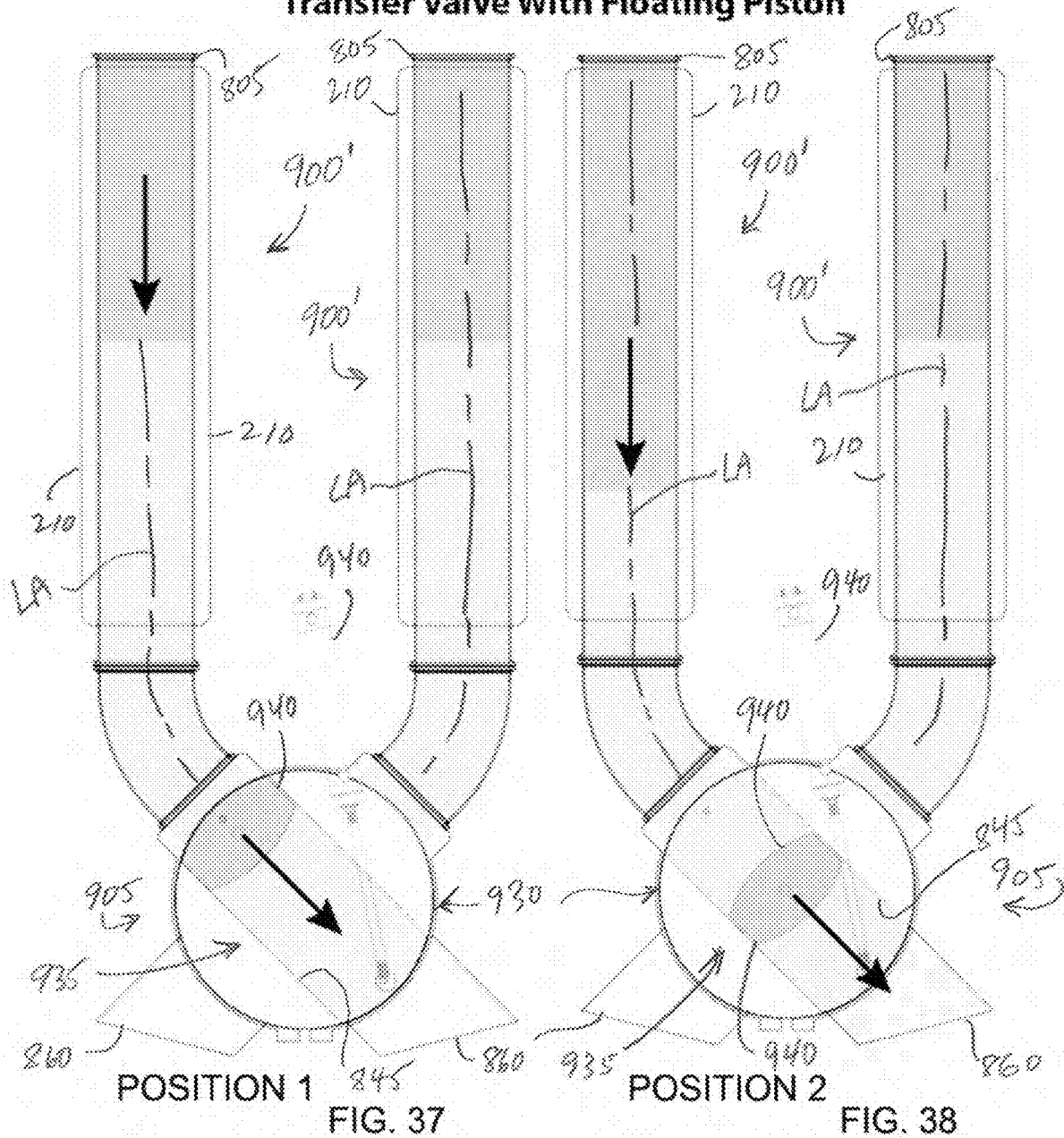

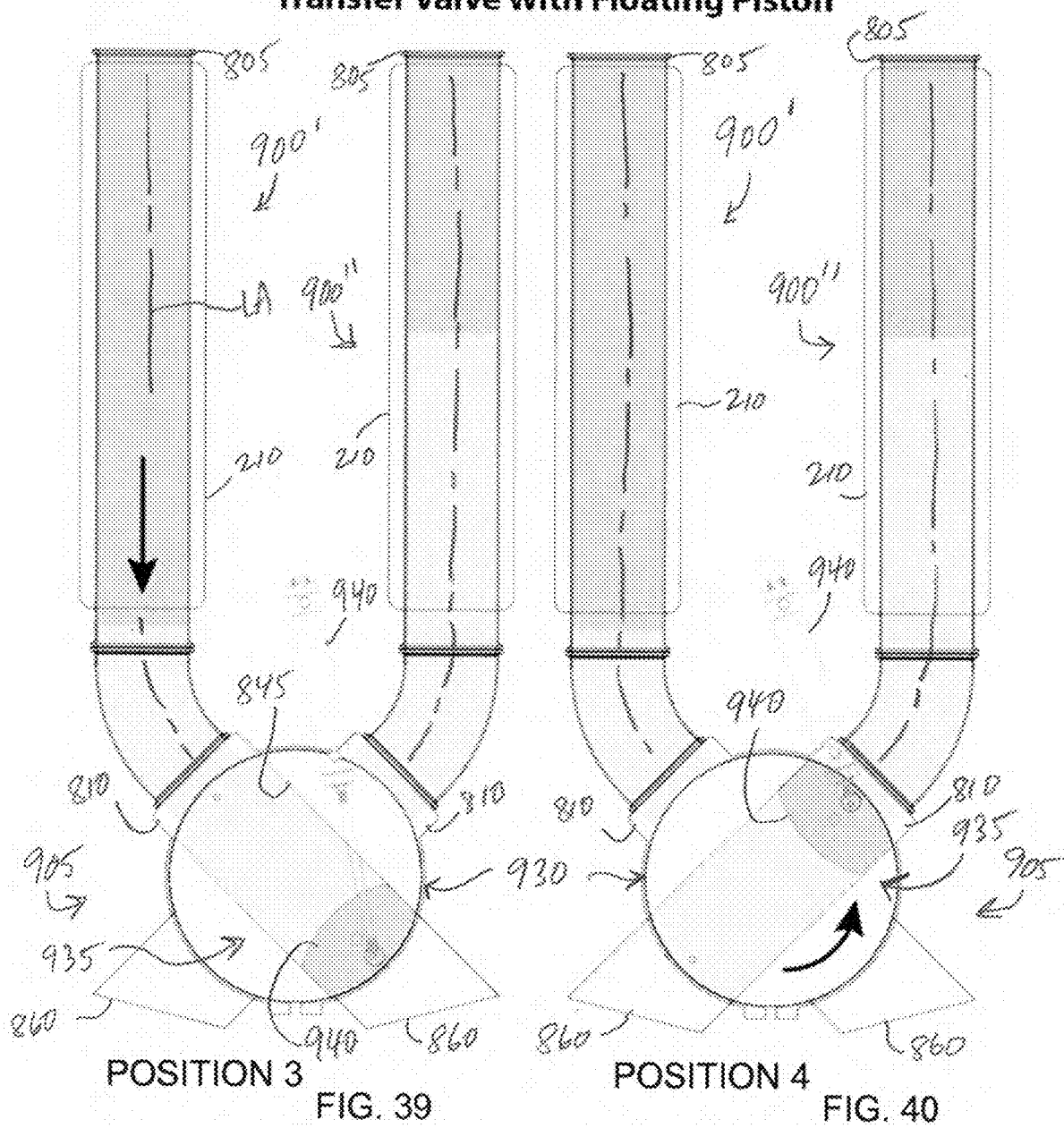

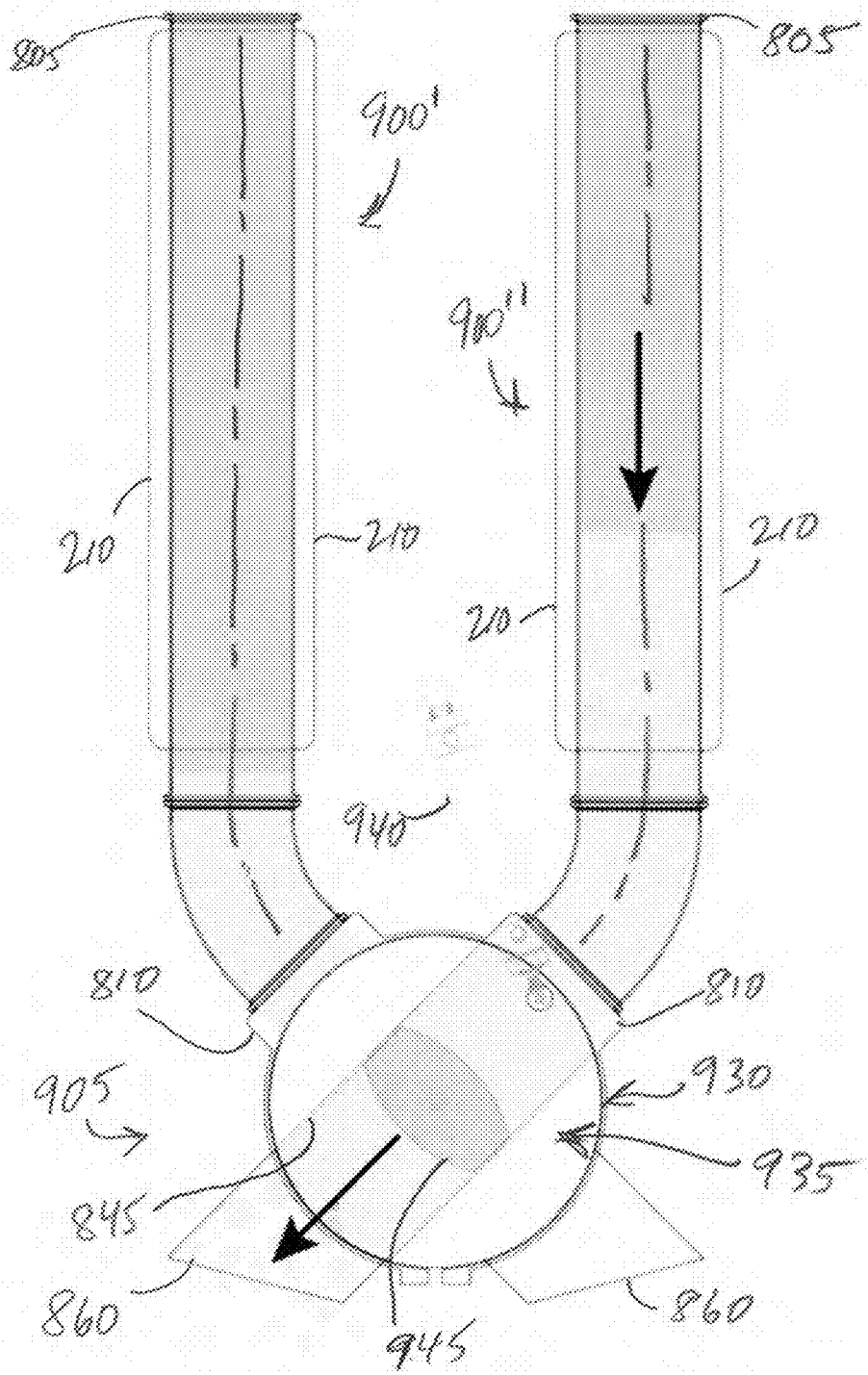
POSITION 5  FIG. 41

DISK VALVE 3: Reciprocating 180 Degree Material Transfer Valve With Floating Piston

POSITION 1

POSITION 2

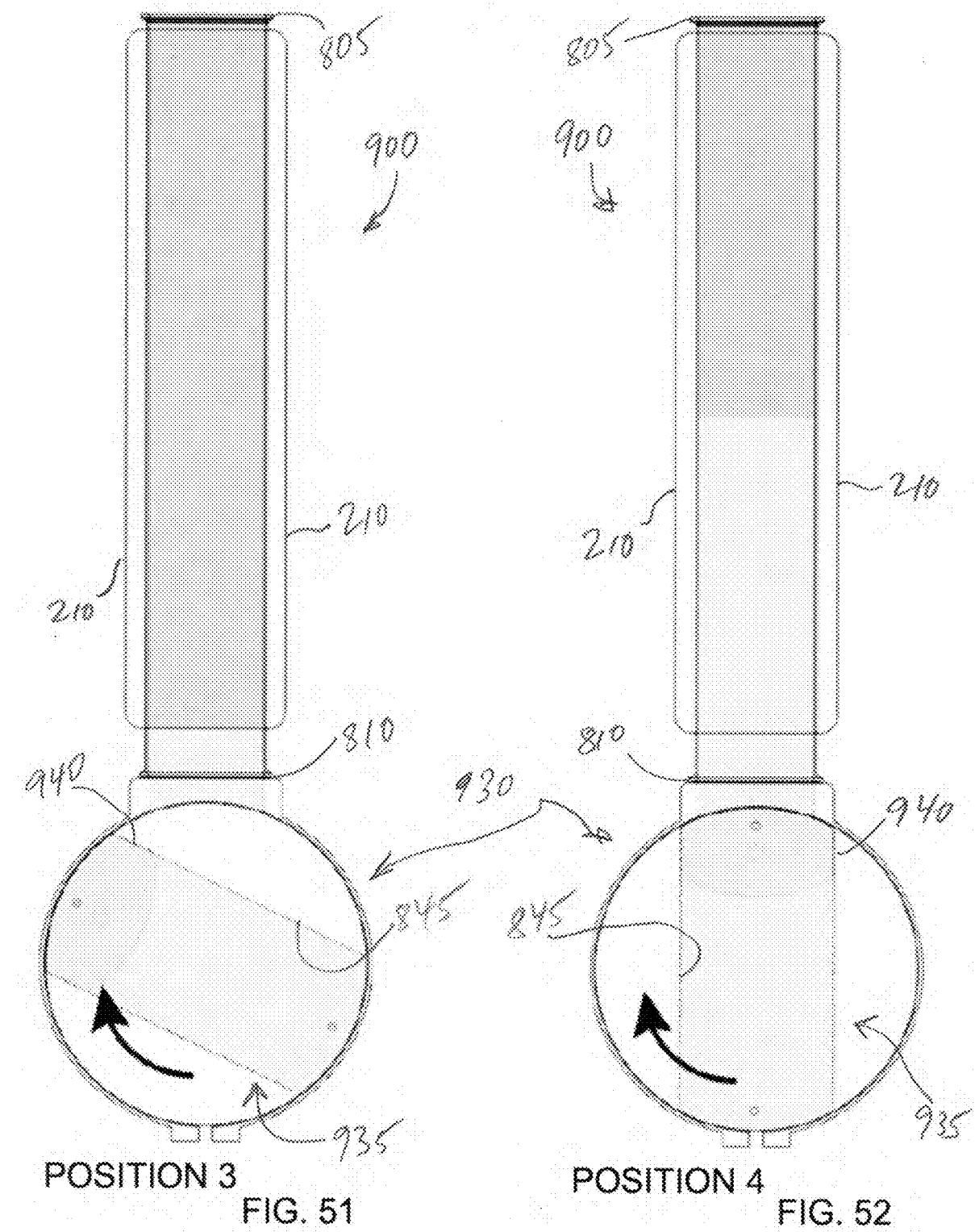

DISK VALVE 3: Reciprocating 180 Degree Material Transfer Valve With Floating Piston

POSITION 5

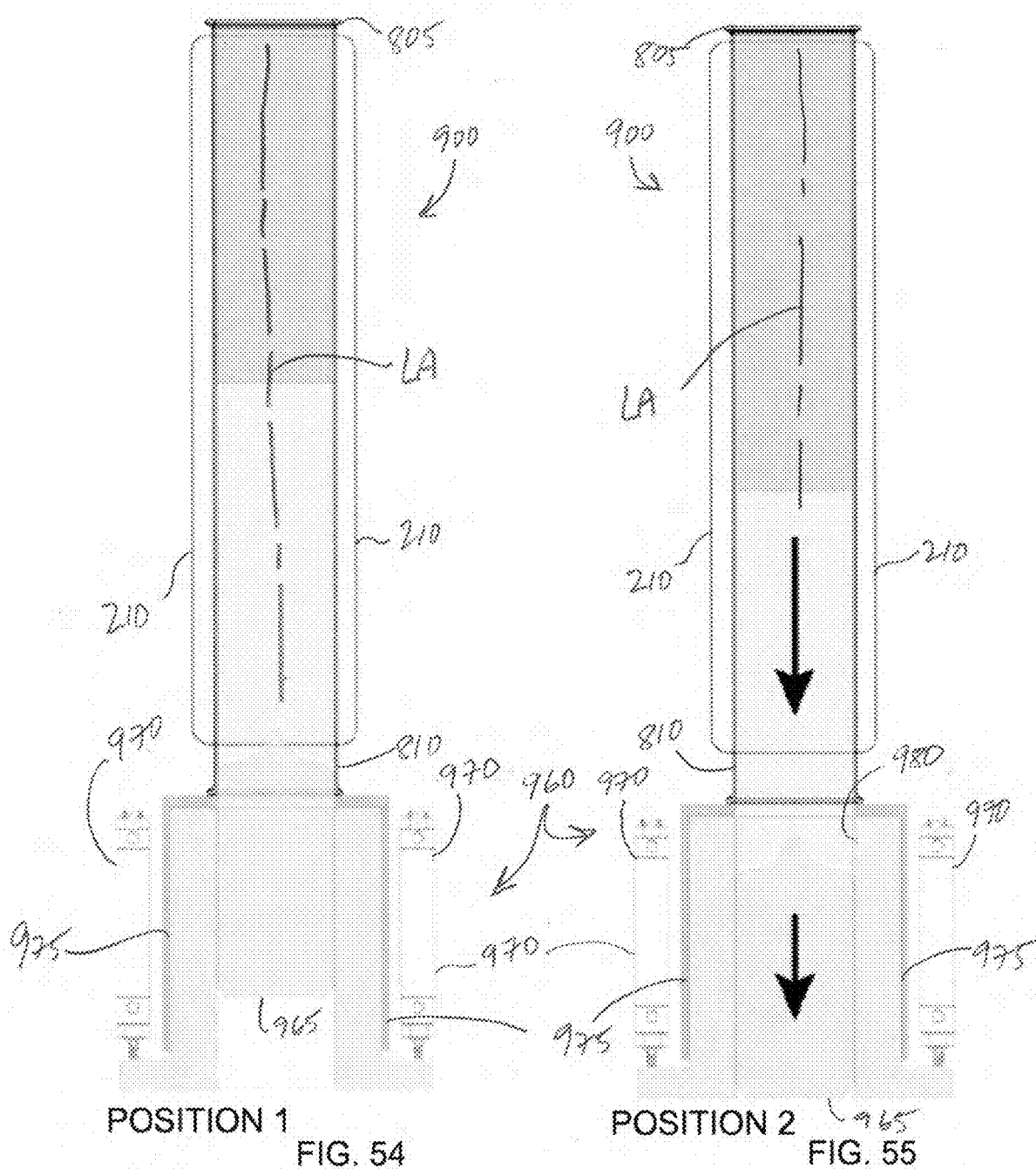
FIG. 54 POSITION 1
FIG. 55 POSITION 2

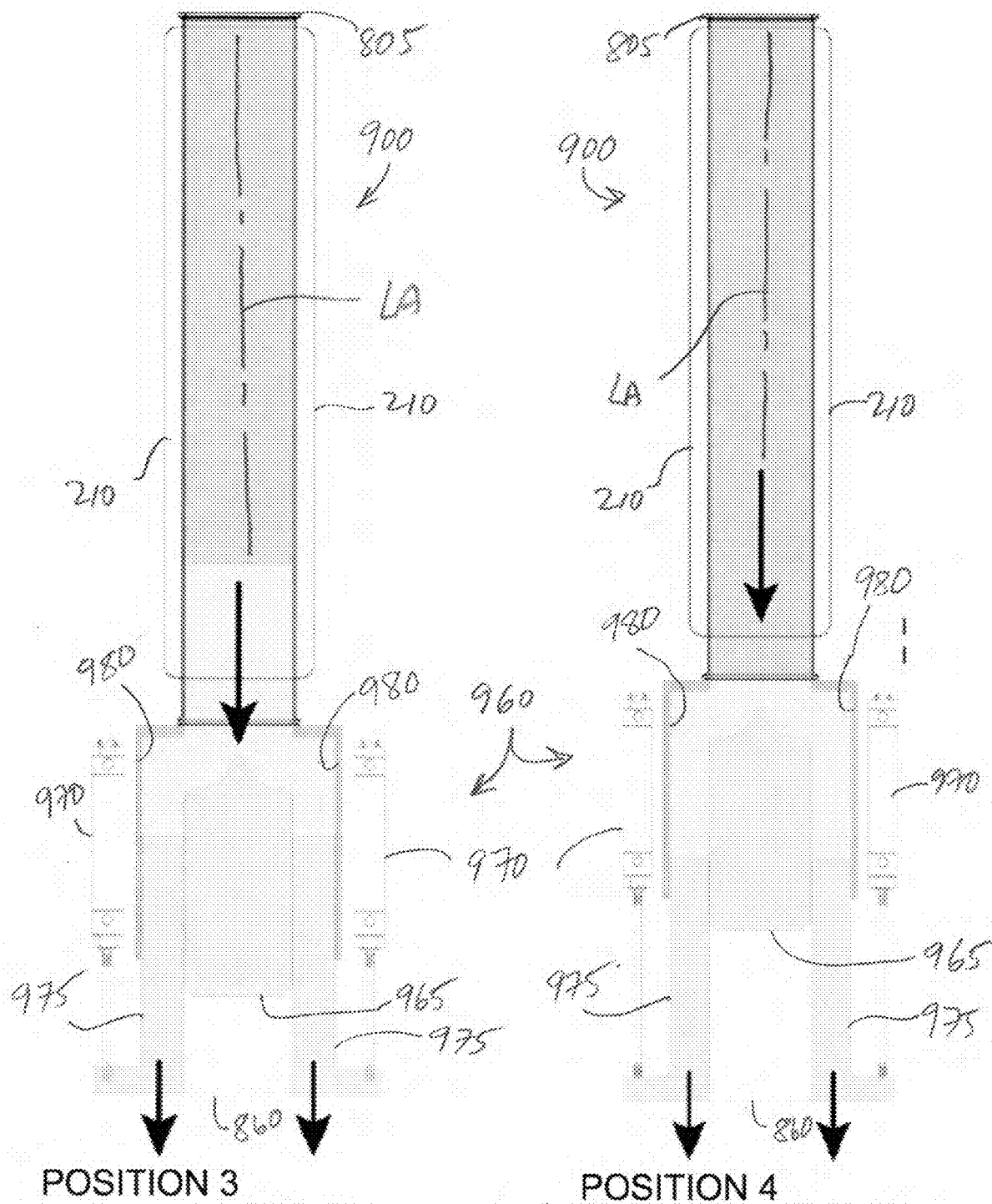

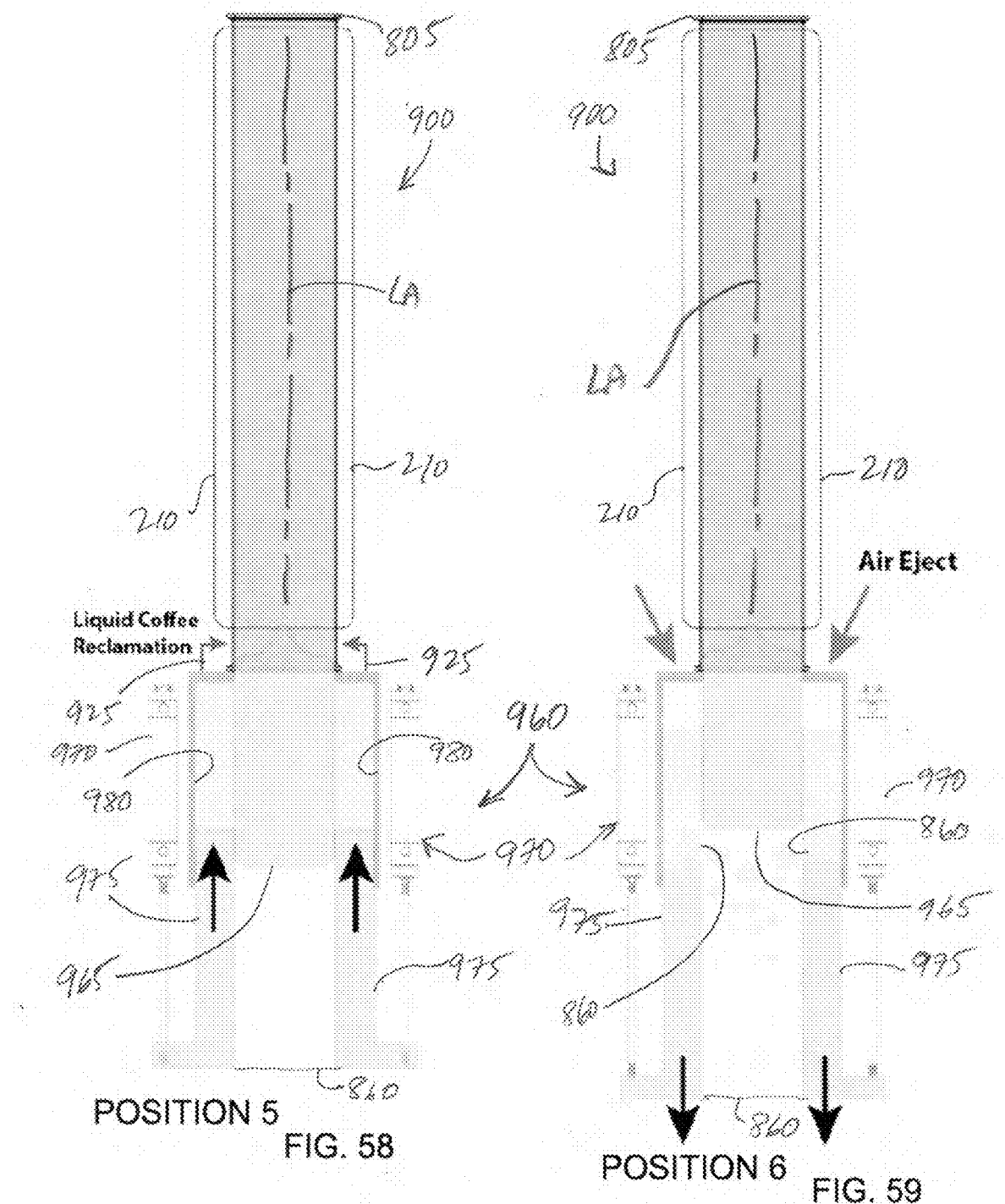

EXTRACTOR APPARATUS

CROSS-REFERENCE TO RELATED APPLICATIONS

This application claims the benefit of and priority to co-owned, co-pending U.S. Provisional Patent Application No. 63/148,607, filed Feb. 11, 2021, and U.S. Non-Provisional patent application Ser. No. 17/086,396 filed Oct. 31, 2020, wherein the latter is now U.S. Patent No. 12,053,000 granted Aug. 6, 2024, and these applications and patent are incorporated by reference herein in their entirety.

TECHNICAL FIELD

The disclosure relates to liquid extractors and methods of operation.

BACKGROUND

Commercial and personal use botanical liquid and beverage extraction equipment has long been configured to manufacture extracts utilizing continuous and batch processing systems, which are configured to produce liquids and beverages in varying quantities that range from a single use quantities to larger volumetric batches. Such quantities have been used as single serving, multiple serving, large batches, and feedstock quantities for small and large scale bottling systems. Such larger batches are also useful for subsequent downstream liquid and beverage manufacturing systems and can be utilized as constituents for other liquids, beverages, concentrates, condensates, precipitates, powders, and related products.

The manufacture of beverage extracts and solutions can include dissolved, dispersed, and colloid constituents, which are eluted from solutes and or media such as coffees, teas, cocoas, and similar beverages. Media and solutes can be derived from organic cellulosic and lignocellulosic sources. Such manufacturing systems and methods are often configured to manufacture the extracted beverages utilizing an extraction autoclave, extractor, or vessel by employing various solvents to elute constituents from source media, solutes, and materials. Such source media can be prepared and utilized in various forms, and can include source media solids of various forms that are ground into particles having sizes and geometries that increase the surface area exposed to solvents and available for various chemical and mechanical extraction processes.

Utilizing such ground materials under certain conditions and circumstances can improve extraction speed, effectiveness, efficiency, quality of extract, and related processing parameters. In some variations, the sources may be utilized in their native condition or form, and may be utilized after various types of pre-extraction processing, which conditions and forms can include for example heat treatments, cooking, and or roasting, chemical treatments, mechanical rendering or grinding, and other and combination treatments.

As contemplated herein, the term or phrase beverage extract refers to an extraction solution, distillation, dispersion, emulsification, condensate, concentrate, precipitate, and or dried materials and powders made therefrom. Such beverage extracts are contemplated herein for use as a beverage and or food, a feedstock for other processes, and or as a constituent for beverage, food, or other uses. The contemplated beverage extracts of the disclosure may contain one or more dissolved, suspended, dispersed, emulsified, colloidal, and or other types of constituents that are derived and or extracted from the source materials.

During beverage extract manufacturing in such arrangements, one or more fluid solvents are typically passed through and or about the source media and material, which is most often in rendered and or ground form. This process enables elution by the solvent(s) to dissolve, suspend, disperse, emulsify, capture, and carry away elements, components, and constituents of the source material and media into a resulting extraction solution, which may be a suspension, dispersion, emulsification, and or colloid extract, and combinations thereof. The beverage extract may be further processed downstream from the source media or material in further operations. In previous continuous and batch extraction systems and methods, attempts have been made to control various manufacturing parameters, which can include solvent and or extraction solution flow rate, pressure, and temperature.

Problems exist with such systems and methods, which have sometimes experienced undesirable effects on the extraction solution and or beverage extract wherein consistency, appearance, aroma, flavor, mouth feel, and other organoleptic parameters are undesirably impacted. Unexpected and or undetected changes and or fluctuations in various known and unknown beverage extract manufacturing quality control parameters can occur not only with unexpected changes in well-known pressure, temperature, and flow rate parameters. Such problems may also occur as a result of myriad other undetected manufacturing process changes.

Such unexpected and undetected changes cause unwanted changes in the extraction solution that degrade the quality of and or ruin an entire batch or continuous production run of such beverage extracts. Such seemingly random unexpected or undetected occurrences with prior methods imposed unvarying limitations on past, well-known manufacturing processes, such that long-established extraction parameters cannot be changed, which restricts the opportunity for manufacturers to distinguish or improve existing products, and to innovate new beverage extract products.

Such seemingly random quality control problems and past manufacturing limitations may be less of a concern when a consumer experiences such problems during extraction of single or small quantity beverage extraction, such as when using a small household or consumer countertop juice, tea, coffee, or similar machine. However, such issues are amplified for larger scale beverage extract manufacturers, such as those manufacturing teas, coffees, and many other types of botanicals, nutraceuticals, and other extracts.

Some larger manufacturers, such as coffee manufacturers, may utilize 40 to 80 pounds (about 18 kilograms or "kg" to about 36 kg)) of roasted, dry, coffee ground source media per 100 gallons (about 380 liters) of consumer-ready coffee extract. The source media may be contained in multiple extraction machines operating in parallel, to produce extract quantities ranging between about 35 and 4,000 liters, or about 10 and 1,050 gallons, or more. In these arrangements that manufacture batches of 4,000 liters, on average about 285 kg (about 630 pounds) of source media is utilized across the parallel series of extraction machines.

Some manufacturers unknowingly experience brief extraction anomalies and problems to otherwise controlled manufacturing temperatures, pressures, flow rates, media disruptions, processes and parameters. After eluted extract is communicated into a downstream bulk receiving tank connected to all of the extractors, it is discovered that an entire large batch or continuous production run of beverage extract is unacceptable or ruined due to undetected, upstream extraction problems. Any extraction process anomaly in any of the extractors, can undesirably affect the quality of the entire batch or production run. Some attempts have been made to address certain aspects of such problems.

One beverage extraction apparatus and method is described in U.S. Pat. No. 3,830,940 granted on Aug. 20, 1974 to Michael Sivetz, entitled "Preparation of Aqueous Beverage Concentrate of Coffee." The Sivetz apparatus is limited to pressure, temperature, and flow rate controlled beverage extraction equipment that generates a concentrated coffee beverage extract by flowing heated water through one or more stainless steel cylindrical columns. In another example, a method for making a coffee extract powder with reduced caffeine and chlorogenic acid using various controlled parameters that include temperature and chemical treatments is described in U.S. Pat. No. 4,160,042 granted Jul. 3, 1979 to David Farr et al.

A further example of a coffee beverage extraction machine is described in U.S. Pat. No. 3,700,463 (A) granted Oct. 24, 1972 to Gregory Bolt et al. is limited to control of pressure, temperature, and extraction water cycle times using multiple extraction columns to manufacture a coffee beverage extract. More recent attempts to manufacture a coffee beverage extract, by controlling temperature, pressure, and water flow rate through multiple ground coffee extractors, are described in U.S. Pat. No. 5,840,360 granted Nov. 24, 1998 to Torben Larsen.

In still other attempts, machines that generate extracts with temperature, pressure, and flow rate controls, which are diluted on demand by a consumer into single servings, are described in U.S. Pat. No. 6,808,731 granted Oct. 26, 2004 to Roger Gutwein et al. Additional attempts to manufacture beverage extracts, including coffee extracts, are further limited to include various types of chemical treatments in the time, pressure, and flow rate controlled processes as described in U.S. Pat. No. 10,080,380 granted Sep. 25, 2018 to Thomas Heidebach et al.

More recent attempts, such as that described in WO 2016-004949 of Pedersen et alia and published Jan. 14, 2016, have also described production of what are termed high-yield instant coffee, and which teach concentrated instant coffee products. In an example, a first extract is produced from roast ground coffee beans with heated water. A second extract is produced by hydrolyzing an aqueous solution containing the spent coffee grounds. The second extract is dried and then added to the first extract to produce an instant coffee product having a yield of total solids of 65% or more. Despite the contrary assertions of Pedersen, some of those with skill in the related arts explain these high-volume methods of making extracts derived from hydrolyzed spent coffee grounds, result in lower quality and less desirable products.

What has long been needed but which remains unavailable are new devices and methods for large scale, continuous and large batch beverage extract manufacturers, as well as household equipment users, to leverage well-known extraction temperature, pressure, and solvent flow rates to more cost effectively improve quality, establish consistency, and enable reproducibility of improved beverage extract products. Such new methods and devices are needed to overcome the many shortcomings in prior systems and methods of manufacturing such beverage extracts, and to enable further innovations and new beverage extract manufacturing methods, equipment, and products.

SUMMARY

The disclosure contemplates various improved systems and methods for manufacturing beverage extracts that leverage existing temperature, pressure, and flow rate control parameters while introducing new devices, processes, and control systems that enable innovative and novel beverage extract products and methods for manufacturing such.

In arrangements of the new systems and methods for manufacturing beverage extract products, a beverage extract is contemplated that includes a plurality of fractions that are each collected in separate vessels during extraction from a fluid extraction system. More preferably, each of the plurality of fractions are collected under and or within an inert atmosphere. Included is an extraction manifold that is in fluid communication with each of the separate vessels and which maintains the inert atmosphere.

During extraction, a first fraction of the plurality is collected during a first span of time that is adjusted such that the first fraction has a first total dissolved solids (TDSs) percentage, a first refractive index, and other parameters, and combinations thereof. Subsequent fractions and a tail fraction of the plurality are collected thereafter, during respective subsequent and tail time spans that are each adjusted so the respective subsequent fractions have subsequent TDSs, refractive indices, colorimetry absorbance, volumes, collection time spans, and other parameters and combinations thereof.

In variations, one or more of such respective parameters including the TDSs, refractive indices, and or colormetrics/colorimetry absorbance are configured at respective predetermined values, relative values, ranges, minimums, maximums, and combinations thereof that establish preferred characteristics of the contemplated beverage extracts. Further adaptations contemplate subsequent, intermediate, and tail fractions of the plurality to have equal, unequal, different, similar, and or varying respective TDSs, refractive indices, volumes, collection time spans, and other parameters and combinations thereof.

In variations of the systems and methods of the disclosure, the beverage extract further includes each of the first and subsequent fractions of the plurality, which are collected during the respective times spans, such that each fraction has different respective TDSs, refractive indices measured in and or in units of degrees Brix.

In optionally preferred examples, the first fraction of the plurality is collected during the first time span, wherein the first time span is adjusted so that the collected first fraction has one or more preferred characteristics as measured by sensors monitoring various respective properties and parameters. Such properties and parameters can include, for example, a refractive index that exceeds about 24 or 25 degrees (24° or25°) Brix or so. In variations, the first fraction is collected such that the TDS of the first fraction exceeds approximately 21.1% or 21.2% or so. Also contemplated by the disclosure are examples wherein during the first time span is adjusted such that the collected first fraction has a refractive index that exceeds about 25° Brix, the TDS of the first fraction exceeds 21.2%, and other parameters have respective minimums, maximums, ranges, and predetermined values that are selected, preferred, targeted, alone and or in combination therewith.

In modifications of the systems and methods of the disclosure, the beverage extract may also include a mixture that is formed from at least one of the fractions of the plurality and or portions thereof. The mixture is adjusted by which of the fractions are included and or by differing the amounts of the portions thereof in the mixture, such that the combined mixture has predetermined, selected, and or preferred parameters and combinations thereof.

In one example, the mixture is combined to have a refractive index exceeding about 25° Brix, and in other examples the mixture is combined to have a refractive index of approximately between about 23° and about 25° Brix or so, has a respective TDS exceeding about 21.2%, and other parameters have similarly desirable and or target values. In still other variations, the mixture is combined to have a TDS of approximately between about 19.5% and about 21.7% or so. Also contemplated are examples wherein the mixture is combined subject to, within, and or under the inert atmosphere.

Further adaptations of the systems and methods of the disclosure contemplate the beverage extract system including the extraction manifold to be configured with automated and or actuatable valve(s) coupled to separate lumens, wherein each lumen is respectively arranged to be in fluid communication with the separate vessels. Variations of this adaptation also contemplate modifications wherein the extraction manifold includes an automated actuatable valve and lumen assembly with the lumen configured to be movable about the valve and lumen assembly to be sequentially or intermittently movable to be in fluid communication with each of the separate vessels. In further arrangements, the separate and automated actuatable valve and lumen assemblies, and separate vessels, are also configured to maintain the contemplated inert atmosphere during extract collection as well as during mixing.

The disclosure further includes the beverage extract adapted so that the first and subsequent fractions of the plurality of fractions are collected during the respective time spans, such that each of the fractions may optionally or preferably have equal, unequal, and or varying volumes and combinations thereof. It is also contemplated that further modifications include the first and subsequent collection time spans are approximately equal.

In still further adaptations of the disclosure, the beverage extract includes the subsequent fractions of the plurality to have or include intermediate fractions and a tail fraction. The tail fraction is collected subsequent to the intermediate fractions, and during a last or final tail time span. The tail fraction may preferably have a tail TDS, refractive index, and or other tail parameters and combinations thereof, which are less than each of the first and intermediate or prior subsequent TDSs, refractive indices, and which other respective tail parameters also differ from those of the other preceding fractions. In variations, the beverage extract includes the mixture of portions of the plurality of fractions, which excludes the tail fraction and or portions thereof.

The beverage extract of the disclosure, and the systems and methods for manufacturing, also contemplate each of the first and subsequent, intermediate, and or tail time spans are defined by and or have start and stop times. The disclosure contemplates arrangements wherein the start and stop times and resultant time spans are each established automatically in real-time, during collection of the fractions by the beverage extract systems and methods as a function of various measured parameters of respective fractions.

In these modifications of the disclosure, each respective start and stop time is adjusted, established by, and or correlated to real-time measurement of respective parameters. For purposes of example without limitation, such start and stop times may be established as a function of predetermined refractive indices (e.g. in degrees Brix and others types of refractive index measuring units and devices), TDSs, colorimetry absorbance, and other parameters that are measured, assessed, and monitored for each of the fractions in real-time, during collection thereof. As a result, each beverage extract fraction of the plurality is collected in a respective vessel during the start-stop-time-defined span, to have a respective, resultant refractive index, TDS, colorimetry absorbance, and other parameters. Each fraction may be collected during such an established time span such that the respective parameters of the fraction are precisely or approximately equal, unequal, similar, dissimilar, different, relative to the respective refractive indices, TDSs, colorimetry absorbance, and corresponding other parameters of the other fractions.

In further arrangements of the disclosure, beverage extracts are collected in subsequent fractions of the plurality that include the intermediate fraction(s), as well as the tail fraction. In this example, the tail fraction is collected during a tail time span, and to have a preferred tail refractive index, TDS, colorimetry absorbance, and or other tail parameters, and combinations thereof. Here too, the tail parameters are adjusted as a function of the tail time span such that the tail parameters are equal, unequal, more than, less than, similar, dissimilar, and or within a preferred range or relative range of each of one or more of the first and or intermediate refractive indices, TDSs, colorimetry absorbance, and other respective fraction parameters.

In another example according to the disclosure, the beverage extract includes and or is formed from a mixture of one or more of the fractions and or portions thereof, and excludes the tail fraction. In a further variation, the mixture is combined within the inert atmosphere to have a resultant refractive index, TDS, volume, colorimetry absorbance, and other resultant parameters, and combinations thereof.

The disclosure is also directed to methods of manufacturing beverage extracts according to the preceding and other examples described elsewhere herein. In further examples, a plurality of fractions are collected in an inert atmosphere and in separate, respective vessels, from an extraction apparatus and or system that is in fluid communication with each vessel. Here, a first fraction of the plurality is collected during a first time span, to have a first total dissolved solids (TDSs), a first refractive index, a colorimetry absorbance, and one or more first other parameters, and combinations thereof.

Subsequent fractions of the plurality are also collected in these exemplary methods, during respective subsequent time spans, which each have subsequent TDSs, refractive indices, colorimetry absorbance, and other subsequent parameters, which may be equal to, unequal to, and or varied from the first TDS. More preferably, such subsequent TDSs and refractive indices, colorimetry absorbances, and other subsequent parameters may be optionally unequal to the first fraction TDS, refractive index, colorimetry absorbance, and other parameters.

In variations of the methods, real-time measurements of various parameters during collection of the fractions are utilized to establish respective time spans with start and stop times. In one example, the start and stop times are established according to and or as a function of predetermined, preferred parameters that are automatically compared to and or correlated with the real-time parameter measurements. The start and stop times that establish each fraction-collection-time-span are thereby adjusted in real-time such that the respective fraction is collected to have one or more desired parameters. As the collection start and stop times, and resultant time spans are thereby established, each respective first and subsequent fraction is collected in its vessel to have the appropriate one or more predetermined, preferred parameters, such as respective preferred TDSs, refractive indices, colorimetry absorbance, and other parameters and combinations thereof.

In other arrangements, the methods of manufacturing a beverage extract also include, for purposes of example but not for limitation, the first and subsequent fractions are collected over respective, established time spans to have at least one or one or more optionally preferred parameters, which in an illustrative variation include a refractive index, a TDS, a volume, colorimetry absorbance, and other parameters. In an added example, the first fraction may have a first volume collected over a first time span, a refractive index exceeding about 24.9° Brix, and the related TDS to exceed about 21.1%.

As with other examples, the first time span is established by start and stop times established as a function of various measured parameters that may be correlated to predetermined or preferred parameter values. Further, the subsequent, or intermediate and tail fractions, relative to the first fractions and other fractions, may have equal, unequal, and varying time spans, refractive indices, TDSs, volumes, colorimetry absorbance, and other possibly preferred parameters such as those contemplated elsewhere herein.

Modifications of these methods also contemplate forming beverage extract mixtures, including those combined within and or subject to the inert atmosphere, from blending all or parts of at least one of the collected fractions and portions thereof. As with other exemplary illustrations, here too the mixture may be combined to have one or more or at least one preferred parameter or parameters. Further examples of the methods of forming the mixtures that exclude the tail fraction, and wherein other fractions or portions thereof are combined to have one or more of a resultant TDS, resultant refractive index, resultant volume, colorimetry absorbance, and other resultant parameters.

For example without limitation, the mixture in one example is formed having at least one of or one or more of a resultant volume, a resultant refractive index exceeding about 25° Brix or ranging between at least 23° and at most 25.5° Brix, a resultant TDS exceeding approximately 21.1% and or a resultant TDS of approximately between 19.5% and 21.7%. Such mixtures may also be formed to have various other minimum and maximum values, ranges of values, relative values, and other parameters with similar or different target constraints. Additionally, other illustrative methods include the tail fraction being collected during a tail time span, to have one or more of a tail TDS and a tail refractive index less than each of the first and intermediate TDSs and refractive indices, colorimetry absorbance, and other tail parameters having values targeted relative to other preceding fractions.

The disclosure also contemplates another variation directed to alternatives wherein extract is collected in one or more collection vessels and which incorporates at least one and one or more extractors, autoclaves, and or vessels configured to enable periodically and or continuously moving media beds traveling and or cooperatively in a cross-flow arrangement with a solvent supply, to create the extract. In these arrangements the media beds are movable along a longitudinal axis in a direction that is opposite to a cross-flow of solvent. Further modifications are contemplated wherein the cross-flow solvent is adjustably pressurized such that flow of solvent can be continuous, periodic, pulsed, and or induced with rapidly changing pressure. In one exemplary configuration, such an alternative extractor apparatus includes an autoclave, extractor, or vessel that defines a longitudinal axis and which extends between an inlet port and a discharge port.

In these modifications, also incorporated is a media feed assembly that is coupled to the inlet, and which supplies media to the inlet, and which forms, agitates, compacts, and or densifies a media bed proximate the inlet. In this way, the media bed is pushed along the longitudinal axis and moves there along through the extractor, autoclave, and or vessel to the discharge port. Further, a solvent supply is coupled to the extractor, autoclave, and or vessel near and or proximate to the discharge port, and is establishes pressurized cross flow through the oppositely moving media bed.

The cross flow periodically and or continuously moves oppositely and concurrently, and or simultaneously, to movement of the media bed, thereby dissolving, entraining, emulsifying, and otherwise capturing solids from the constituents of the moving media bed to form the extract.

In any of such arrangements, an extract port is also included and is coupled to the extract vessel, and extracts beverage extract BE from the extraction autoclave, extractor, or vessel, the extract and or cross-flowed solvent from the moving media bed proximate the inlet.

Further adaptations may also include the feed assembly including a sealing end, which is establishes a pressurized seal against the inlet such that solvent flow is resisted and or prevented from being communicated into the feed assembly beyond the sealing end. The feed assembly may also include an agitator, a mixer, a compactor, a densifier, a variable speed screw, and or combinations thereof, which during operation is/are configured to at least one of: agitate, compact, mix, densify, and or supply the moving media bed to the inlet, and or with a force that enables periodic and or continuous movement through the extraction autoclave, extractor, or vessel and along the longitudinal axis.

Modifications are also contemplated that incorporate a spent media capture assembly that may be coupled to the discharge port, and which is configured to capture spent media and or to extract solvent therefrom. The capture assembly may also be further adapted and or configured to discharge the extracted solvent, and or to communicate the extracted solvent back to the autoclave, extractor, or vessel proximate the discharge port and or to other parts of the apparatus and or systems of the disclosure. The capture assembly may also be further configured to discharge the spent media.

The disclosure is also directed to variations wherein the alternative autoclave, extractor, or vessel further includes or incorporates any of the various other components described elsewhere herein, such an outer jacket assembly that is configured to thermally control temperature of the moving media bed and flowing solvent.

The modified, alternative extractor, autoclave, and or vessel may further include, for example without limitation, a gas and or pressure control assembly that is coupled thereto, and which is configured to control at least one of vapor and gas pressure and content of the moving media bed and flowing solvent. In variations hereto, the gas/pressure control assembly includes an inert gas supply, which is configured to communicate inert gas to an interior of the autoclave, extractor, or vessel.

Other alternative modifications contemplate the feed assembly, solvent supply, and extract and discharge ports configured to be adjustable and to cooperate to establish a periodically and or continuously moving media bed and solvent cross flow about the longitudinal axis, and spent media discharge from the autoclave, extractor, or vessel.

The disclosure is also directed to an extractor apparatus that incorporates an autoclave which defines an interior that extends along a longitudinal axis between opposite media inlet and discharge ports. A feed assembly is also incorporated that is coupled to the inlet port to supply media to the interior during operation. The feed assembly thereby establishes a media bed that is movable about the longitudinal axis from the inlet port at the top of the extractor, through the interior to the discharge port at the bottom of the extractor.

Further included is a solvent supply that is coupled to the autoclave proximate the discharge port to establish during operation pressurized solvent cross flow that is directionally opposite the direction of movement of movable bed. An extract port is also included in the extractor apparatus and is coupled to the autoclave proximate the inlet port to extract cross-flowed solvent from the movable media bed during operation.

In variations of an extractor assembly, a capture assembly is sealingly coupled to the discharge port and during operation, captures spent media, and is movable to discharge the spent media. The capture assembly may also extract residual solvent from the spent media, which may be communicated to the interior of the autoclave between the inlet and discharge ports.

Modifications of the disclosure include the extractor apparatus also incorporating the feed assembly to have a variable speed screw with an approximate spiral profile, which is arranged to establish a seal about the inlet port, and to operate to at least one of: supply, compact, mix, and move the media bed into the inlet port. In further arrangements, the feed assembly also may include a sealing end that establishes a pressurized seal against the inlet port during operation to resist solvent flow into the feed assembly beyond the sealing end.

Alternatives of the disclosure incorporate a modified feed assembly that includes a reciprocating piston sized to establish the sealing end about a distal portion, during operation when the piston is extended into the inlet port, and arranged to actuate to at least one of: supply, mix, compact, and move the movable media bed to the inlet port.

Further adaptations of the extractor are directed to a circumscribing jacket assembly that is coupled to, carried from, within, and or included about the autoclave, and which has adjustable thermal elements that during operation control temperature of the movable media bed and flowing solvent. In exemplary arrangements, the jacket extends around the interior and or exterior circumference of the autoclave. The thermal elements may be heated and cooled with fluids such as water and or gases, and or may include electrically controlled thermal heating and cooling elements.

These exemplary configurations also contemplate the autoclave further including a circumscribing jacket assembly that incorporates a plurality of injection ports, which are in communication with the interior of the autoclave, and which are arranged circumferentially about the interior and or exterior of the autoclave to inject into the interior, during operation, one or more gases and or liquids that may be thermally controlled and or pressurized.

These features and elements of the extractor assembly may also be coupled to other devices and systems, and may include for added examples, a fluid pressure control assembly that may be coupled to and or in communication with the interior of the autoclave, and which has one or more pressure and or vacuum ports positioned about the autoclave such that, during operation, the gas pressure and or vacuum of these ports control at least one of vapor and gas pressure, and vapor and gas composition, of the movable media bed and cross flowing solvent. In added arrangements, the fluid pressure control assembly may optionally also include an inert gas supply in communication with the ports and or interior.

The extractor apparatus of the disclosure also may incorporate the feed assembly to have a hopper sized to receive the media and, during operation, to supply the media by a conduit to the inlet port. In further variations, the feed assembly may also include an actuatable media mover having a sealing end, other than the contemplated spiral screw or reciprocating piston, and with the media mover during operation establishing a pressurized seal against the inlet port to resist solvent flow into the feed assembly, and beyond the pressurized seal.

Still more variations are possible according to the disclosure, and may also include the extract port formed as a circumscribing collar having extraction ports arranged around the autoclave, which are in fluid communication with the interior, which during operation enables distributed extraction of the cross-flowed solvent from the movable media bed. Similarly, the disclosure is directed to the solvent supply formed as a circumferential collar surrounding an interior and or exterior circumference of a portion of the autoclave, and incorporating supply ports that are arranged to surround the autoclave, with the supply ports in fluid communication with the interior to enable, during operation, distributed injection of the solvent into the movable media bed.

This summary of the implementations and configurations of the elements, components, and constituents of the contemplated beverage extracts and methods of manufacture introduces a selection of exemplary implementations, configurations, and arrangements, in simplified and less technically detailed arrangements. Such are further explained in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example arrangements, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale, but are instead arranged to schematically and functionally illustrate various aspects of the disclosure.

FIGS. 20, 21, and 22 illustrate a front cross-sectional view of aspects of the extraction autoclave, extractor, or vessel of FIG. 15 in a different mode of operation, wherein FIG. 20 depicts a spent media capture mode of operation;

FIG. 21 depicts a cross-section view of the autoclave, extractor, or vessel of FIGS. 15 and 20 in further modified modes of operation, wherein FIG. 21 shows a spent media extraction mode of operation that removes residual solvent extract from the spent media;

FIG. 22 shows a cross-section view of another mode of operation of the autoclave, extractor, or vessel of FIGS. 15, 20, and 21, for continuing purposes of illustration wherein FIG. 22 illustrated discharge of spent media;

FIG. 24 depicts variations of the illustrations of FIGS. 15 through 22, wherein FIG. 24 depicts features, and modes an positions of operation, of another modified spent media capture assembly;

FIGS. 33 through 36 are schematic representations of additionally contemplated arrangements of the autoclaves, extractors, or vessels of the disclosure and preceding figures, and which reflect other possible variations of the positions and modes of operation, and additional components, features, and capabilities according to the disclosure;

FIGS. 37 through 41 portray still more modified arrangements of the components, elements, and features of the autoclaves, extractors, or vessels of the disclosure and preceding figures with certain prior described features removed for illustration purposes, and which now reflect concurrent, side by side dual modes and positions of operation of certain additional components, features, and capabilities of the disclosure;

FIGS. 49 through 53 portray cross-section views in modified scale of the various alternative arrangements of FIGS. 25 through 48, and revised to further depict aspects of positions and modes of operation thereof; and FIGS. 54 through 59 are cross-section views in different scale of further modifications of the autoclaves, extractors, and vessels contemplated by the disclosure, with various alternative components shown and other structure removed, for purposes of additional illustration depict various positions and modes of operation thereof.

DETAILED DESCRIPTION

Figure 1:
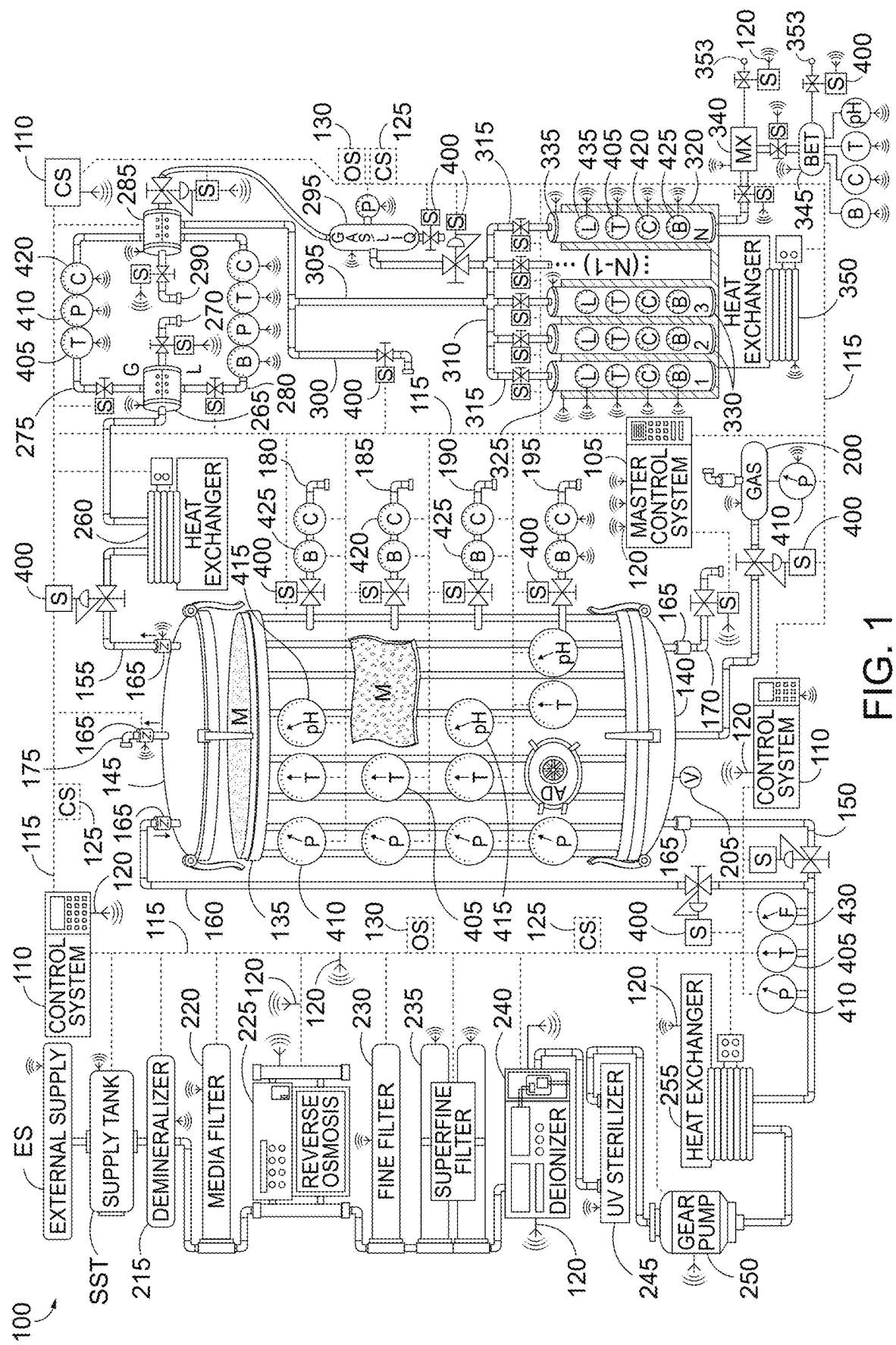
FIG. 1 is an illustration of beverage extracts and extraction systems and methods, and constituents, elements, components, and arrangements thereof according to the principles of the disclosure.

Detailed embodiments of the present invention are disclosed herein; however, it is to be understood that the disclosed embodiments, adaptations, arrangements, variations, and modifications are merely exemplary illustrations of the disclosure that may be embodied in various and alternative forms. As noted elsewhere, the figures are not necessarily to scale, and some features may be exaggerated or minimized to show details of particular components. Therefore, specific structural and functional details disclosed herein are not to be interpreted as limiting, but merely as a representative and exemplary basis for teaching one skilled in the art to variously employ the features, capabilities, and elements of the disclosure.

As those of ordinary skill in the art should understand, various features, components, and processes illustrated and described with reference to any one of the figures may be combined with those illustrated in one or more other figures to enable embodiments not otherwise explicitly illustrated or described. The combinations of features illustrated are representative embodiments for typical applications. Various combinations and modifications of the features consistent with the teachings of this disclosure, however, are achievable for particular applications or implementations, and should be readily within the ordinary knowledge, skill, and ability of those working in the relevant fields of technology.

The following detailed description is exemplary and is not intended to limit the disclosure, the claims, or the demonstrative implementations and contemplated uses of the present disclosure. Descriptions of specific devices, techniques, and applications for use and operation are provided only as examples for purposes of enabling the skilled person to comprehend the disclosure. Modifications to the examples described herein should be readily apparent to those of ordinary skill in the art, and the general aspects and principles depicted herein may be applied to other configurations, variations, and arrangements without departing from the spirit and scope of the disclosure. Furthermore, there is no intention to be bound by any expressed or implied theory presented or perceived, in the preceding descriptions of the field of technology, background, summary, or the following detailed description. The present disclosure should be accorded scope consistent with the claims, and not be limited only to the examples described and shown herein.

Example and representative configurations, adaptations, and implementations of the present disclosure may be described herein in terms of specific devices, equipment, and by way of physical, functional, and or logical systems, subsystems, components, elements, control systems that include computer and or hardware processor implemented systems. Such may further include or incorporate wired and wireless networks, and related architectures, processing instructions, and software, and various processing steps, sequences, and methods of operation. It should be appreciated that such representative and schematic methods, figures, and diagrams may be rearranged, resequenced, and realized by any number of devices, components, equipment, hardware processors, computer hardware, computer and processor software, and or firmware components that are configured to enable, implement, and perform the specified capabilities and functions of this disclosure.

Conventional techniques and components related to use during operation, and other functional aspects of the systems of the disclosure (and the individual operating components of the systems), may be described herein only with enough technical detail so as to enable those with ordinary skill in the relevant technical fields to practice the contemplated implementations of this disclosure.

In addition, those skilled in the art will appreciate that example implementations of the present disclosure may be practiced in conjunction with a variety of mechanical, electrical, electromechanical, pneumatic, pneudraulic, hydraulic, fluid, gas, and related combinations, and components, and systems. All such components may be controlled, managed, monitored, and rendered operational with a variety of hardware and software processors and computers, and related digital and analog equipment, components, software, firmware, and networked, world-wide-web-based, internet-based, and cloud-based configurations of the described beverage extraction system 100 of this disclosure, which may further incorporate various combinations of such implementations.

As should be understandable to those with ordinary skill in the art, after reading this description, that the following are examples and illustrative implementations of the present disclosure, and are not limited to operating only in accordance with these examples. Other implementations may be realized and utilized, and changes in components, configurations, and exemplary sequences of operation may be made without departing from the contemplated scope of the example implementations presented herein.

With reference now to the various figures and illustrations and specifically to FIGS. 1, 2, 3, and 4, schematic diagrams of beverage extract systems, a beverage extract, and methods for manufacturing such are shown. The beverage extract manufacturing system 100 is configured with various feedback and feedforward monitoring capabilities, which are configured to automatically control various aspects of extracting a beverage from source materials and media. Various types of extraction manufacturing equipment are contemplated and can include a wide variety of subsystems, components, constituents, elements, and features, arrangements, and configurations as depicted in and contemplated by the figures and illustrations.

In an exemplary arrangement and configuration, system 100 includes hardware processor and or computer-based control systems ("CSs") that may incorporate primary and or master hardware-based controllers, hardware processors, and or control systems ("MCS") 105, which are coupled to various subsystems or other processors, controllers, and or control systems CSs 110. These components and systems may be coupled by wired or wireless network or networks 115 having wired/wireless access points (WAPs) 120, and similarly contemplated communications hardware and components.

As depicted in the various figures and labeled in some portions with reference numeral 115, such communications systems and networks 115 are also illustrated in the figures to have dashed lines. The dashed lines graphically and schematically represent various types of hardware and or wireless connections between and among the various components, elements, devices, and subsystems of system 100 and the contemplated communications components and systems of network or networks 115.

Such master and subsystem processors, controllers, and or control systems 105, 110 may incorporate and further be and or include one or more hardware and or software processors, controllers, and or hardware servers, and which may further include for additional examples, other hardware microprocessor-based controllers as described elsewhere herein. Networks 115 and WAPs 120 may also include hardware embodied network controllers and routers, in addition to communications links between such controllers, and sensors, solenoids, servos or servomotors or servo-actuators of the extract manufacturing system, and related systems and components.

Also contemplated but not shown are off-site or cloud-based systems and components external to extract manufacturing system 100. Such networks 115 and WAPs 120 may also include, incorporate, and or be coupled to and in communication with internal, external, wired, and wireless personal area networks (PANs), local area networks (LANs), wide area networks (WANs), and peer to peer networks (P2P), among others, and as described and contemplated elsewhere herein.

In further examples without limitation, processors, controllers, and or control systems 105, 110, and or other hardware controllers, devices, and processors, may include, be coupled to, be configured with, and or cooperate with one or more integrally included, embedded, remote cloud-based, and or other types of independently arranged systems, controllers, and or sensors. These components may cooperate in parallel, in series, and distributively with one another, and with other controllers, subsystems, and internal and external systems to manage and control system 100 as well as external devices, and such other controllers, and or actuators. Such components are responsive to sensor and communication signals, data, parameters, and other information identified, established by, communicated to, and received from the contemplated systems, controllers, and components, as well as other cooperative systems that are external and or remote to system 100.

Networks 115 and WAPs 120 may include preconfigured, dynamic, static, ad hoc, and similar types of hardware networks and communications, utilizing various industry protocols, standards, and or messaging formats that available in the United States and other countries. Such protocols, standards, and or network communications formats are utilized for purposes of enabling various aspects of the disclosure and are known to those having knowledge in the relevant technology.

For purposes of further example without limitation, networks 115 and WAPs 120 may incorporate various aspects of such network and communications standards and architectures known to those with skill in the art. Such may include those described and managed by the IEEE 802 local area network and metropolitan area network (LAN/MAN) and related standards committees, which can be found for example via the internet at www.ieee802.org, as well as standards.ieee.org, and similar standards and organizations.

In another example, IEEE Standards 802.11 support software and firmware communications services that enable data link media access control (MAC) and physical layer (PHY) capabilities, such as wireless local area network (WLAN) data communications in various frequency bands. The exemplary 802.11 standard is entitled "IEEE Standard for Information technology--Telecommunications and information exchange between systems-Local and metropolitan area networks-Specific requirements Part 11: Wireless LAN Medium Access Control (MAC) and Physical Layer (PHY) Specifications," and is available at ieeexplore.ieee.org/document/7792308.

While illustrated here for purposes of example, as discrete, individual master and subsystem hardware-based processors, controllers, and or control systems 105, 110, such also contemplate various other types of controllers, processors, control systems, subsystems, and systems. These contemplated elements may control, be controlled by, communicate signals to and from, and exchange data with other processors, controllers, and other sensors, actuators, signals, and components, which are part of or remote to system 100. These may include for example without limitation, external control systems, and internal and external networks, components, subsystems, and systems. The capabilities and configurations described in connection with any specific hardware micro-processor-based or other controller or hardware processor as contemplated herein may be embodied in one or more other controllers, and or may be distributed across more than one controller.

These arrangements also contemplate that multiple controllers can individually, collaboratively, in combination, and cooperatively enable any such capability and configuration. Accordingly, recitation herein of "control system," "processor," "a controller" or "the controller(s)" is intended to refer to such hardware, software, virtual, and hybrid controllers, processors, components, subsystems, systems, and or discrete and embedded elements, both in the singular and plural connotations, and individually, collectively, and in various suitable embedded, cooperative, and distributed combinations.

Further, communications about and within and with system 100 over networks 115 and WAPs 120 and other internal and external PANs, LANs, and or WANs, are intended to include responding to, sharing, transmitting, communicating, and receiving of commands, signals, data, embedding data in signals, control logic, and information. This is accomplished between controllers, and sensors, actuators, controls, and related systems and components of system 100 and related or cooperating external systems.

Such processors, controllers, and or control systems 105, 110, communicate with one or more controller-based input/output (I/O) interfaces and or the networks 115 and WAPs 120, and may include integrated interfaces enabling communication of raw data and signals, and or signal conditioning, processing, and or conversion, short-circuit protection, circuit isolation, and similar capabilities. Alternatively, one or more dedicated hardware or firmware or software or virtual devices, application specific integrated controllers (ASICs), and other types of controllers, processors, and systems on a chip (SoCs) may be implemented herein and may be also used to precondition and preprocess particular signals and data during communications, and before and after such signals and data are communicated.

The contemplated processors, controllers, and or control systems 105, 110, in further illustrations, and other controllers, may include, incorporate, implement, be coupled to, and or communicate with one or more hardware or software or virtual microprocessors or central processing units (CPU) that control or implement various types of computer readable hardware storage devices or media. Such computer readable storage devices or media may include volatile and nonvolatile storage in rewriteable, erasable, programmable, and read-only memory (ROM, PROM, rROM, eROM, ePROM, etc.), random-access memory (RAM), and rewritable, erasable, and non-volatile or keep-alive memory (NVRAM or KAM, eNVRAM, eKAM, NVM, NVMe, etc.).

NVRAM or KAM is a persistent or non-volatile memory that may be used to store various commands, executable control logic and instructions and code, data, constants, parameters, and variables needed for operating the system 100, while the system 100 and its components are unpowered or powered off. Computer-readable storage devices or media may be coupled to such processors, controllers, networks, systems, and devices and implemented using any of a number of known persistent and non-persistent memory devices. Such exemplary devices include for example, PROMs (programmable read-only memory), EPROMs (rewritable and or erasable PROM), EEPROMs (electrically erasable PROM), hard disk drives (HDDs), solid state drives (SSDs), flash memory, or any other electric, magnetic, optical, and or hybrid and combination memory devices capable of receiving, transmitting, storing, and communicating data.

Each of such devices, components, processors, microprocessors, controllers, microcontrollers, memories, storage devices, and or electronic media of system 100 may also further contain, include, and or be embedded with one or more basic input and output systems (BIOSs), operating systems, application programming interfaces (APIs). These included elements have, enable, and or implement remote procedure call (RPCs), and related firmware, microcode, software, logic instructions, commands, and the like, which enable programming, customization, coding, and configuration, and which may be embedded and or contained in at least one of and or distributed across one or more such devices, among other capabilities.

Figure 2:
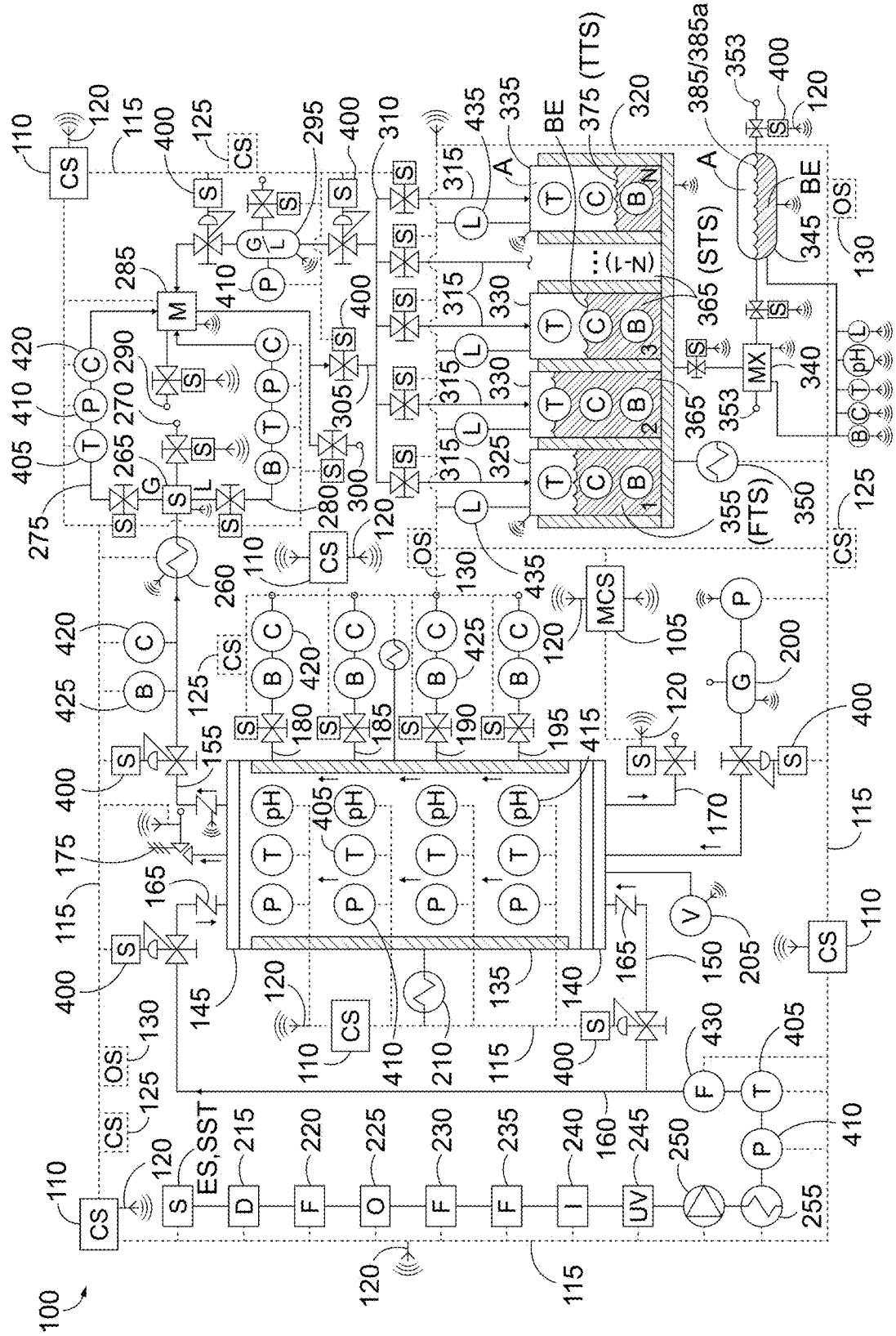
FIG. 2 includes additional aspects of the disclosure depicted in FIG. 1, with components, features, and elements added, removed, and or rearranged for purposes of further illustration, and for depicting other exemplary aspects of the beverage extracts and extraction systems and methods.

The embodiments of system 100 in FIGS. 1 and 2 also depict the various hardware controllers, processors, ASICs, SoCs, and control systems 105, 110 communicating signals and data with exemplary sensors, solenoids, equipment, and actuators in communication with the wired and or wireless networks 115 and WAPs 120. Such signals and data include for example control signals and data "CSs" 125 that control, monitor, and report operations of system 100, and may also include other signals and data "OSs" 130 that may be similarly communicated throughout system 100.

The contemplated control signals and data CS 125, OS 130, may for example typically include commands, logic, and instructions and code, data, information, analog and digital signals, settings, and parameters, including preferred operating parameters, predetermined values, settings, and preferences of system 100. Such CSs 125 and OSs 130 may also be input, received, retrieved from, captured, and stored in a repository, storage device, memory, and other types of data storage of the system, and may be communicated therewith between, to, and from the contemplated equipment, components, sensors, actuators, and devices of system 100.

Any and or all of these signals 125, 130 can be raw analog or digital signals and data, as well as preconditioned, preprocessed, combination, and or derivative data and signals generated in response to other signals and system operations. Such signals and data may encode, embed, represent, and be represented by voltages, currents, capacitances, inductances, impedances, and digital data representations thereof, as well as digital information that encodes, embeds, and or otherwise represents such signals, data, and analog, digital, and multimedia information.

The communication and operation of the described signals, commands, control instructions and logic, parameters, values, and data and information, CS 125 and OS 130, may be represented schematically as shown in FIGS. 1, 2, and other figures, and by schematically represented data communication lines and signals and wireless signals and data connections. Such signals, data, commands, and other items are generated and consumed by the various contemplated controllers, sensors, actuators, and other system components. The figures, diagrams, and written description of the disclosure illustrate exemplary commands and control processes, control logic and instructions, and operation strategies, which may be implemented using one or more computing, communication, and processing techniques that can include real-time, event-driven, interrupt-driven, multi-tasking, multi-threading, virtualization, containerization, and combinations thereof.

The steps and functions shown may be executed, communicated, and performed in the sequence depicted, and in parallel, in repetition, in modified and different sequences, and in some cases may be combined with other processes and or omitted. The commands, control logic, parameters, values, and instructions CS 125, OS 130 may be executed in one or more of the described processors, microprocessor-based controllers, in external controllers and systems, and may be embodied as primarily hardware, software, firmware, and virtualized and or containerized hardware/software/firmware, and combinations thereof.

Figure 3:
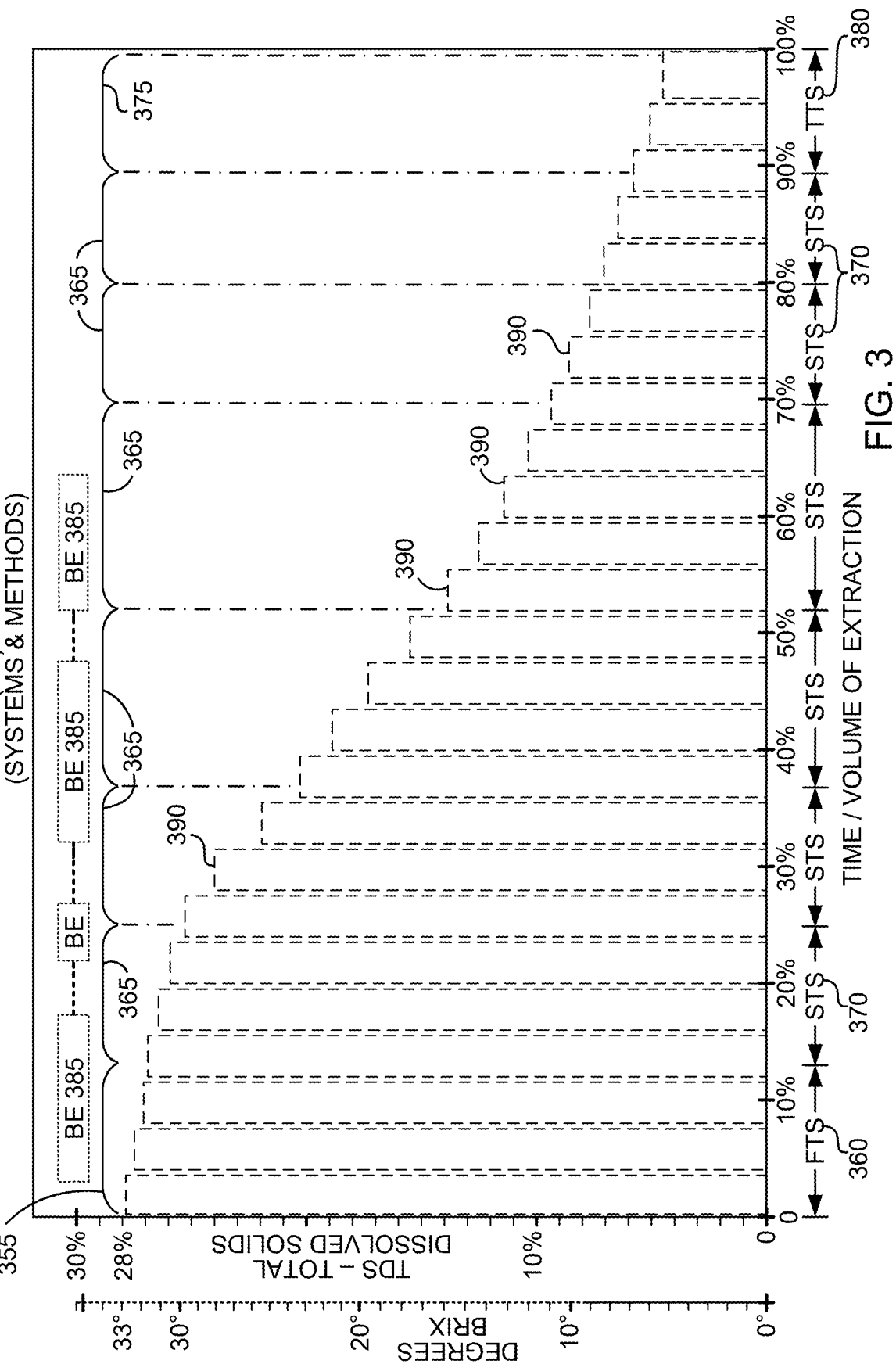
FIG. 3 depicts further examples of aspects of the disclosure according to the preceding figures and illustrates various contemplated beverage extracts enabled by the extraction systems and methods of the disclosure.

With continued reference to FIGS. 1, 2, and 3, the beverage extract and extraction system and manufacturing methods 100 also include as a central operational component, an extractor and or a plurality of extractors 135, which is/are configured generally as vertically arranged cylinders, cylindrical pressure vessels, extractors, and or autoclaves. Each extractor has at opposite ends a bottom 140 and a top 145, each with respective screens at each end to support, capture, and prevent migration of extraction media that is contained between the screens and the ends.

One or both of the bottom 140 and top 145 and respective screens may be removable to enable servicing, cleaning, loading, and removal of an extract or solute media "M", such as ground coffee, tea, cocoa, and many other types of extract media M. In modifications, the bottom 140 may incorporate and or be formed as an outlet and or discharge port that moves spent media M out of the extractor or autoclave 135. In variations, the top 145 may incorporate and or be formed as an inlet port sized to receive media M and communicate it into an interior of the extractors, autoclaves, and or vessels 135.

Among other components, each extractor 135 is coupled to a fluid or solvent supply line(s) 150 that supply (ies) a solvent, and an extract or solution effluent line(s) 155 that receive(s) from the extractor 135 an extraction beverage solution, dispersion, extract, colloid, and or mixtures thereof. Supply line(s) 150 may also be coupled to an extractor flush supply line(s) 160 to enable servicing, cleaning, and other operations and capabilities of autoclave(s)/extractor(s) 135. Mechanical and or electrically operated/actuated and automated check valves 165 may be optionally included in various positions about the system 100 for use in certain applications, functions, and implementations, and to enable various additional capabilities contemplated elsewhere herein.

Such check valves 165 contemplate and are configured for real-time and automated flow control capabilities that can include flow directional controls that prevent back flow, prevent fluid "hammering" or shocks during operational changes in flow volume and or pressure, and or other similar features that may desirably be incorporated into such check valves 165. While one or more of check valves 165, as depicted in the various figures, may or may not include flow direction icons or arrows that imply a possibly preferred single direction of flow, such depictions are for purposes of example and illustration, not limitation. In further variations, autoclave(s)/extractor(s) 135 may also incorporate drains and or taps 170 and pressure relief lines 175 as may be desired for testing, measuring, servicing, maintenance, and additional operational and manufacturing capabilities.

Components of system 100, such as exemplary check valves 165, taps or drains 170, and pressure relief valves 175, among others, are depicted in the figures using exemplary graphical nomenclature or iconography that is intended to represent operational characteristics, flow directions, and other features. Pressure relief valves 175 are illustrated with input and outline lines joined by two triangles with adjacent sides, and having a line with three hashes extending vertically from one triangle to represent the pressure relief port. Such exemplary representations include and or are used by various domestic and international educational and professional associations, organizations, and standards entities, which are involved with and operate in the technology fields of fluids, food processing, hydraulics, and or mechanical engineering technology, among others.

Examples of such international and domestic associations, entities, and or organizations include, for example without limitation, the International Standards Organization, see www.iso.org, the American National Standards Institute, see www.ansi.org, the American Society of Mechanical Engineers, see www.asme.org, the International Society of Automation symbology working group, see www.isa.org/isa5-1/, and many others including for example en.wikipedia.org/wiki/Symbolic_language_(engineering), en.wikipedia.org/wiki/Piping_and_instrumentation_diagram, www.e-drawsoft.com/pfd-symbols.html, www.edrawsoft.com/engineering-diagram-guide.html, https://www.rff.com/process-flow-diagrams.php, instrumentationandcontrol.net/pid-diagram-basics.html, hardhatengineer.com/how-to-read-pid-pefs-drawings/, www.pipingengineer.org, www.conceptdraw.com/How-To-Guide/process-flow-diagram-symbols, and all of which offer online or internet-based symbology and icon search and reference information services.

Operationally informative, illustrative, and exemplary icons such as directional arrows and other related feature and component icons are used only for purposes of example, not for purposes of limitation, such that directions, explicit and implied operational characteristics, and other aspects of operation may be changed according to optionally preferred implementations. In the figures, directional arrows are depicted adjacent to certain data, power, fluids, and gas lines and components of system 100, to generally inform those having knowledge and skill in the technology, of a common, preferred, notional, and or optional direction of data, signals, power, fluid, liquid, and or gas flow about such lines and components of system 100. For further example, check valves 165 are sometimes schematically depicted herein to have fluid input and output lines joined by a "Z"-shaped or labeled valve body, which may include an adjacent arrow depicting a possible, preferred, and or optional direction of fluid flow operation of the check valve 165.

In certain applications, autoclave(s)/extractor(s) 135 are also coupled to one or more manufacturing and process control taps positioned about different locations of extractor/autoclave 135, such as an upper tap 180, an upper middle tap 185, a lower middle tap 190, a lower tap 195, and other similarly configured taps located about other positions of extractor(s) 135. These taps 180, 185, 190, 195 and others incorporate and or are configured to cooperate with various sensors and other components, as described elsewhere herein, to enable manual and or automated real-time testing, monitoring, sampling, feedback signaling, feedforward signaling, and related actions during manufacture of extract products. Such taps may also be utilized in similar ways during testing, configuration, and operation of system 100 and various manufacturing process steps.

Extractor(s)/autoclave(s) 135 also may incorporate one or more access doors AD (FIG. 1) that are positioned and included to facilitate testing, monitoring, servicing, cleaning, loading, and unloading of extractor(s) 135. Although only a single extractor 135 is reflected in the illustration, the disclosure contemplates various other configurations that may include multiple extractors/autoclaves 135 that may be coupled to operate in series for certain types of extraction processes.

Other configurations contemplate multiple extractors 135 arranged to operate in parallel to enable large-scale extraction operations, wherein 2 or 10, or more extractors 135 are utilized. Such large-scale operations may incorporate five, 20, 100, and or hundreds of such extractor(s)/autoclave(s) 135 configured to operate in parallel, each with a respective complement of components and subsystems as depicted in the figures and description. In variations, each of such extractor(s)/autoclave(s) 135 may be arranged to receive a single type of source media M. In other arrangements, each of extractor(s) 135 and or groups of extractor(s)/autoclave(s) 135, receive different types of source media M, to enable real-time manufacture of complex beverage extracts BE, from many types of extraction source media M.

A wide variety of autoclave(s)/extractor(s) 135 is contemplated by configurations of the disclosure. In exemplary system 100, the one or more extractor(s)/autoclave(s) 135 have an internal, cylindrical and cross-sectional diameter dimension ranging approximately between about 25.4 centimeters ("cm") (about 10 inches, "in.") and about 50.8 cm (about 20 in.), or more or less. More preferable, optional configurations contemplate diameters ranging between about 38 cm (about 15 in.) and about 46 cm (about 18 in.).

The disclosure is also directed to extractor(s)/autoclave(s) 135 having a height, that establishes a source extraction media column maximum height, between respective screens of bottom 140 and top 145 ranging approximately between about 152 cm (about 60 in.) and about 241 cm (about 95 in.). Further variations include an optionally preferred height ranging approximately between about 203 cm (about 80 in.) to about 213 cm (about 84 in.), or to be about 208 cm (about 82 in.).

In these configurations of extractor(s)/autoclave(s) 135, internal volumes are established to enable introduction of source media M into extractor by various methods. Typically, a volume of source media M, such as roasted, dry coffee, for example without limitation, is ground into particles of various sizes, referred to herein as a multigrind. Depending upon the amount of desired extract to be eluted, a quantity of source media M is introduced into each autoclave/extractor 135. The quantity utilized in each extractor/autoclave 135 depends upon the number of extractors 135 required, and the desired quantity of beverage extract BE to be manufactured.

For example, while specific quantities and qualities vary according to the type of source media M, the intended beverage extract BE to be manufactured, and many other variables. To manufacture a consumer-ready coffee beverage extract, a notional example may require about 80 kg (about 176 pounds) of roasted, dry, multigrind coffee source media M per 1,000 liters (about 264 gallons) of manufactured beverage extract BE. With these parameters, to manufacture 5,000 liters, about 450 kg of dry multigrind coffee is utilized. If extractor(s)/autoclave(s) 135 are configured to be loaded with about 100 kg of source media, as many as five extractors will be required if the beverage extract is to be manufactured in one batch of about 5,000 liters (about 1,320 gallons).

In modifications for manufacturing 5,000 liters of concentrated beverage extract BE, such as a coffee concentrate, some may prefer to utilize 1,320 kg of roasted, dry, multigrind coffee source media M per 1,000 liters of beverage extract BE. This notional example contemplates 5,000 liters, which in turn requires 6,600 kg (about 14,550 pounds) of source media M, which for extractors 135 each sized to receive 100 kg of source media M per extractor, requires as many as 66 autoclave(s)/extractor(s) 135, or so.

In any such configurations, source media M is loaded and or introduced into extractor(s) 135 to build up the source extraction media column in partial doses or layers. Each dose or layer is packed or tamped at vertical intervals within extractor(s)/autoclave(s) 135, so that each does or layer has a predetermined or preferred density or packed condition, and until the total quantity of media M is introduced and the extract media column reaches its maximum height. Most often, source media M is loaded in a dry or solvent-free condition. The doses or layers are built-up to leave a predetermined amount of unoccupied headspace proximate top 145, which enables expansion of source media M as it expands when saturated with solvent. The disclosure is also directed to other variations that are directed to continuous supply of source media M and continuous extraction of beverage extract BE, as described elsewhere herein.

Further variations contemplate extractor(s)/autoclave(s) 135 configured to be utilized as a test apparatus to enable research and development of various extraction processes on sometimes smaller scales. These arrangements may be configured to have an internal, generally cylindrical inner diameter ranging approximately between about 10 centimeters ("cm") (about 4 inches, "in.") and about 20 cm (about 8 in.), or more or less. The internal dimensions also establish the source media column height in the test apparatus to range approximately between about 90 cm (about 36 in.) and about 120 cm (about 48 in.), or more or less.

One or more gas supply and or pressure control subsystem(s) 200 are included in system 100, and control internal atmospheric inerting, purging, conditioning, and or controlling (e.g., positive and negative pressure) of various components, including for example, extractor(s) 135, fluid and gas communication lines, internal spaces of components and subsystems, and collection vessels and tanks. Subsystem(s) 200 may include pressure sensors P as well as couplings and or taps to external gas supply and evacuation systems. Such taps of subsystem(s) 200 are denoted schematically in the various figures by pipe and connector icons extending from subsystem 200. See. e.g., FIGS. 1 and 2.

The contemplated taps may also be incorporated and coupled to the extractor(s)/autoclave(s) 135, about bottom 140, top 145, and or about other locations of extractor(s) 135. Such gas, pressure, and control subsystems 200 also establish a preferred atmosphere by creating a vacuum or positive pressure and or by supply of preferred gases and additives, and as described further elsewhere herein.

The disclosure contemplates such pressure and control subsystem(s) 200 in one more specific example configured to evacuate, purge, and or pressurize autoclaves(s)/extractor(s) 135 with various gases and additives. In variations, subsystem(s) 200 supply a preferred conditioning gas or vapor or aerosol or other additive, and or an inert gas, such as nitrogen, argon, and other substantially inert gases. This inerting, purging, conditioning, and or controlling capability is utilized by system 100 before and or during operation and manufacturing of beverage extracts (herein also referred to as "BE").

After source media M is loaded either partially or in its entirety, gas, pressure, and control subsystem(s) such as for example subsystem(s) 200, can be utilized to establish a continuous and or a pressure-vacuum cycled atmospheric environment within extractor(s) 135, to enable degassing and outgassing of source media M for preferred periods of time. In these arrangements, in examples where source media M is selected to be roasted, ground coffee, the post-roasting outgas time usually accorded to roasted coffee beans and or ground source media M may be shortened for certain preferred applications.

In further examples, it has been found that roasted, ground coffee source media M, loaded into extractor(s) 135, can be prepared for elution more rapidly, when exposed to an outgassing/degassing vacuum and or pressurization-vacuum cycling over time spans of about 12, 24, or 36 hours, or more or less. Such vacuum arrangements can enable improved outgassing and degassing of ground coffee source media M, which may contain undesirable VOCs and other gases within microscopic interstitial voids and or interstices within the ground coffee particles, which may otherwise remain resistant to outgassing/degassing. During manufacture and collection, elution and processing of beverage extract BE may generate and release certain undesirable gases, vapors, aerosols, and other constituents. The beverage extract BE can benefit from the removal and or replacement of undesirable reactive gases such as oxygen, carbon dioxide, and other substances, with an inert atmosphere formed from one or more generally unreactive, protective, and or inert gases such as helium, nitrogen, argon, and or other protective gases, vapors, aerosols, and the like. Benefits are also contemplated by introduction of various preferred and beneficial aromatic, organoleptic, biocidal, and other desirable substances, as contemplated elsewhere herein.

An actuatable mechanical, electromechanical, acoustic, and or ultrasonic extractor resonator and or vibrator, settling, or similar oscillating or vibrating or agitation device or devices 205 ("V") may be incorporated and mechanically coupled to one or more portions of extractor(s) 135. Such devices are configured to and or can be utilized to settle loaded extract media M, de-bubble media M and extractor(s) 135, and minimize fluid channeling and or media migration during extract manufacturing, and facilitate loading and unloading of media M and cleaning and servicing of extractor(s) 135, among other benefits.

Extractor(s) 135 also may be thermodynamically coupled to one or more heat exchangers and or thermal management subsystems 210 (FIG. 2, depicted as coupled to illustrative cross-hatched heat exchange elements about external and or internal vertical sidewalls of extractor 135(s)). Such heat exchangers are configured and operable to maintain, add, and remove thermal energy from extractor 135(s) and media M during extract manufacturing, cleaning, servicing, calibration, and other operations.

The contemplated heat exchangers and thermal management subsystems 210 may be further coupled to internal and external components integrated about and within extractor(s) 135 to enable precision and rapid thermal control of extract solvent and media during extract manufacturing, and may further include internal and external pipes, coils, vanes, and other thermal exchange components. Such precision thermal controls enabled by the contemplated heat exchangers further enable precision media conditioning, improved media outgassing and atmospheric inerting and conditioning, and precise maintenance of temperature, as well as rapid, automatically induced temperature changes responsive to extract manufacturing control parameters that may change in real-time during operation of extractor(s) 135.

In certain applications of system 100, extractor solvent/fluid supply line 150 is coupled to a supply fluid or solvent subsystem that may incorporate a number of devices and components, and may be coupled to an external fluid supply source ES, such as an external municipal, well, or other fluid or water source or supply system. For example, when a storage tank, artesian well, commercial, industrial, municipal, and or other water source is/are utilized, a holding or solvent supply tank SST may be incorporated to receive and store solvent during periods of time when costs are lower, to optimize purchasing costs.

For added example, some municipal water systems have been known to increase prices during high-demand, peak usage time periods, and to lower prices for consumption during off-peak time periods. For other types of solvents, purchase costs can be managed by buying solvent in bulk amounts to enable more preferable pricing and possibly lower costs. Consequently, in all such circumstances, incorporating a tank SST can in some circumstances enable improved solvent cost controls and or optimization.

System 100 may further optionally include a solvent or water monitoring and demineralizer, mineralizer, softener, and or treatment subsystem 215, which can be coupled downstream to tank SST and in any suitable arrangement or order. The contemplated subsystem 215 may be further configured to adjust alkalinity, acidity, hardness, softness, and or dissolved solids of solvents and or water that may utilized by system 100, to remove, add, and or adjust such parameters according to a preferred configuration of the solvent. The disclosure is also directed to various types of monitoring and filtration systems and or subsystems, which may include for example without limitation, a media-type filter or filtration subsystem 220, and or a reverse osmosis subsystem 225. Each such component may be configured and or selected to filter and or capture substances that may be suspended, mixed, emulsified, and or otherwise entrained in the supply solvent.

Fine and superfine filters or filtration systems and devices 230, 235 may also be incorporated, which may be further configured to filter and or capture solvent constituents that are smaller and or different than those filtered and or captured by subsystem(s) 220, such as for example without limitation, bacteriological, viral, and or other constituents carried in the solvent. System 100 may further include a deionization device 240, an ultraviolet or UV sterilization system 245, and related systems and subsystems that can further treat, adjust, and modify properties of the solvent and or water utilized by system 100.

In some arrangements, the solvent may be delivered under nominal supply pressure(s) from the various types of sources, such as a municipal or industrial supply source. System 100 also contemplates precision, pressurized, and or hydraulic delivery of the solvent, and can incorporate one or more precision peristaltic, diaphragm, piston, and other types of precision pumps or similarly capable precision supply and fluid flow/pressure metering solvent supply subsystem(s) 250. In variations, such precision solvent delivery subsystem(s) 250 are configured to adjust the flow and or pressure of delivered solvent per unit time during operation of system 100.

More preferably, peristaltic and or screw-type pumps are preferred to prevent hydraulic shock from being introduced into system 100. In some arrangements of the disclosure, such precision pumps can also include pressure and flow rate hydraulic shock dampers that can accept pressure waves or shocks from such pumps, while delivering a constant pressure and flow rate to downstream components of system 100.

A heat exchanger device and or thermal management subsystem 255 may also be incorporated about one or more positions in system 100 to precisely control the temperature of the source or solvent fluid supply as needed throughout the components and subsystems of system 100.

With continued reference to FIGS. 1 and 2, system 100 also includes a beverage extract effluent and solution processing subsystem or respective subsystems, which is/are coupled to and in fluid communication with respective extractor(s) 135. For example, a heat exchanger and or thermal management subsystem 260 is optionally thermodynamically coupled to beverage extract effluent/solution line 155 to cool or heat the beverage extract/solution BE during operation, which can be especially beneficial in some applications. One or more such heat exchangers and thermal management subsystems 260 may be positioned in other locations and may be configured to be controllable independently of and or in cooperation with other thermal management and control subsystems such as subsystems 210, 255, and others.

In the arrangements of system 100 of the disclosure, it can sometimes be beneficial to and improve the quality and or desirability of the beverage extract BE to remove, add, and adjust certain dissolved, dispersed, and entrained gases that affect aromatic, flavor, organoleptic, and or other characteristics of the beverage extract or solution. For example, in applications that generate beverage extract effluents or solutions BEs that incorporate dissolved, entrained, and or dispersed gases, it may be useful to include in system 100 a liquid "L"/gas "G" separator or separation subsystem 265, which can separate, capture, remove, and or otherwise adjust gases from and within the beverage extract or solution BE.

Separator subsystem 265 may be coupled upstream and or downstream from, and or in combination with thermal management/heat exchanger subsystem 260 or other components of system 100. Separator subsystem 265 may further include and or be coupled to one or more fluid and or gas taps 270, a gas "G" effluent line 275, and or a separator fluid or liquid "L" effluent line 280, among other components. Separator tap or taps 270 enable capture and or removal of liquid and or gas that has been separated from the beverage extract BE, and also enable testing, monitoring, and or sampling of the beverage extract BE, during manufacture and operation of system 100.

In other examples and implementations of system 100, beverage extracts BEs may benefit from the adjustment, conditioning, and or control of aromatic, flavor, and organoleptic aspects of, and or inerting of the internal atmosphere adjacent to beverage extracts BE. This is accomplished in one variation by creating a vacuum and or by purging undesired gases and gas-borne substances from internal lines, components, and volumes of system 100, and supplying an inert gas or other gas-borne substance selected to protect beverage extract BE during processing and manufacture. Accordingly, it may be preferred to incorporate liquid/gas infusion and or mixing subsystem 285 downstream from separator 265, to receive, store, dispose of, dispense, and or utilize externally supplied liquids and gases, as well as one or more of the gases and or liquids received from separator subsystem 265.

The liquid/gas infusion and or mixing subsystem or mixer 285 may be coupled to external sources and the separator 265, and other components of system 100, to enable these capabilities. For example, it may be preferred to reintroduce desirable aromatic volatile organic compounds (VOCs) into the beverage extract BE that are removed by separator 265, and or which may be available from other sources in system 100 or externally. Such may be introduced by another mixer tap or taps 290, which may be coupled to separator subsystem 265. Such taps 290 may also be utilized to manually and or automatically test and sample mixed beverage extract after mixing and processing.

For example, mixer or mixing subsystem 285 may also be coupled to a separate gas/liquid ("GAS/LIQ", FIG. 1; "G/L", FIG. 2) supply and or pressure subsystem or subsystems 295. Gas/liquid subsystem 295 may receive, store, dispose of, and dispense gas and liquid from separator and or mixer subsystems 265, 285, and or from other sources. Gas/liquid subsystem 295 is also configured to establish the contemplated inert, controlled, and or conditioned atmosphere "A" (FIG. 2) in combination with other components and subsystems, by creating a vacuum or positive pressure, and as explained previously by purging and or by supplying inerting, purging gases and liquids, and conditioning additives.

Subsystem 295 may include various taps, ports, valves, manifolds, solenoids, WAPs 120 and other network connections, and couplings to other components of system 100 in addition to those depicted in the figures. Subsystem 295 also utilizes inert gases such as nitrogen or argon or other preferred gas to purge internal lines and volumes. In variations, gas/liquid subsystem 295 supplies and infuses into components of system 100 and manufactured beverage extract BE, one or more free radical and oxygen scavenging, antioxidants, nutraceuticals, botanicals, and or aromatic gases and additives to control, enhance, and or adjust the aroma, flavor, taste, organoleptics, quality, and or other properties of the eluted beverage extract BE.

In further modifications, gas/liquid subsystem 295 is further configured to introduce, infuse, and or mix various types of stabilizers, preservatives, and or other preferred or desirable constituents into the liquid beverage extract BE during processing and operation of system 100. This enables improved post-extraction, downstream BE mixture stability, and antimicrobial and anti-oxidative or reduced oxidative stress benefits. In certain variations, gas/liquid subsystem 295 is further adapted to introduce and or infuse natural and or botanical stabilizers, antioxidants, and or free radical scavenging compounds into beverage extract BE. Such may include, for example, a beverage extract compatible substance, such as rosemary oil extract (also often referred to by those skilled in the relevant fields of technology as *Rosmarinus officinalis*), and other similarly bioactive substances.

Mixing subsystem 285 may also incorporate one or more automated and manual beverage extract taps 300, and various sensors and automated controls and WAPs 120, which further enable capture, conditioning, testing, monitoring, and or sampling of the beverage extract BE. These enable such capabilities before, during, and after gas is introduced, reintroduced, dissolved, dispersed, entrained, and or mixed into the fluid or liquid beverage extract or solution BE during manufacture and system operation.

System 100 is also directed to one or more beverage extract manifold supply lines 305 coupled with at least one extraction manifold 310 that is coupled to one or more of the other described elements and components of system 100. For example, manifold 310 may be coupled directly to extractor 135, and or also to separation and or mixing subsystems 265, 285, gas/liquid subsystem 295, and or other components of system 100.

In various arrangements, extraction manifold 310 includes at least one actuatable extract or solution effluent lumen or line 315, which may be repositionable and or movable, and or one or more actuatable lumens 315, which lumens 315 are in fluid communication with one or more beverage extract/solution collection subsystems 320. Subsystems 320 further incorporate various automated and real-time operable WAPs, solenoids, valves, taps, sensors, and couplings to other components of system 100, to enable automated monitoring, control, and operations.

Collection subsystem(s) 320 includes one or more or a plurality of separate collection vessels, such as vessels 325, 330, 335, and or others. Each of such vessels also incorporates various sensors, WAPs, solenoids, valves, and couplings to other components for automated control, monitoring, and operation. As reflected in the various figures, and specifically for example FIGS. 1 and 2, such vessels for purposes of illustration without limitation may be numbered 1, 2, 3, . . . "N-1", and up to some preferred number of "N" separate vessels. Herein the reference letter "N" represents some predetermined, total number of the plurality of separate collection vessels and "(N-1)" refers to the second to last one of such plurality of vessels.

These vessels 325, 330, 335 can include, for example, at least one first collection vessel 325, numbered in the figures for further reference as Arabic numeral "1", subsequent and or intermediate collection vessels 330, also labeled "2", "3", "(N-1)", and at least one tail collection vessel 335 also labeled "N". Such exemplary separate collection vessels may be received within, incorporated about, and or held or supported by the beverage extract BE portion or fraction collection subsystem 320. During manufacture and operation, wherein system 100 manufactures the BE, the lumens 315 of the extraction manifold 310 are moved and or actuated by valves whereby each of the separate collection vessels 325, 330, 335 receive, collect, and or capture a respective fraction of the BE during a predetermined time period and or span of time.

Any and or all of such separate collection vessels 325, 330, 335 may be coupled with the gas/liquid control subsystem 295, which may operate independently and in cooperation with other components such as subsystem 200, MCS 105, CSs 110, separator and mixer subsystems 265, 285, and or other components of system 100. As with other subsystems herein, gas/liquid control subsystem 295 is configured such that collected beverage extract BE can be eluted in the extractor(s)/autoclave(s) 135, processed through various components, and or degassed, collected during manufacture in a preferred gaseous environment. More preferably, beverage extract BE is optionally collected under an inert atmosphere "A" (FIG. 2, see e.g., vessels 325, 330, 335, BET 345), and may be infused with one or more preferred gases, VOCs, additives, and or may be collected in a low-pressure or vacuum environment.

System 100 is also directed to configurations of collection subsystem 320, separator subsystem 265, mixing subsystem 285, gas/liquid supply/pressure subsystems 295, manifold 310, and other system components and or other sources in various arrangements to further enable adjustment of headspace and gas content of manufactured and collected beverage extracts BEs in various new ways. As contemplated herein, headspace refers to any gaseous or non-liquid-filled volume in contact with the beverage extractor during elution and processing.

In optional arrangements, the gas/liquid control subsystem 295 may be coupled with manifold 310 and or other elements of collection subsystem 320, and be further configured to evacuate and or flush a headspace to establish a preferred and or inert atmosphere "A" in each of the separate collection vessels. As noted elsewhere herein, gas/liquid control subsystem 295 enables inerting, conditioning, and control, including establishing positive pressure, a vacuum, and introducing an aromatically active gas or vapor, an inert gas (e.g. nitrogen, etc.), gas-borne bioactives, antioxidants, and or others, and combinations thereof. These configurations can, for further example, limit and or prevent exposure of beverage extracts BEs collected in the vessels, to undesired gases or substances, such as for example without limitation free atmospheric dust, oxygen, and or carbon dioxide, and or other undesirable by-product gases that may arise from manufacturing and processing.

In further variations, gas supply subsystem(s) 200, 295, and others subsystems may be further configured to introduce, mix, dissolve, disperse, and or entrain one or more gases into the eluted, manufactured, and collected beverage extract BE. This enables or establishes the inert atmosphere "A", and adjustments to aromatics, flavor, organoleptics, and other characteristics of beverage extract BE, during manufacturing and operation of system 100.

System 100 may also incorporate one or more and or at least one BE fraction or BE portion/fraction mixing subsystem(s) 340, coupled to and in fluid communication with various system components. Such coupled components of system 100 include for example one or more of separator subsystem 265, mixing subsystem 285, gas supply/pressure/control subsystem 295, extract manifold 310, collection subsystem 320, and or each of one or more of separate collection vessels 325, 330, 335, and beverage extract mixture storage tank "BET" 345.

As with other components of system 100, fraction mixing subsystem(s) 340 include integrated solenoids, valves, taps, sensors, WAPs, and other components to enable automated and real-time control, monitoring, and operation, and may include couplings to other components such as for example liquid/gas separator 265, gas/liquid control subsystem 295, and others.

Once the beverage extracts BEs are collected, they may be stored in gas, pressure, aromatic, and temperature controlled and or conditioned environments established within BET 345, and within other components of system 100. Such conditioned and or controlled environments vacuum, low-pressure, pressurized, and or inert atmosphere "A", and dispensed therefrom for use, distribution, sale, and or as feedstock for other processes and products downstream of system 100. The contemplated atmosphere "A" may also be conditioned and or saturated with aromatically, organoleptically, and or free radical and oxygen scavenging additives, which may include constituents separated from eluted solvent during processing, as well as other additives.

The at least one BE collected fraction and or BE portion mixing subsystem(s) 340 is/are configured to mix fractions or portions of manufactured/collected BEs into preferred mixtures to achieve new and novel, mixed beverage extracts BEs. Such contemplated BEs are thereby enabled to have heretofore unavailable but long-desired flavor, aromatic, and organoleptic preserved or enhanced characteristics and properties, which arise from and are a function of the specifically blended partial volumes of selected BE portions and or collected BE fractions, and the conditioned and or controlled internal atmosphere of system 100.

Each of the subsystems and components of system 100 may further be thermodynamically coupled with a thermal management subsystem/heat exchanger 350, which may be independently operable and or coupled with and or part of other thermal management subsystems 210, 255, 260 and MCS 105 and CSs 110. As a further example, thermal management subsystem 350 controls the temperature of one or more of the extraction manifold 310, the extracted BE portions or collected fractions of beverage extract BE, which are contained in separate vessels 325, 330, 335, mixing subsystem 340, and or BET 345, among other components.

Further variations of the disclosure also include one or more taps 353, having respective automated, solenoid-controlled, and or manual valves 400, each of which may be in communication with network 115 via various wired and wireless access points 120. Also contemplated are mixing subsystem MX 340 and or beverage extract tank or subsystem BET 345 incorporating and or in communication with various real-time, automated sensors, solenoids, valves, taps, ports, WAPs 120 and other network connections, and couplings to other components of system 100. These features enable further automated and real-time monitoring, control, and operation of subsystems 340, 345, among other capabilities. In modifications, MX 340 and BET 345 are also coupled to gas/liquid supply system 295, among other components.

With continuing reference to the FIGS. 1 and 2, and now also to FIGS. 3, 4, 5, and 6, lumens 315 are moved and or valve-actuated to communicate various portions and fractions to the separate collection vessels 325, 330, 335. A first BE portion or portions 390 and or collected fraction 355 of the BE during a first time span "FTS" 360, is/are collected in the at least one first separate vessel 325. Subsequent and or intermediate BE portions 390 and or collected fractions 365 are collected during respective subsequent or intermediate time spans "STSs" 370, and are collected in respective intermediate/subsequent vessels 330. A tail and or final BE portion or portions 390 and or collected fraction 375 of the BE is/are collected during a tail or final time span "TTS" 380, collected in the at least one separate tail vessel 335.

As contemplated by the disclosure, use of the term "BE portion" is intended to reflect volumes of beverage extract that may be extracted during elution and which may form a part of a single collected fraction 355, 365, 375, but which may span more than one such fraction. For example, any particular BE portion 390 may have a volume that is either entirely part of a single such collected fraction 355, 365, 375. In alternative applications, particular BE portions 390 may be part of two different but fractions collected sequentially and or proximate in time (during a contiguous or adjacent time span), wherein part of the BE portion 390 is collected in one such fraction while a remainder is collected in and or as part of another immediately precedent or subsequently collected fraction.

In contrast, use of the term "collected fraction," while flexible in interpretation for various applications of the disclosure, refers to collected beverage extract that may include one or more such BE portions 390. Explained differently, BE portions 390 may span more than one volume of collected fractions, while collected fractions 355, 365, 375 may incorporate one or more BE portion volumes 390.

Figure 4:
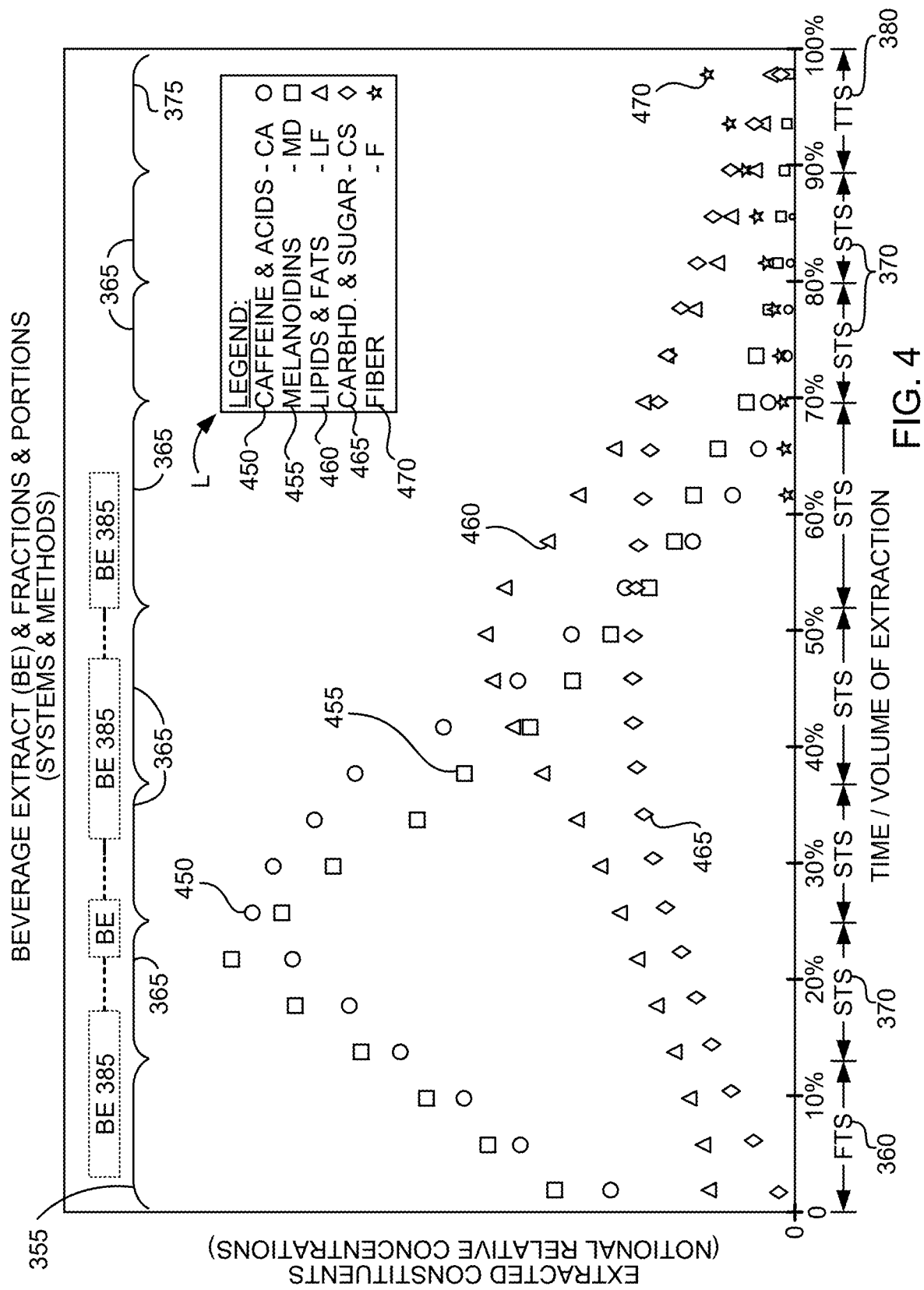
FIG. 4 includes notional and exemplary additional details of the beverage extracts according to FIG. 3, and the supporting disclosure and other prior figures.

In FIGS. 3 and 4, an initial example is described wherein first collected BE fraction 355 is graphically represented by horizontal brace line labeled 355 that is positioned in FIG. 3 above several vertical dotted-line, rectangular bars that represent BE portions (labeled 390). BE fractions 355 also spans FTS 360, which is graphically represented adjacent the lower horizontal axis, and which is labeled by reference numeral 360.

Other aspects of FIGS. 3, 4, 5, and 6 are described in more detail below. The BE portions labeled 390 are depicted generally as dotted-line, rectangular, vertical bars that are arranged adjacently from left to right, and which notionally illustrate and represent volumes or quantities of the manufactured beverage extract BE, which are collected into the separate vessels 325, 330, 335 as collected BE fractions 355, 365, 375. The height of each of the vertical, rectangular, dotted-line bars is intended to notionally represent the total dissolved solids TDS or degrees Brix of the BE portions.

As the respective total TDS of each BE portion changes from moment to moment and from one BE portion to another, the height of the respective vertical bar changes accordingly. Further, various constituents of the TDS of certain extracts will separately rise and fall during elution of beverage extract BE, which is notionally depicted as relative concentrations in FIGS. 4 and 6, Here FIG. 4 corresponds generally to FIG. 3, while FIG. 6 corresponds generally to FIG. 5. In some applications of system 100, such as in manufacturing of coffee and concentrated coffee beverage extracts BE, such notional relative concentrations of certain constituents typically rise and fall at different times and in different amounts during collection of initial portions and fractions of eluted extract, which is graphically depicted for different examples generally in FIGS. 4 and 6.

Figure 5:
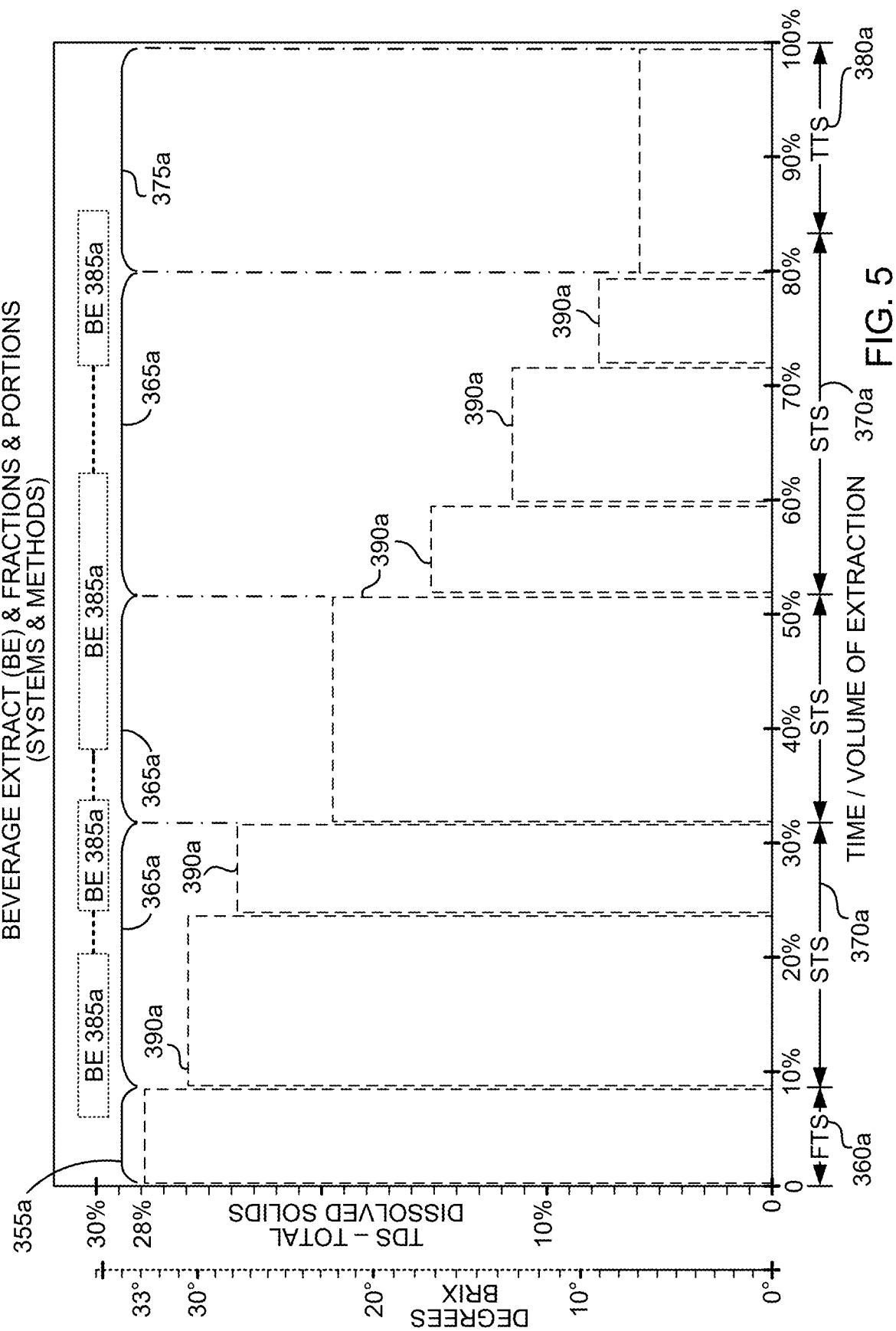
FIG. 5 is directed to yet further examples of beverage extracts according the disclosure and previous illustrations, and includes other possibly preferred arrangements of the extracts enabled herein.

In possibly preferred modifications, the first and subsequent, intermediate, and or tail time spans 360, 370, 380 are defined by and or have start and stop times, which are graphically represented in FIGS. 3 and 5 by the respective left and right vertical sides of the dotted-line bars depicting each BE portion 390. In further examples, start and stop times and resultant, respective time spans 360, 370, 380, are each established automatically in real-time by one or more of the MCS 105, CSs 110, which operate cooperatively with the various sensors of system 100, during extraction of the BE portions 390 and collection of the BE fractions 355, 365, 375.

The start and stop times are also established as a function of various parameters, properties, and characteristics of respective, eluted and collected beverage extract BE. Such various parameters, properties, and characteristics include, for example, TDS %, refractive index (° Brix), temperature, pH, concentration, colorimetry absorbance, colormetrics, conductivity, density, specific gravity, and others. These parameters, properties, and characteristics are detected and measured by the contemplated sensors and or measured in real-time from samples automatically taken from taps 180, 185, 190, 195, 270, 290, 300, or others. Real-time in this sense means while solvent moves through extractor 135, eluting extracted BE that becomes downstream portions 390, and or collected fractions 355, 365, 375.

In additionally illustrative examples, each of the contemplated, respective start and stop times are adjusted, established by, and or correlated to real-time measurement of respective properties, characteristics, and or parameters of the eluting solvent, BE portions 390, and collected fractions 355, 365, 375. For purposes of a further specific example without limitation, the noted start and stop times are established as a function of predetermined refractive indices (e.g. in° Bx), TDSs, colorimetry absorbance, and other parameters.

Such parameters are measured, assessed, and monitored in real-time and automatically by various sensors of system 100 for the eluting solvent as it flows through extractor 135, and other components of system 100. These parameters are also sensed periodically and or continuously for BE portions 390 flowing through separator and mixer subsystems 265, 285, and for collected BE fractions 355, 365, 375, in real-time, and during elution and collection vessels 325, 330, 335, and subsequent mixing subsystem(s) 355 and BET 345, among subsystems.

In these ways, each BE portion 390 and collected BE fraction 355, 365, 375 is collected in a respective vessel 325, 330, 335 during the contemplated start-stop-time-defined span, and to have that target respective, resultant refractive index, TDS, colorimetry absorbance, and or other preferred or targeted properties, characteristics, and or parameters. System 100 and its various components and capabilities enables extraction of the BE portions 390 and collection of each fraction 355, 365, 375 during established, respective time spans.

Among other conditions of system 100, portion and fraction collection during such time spans 360, 370, 380, establishes resultant properties, characteristics, and or parameters of each of the BE portions 390 and collected fractions 355, 365, 375. In this way, the parameters for a specific such BE portion 390 and or fraction 355, 365, 375 is controlled to be precisely or approximately equal, unequal, similar, dissimilar, different, as may be preferred, relative to the parameters of other portions 390 and fractions 355, 365, 375.

In other specific examples of the disclosure, BE portions 390 are collected in subsequent fractions of the plurality that include the intermediate fraction(s) 365, as well as the tail fraction 375. In this example, the tail fraction 375 is collected during TTS 380, to have a preferred tail refractive index, TDS, colorimetry absorbance, and or other desirable tail properties, characteristics, and or parameters, and combinations thereof.

As with others, the tail properties and parameters are adjusted as a function of TTS 380, which is established by respective start and stop times. The start and stop time are adjusted as a function of preferred tail characteristics and or parameters, which characteristics and parameters are equal, unequal, more than, less than, similar, dissimilar, and or within a preferred range or relative range of other properties and parameters.

In variations of methods of manufacturing of the disclosure, the contemplated real-time sensor measurements of various properties, characteristics, and or parameters during collection of BE portions 390 and collected BE fractions 355, 365, 375 are utilized to establish respective time spans with start and stop times. In other examples, start and stop times are established according to and or as a function of predetermined, preferred properties, characteristics, and or parameters that are pre-established and received from a storage device.

In other adaptations, such start and stop times are established according to and or as a function of properties, characteristics, and or parameters that are automatically determined by MCS 105, CSs 110, and other components of system 100, to be and or to correlate with real-time measurements detected by the various sensors noted elsewhere herein.

Each fraction-collection-time-span is denoted graphically in FIGS. 3 and 5 by the vertical left and right sides of the vertical dotted-line, rectangular bars labeled 390, 390*a*, wherein the left side equates to the start time and the right side equates to the stop time. The start and stop times may be pre-determined, and may also be adjusted in real-time, such that each respective fraction 355, 365, 375 is collected to have the one or more desired, predetermined properties, characteristics, and or parameters.

As the collection start and stop times, and resultant time spans FTS 360, STS 370, TTS 380 are thereby established and or adjusted, each respective first and subsequent collected BE fraction 355, 365 is collected in its respective vessel 325, 335. As collected, each has the respective, appropriate one or more predetermined, preferred characteristics and parameters, such as respective preferred TDSs, refractive indices, concentrations, pHs, colorimetric, colorimetry absorbance, and other properties and parameters, and combinations thereof.

In still other exemplary configurations, the apparatus of system 100 and related methods of manufacturing BE portions 390 and collected BE fractions 355, 365 also contemplate first and subsequent collected fractions 355, 365 being collected over respective, established time spans to have at least one or one or more optionally preferred properties and or parameters. Such properties and parameters may include, in this illustrative modification, a preferred refractive index, a TDS, a volume, a colorimetry absorbance, and other properties and parameters.

For applications of system 100 and its related methods directed to manufacture of concentrated coffee beverage extracts BE, exemplary first fractions 355, 355*a* may have a first volume collected over a first time span FTS 360, 360*a* to have a refractive index exceeding about 25.0° Brix, and a corresponding TDS exceeding about 21.2%. Such notional and or exemplary parameters and properties may be predetermined and or selected automatically by components of system 100 for various types of source media M, processing configurations, and desired types of beverage extracts BE.

This first time span FTS 360, 360*a* is adjusted with start and stop times further established as a function of predetermined and or detected properties and parameters. Other modifications contemplate the first fraction 355 having a first volume collected over first time span FTS 360, 360*a* adjusted with start and stop times to have a refractive index exceeding about 24.9° Brix, and a corresponding TDS exceeding about 21.1%.

In other variations, the first fraction 355 refractive index ranges approximately between about 23.0° Brix and about 33.0° Brix, or with a corresponding TDS ranging approximately between about 19.5% and about 28.1%, wherein "about" and "approximately" is intended to refer to a tolerance of +/−1% of these recited values. In other arrangements, "about" and "approximately" refers to a higher tolerance of +/−2% to 5% depending upon precision of measurement equipment, predetermined quality standards established for a particular application, and other considerations. These contemplated tolerances are applicable in other examples wherein "about" and "approximately" are utilized.

As with other examples, the first time span FTS 360 may be established by start and stop times that are established as a function of various measured properties, characteristics, and or parameters which are correlated to predetermined or preferred values for the particular beverage extract being manufactured. Similarly, the subsequent, or intermediate and tail BE portions 390 and collected fractions, 365, 375, relative to the first BE portions 390 and first collected fraction 355 and other fractions 365, may have respective equal, unequal, and varying time spans, refractive indices, TDSs, volumes, colorimetric/colorimetry absorbance, and other possibly preferred properties, characteristics, and or parameters.

In each of these exemplary illustrations and examples of the disclosure, system 100 is configured wherein MCS 105, CSs 110, and other components thereof enable automated utilization and implementation of the contemplated start-stop times and respective, resultant time spans FTS 360, STS 370, TTS, 380. Such start and stop times and resultant properties and parameters are achieved by operation of the solvent processing subsystems, pump 250, gas and thermal management and control systems, valves 400 (as described elsewhere herein), and other components thereof. In this way, solvent elution through extractor 135 is precisely controlled, as is subsequent processing of BE portions 390, 390*a* in separator and mixer 265, 285, extract fraction collection subsystem 320, and in blending and mixing subsystem 340.

In variations of the disclosure, portions and or all of one or more of the collected beverage extract fractions 355, 365, 375 may have their respective headspace and or gases contained therein controlled and adjusted by gas supply/pressure/control subsystem 295, and be temperature adjusted by thermal management subsystem 350. Thereafter, one or more of the collected fractions 355, 365, 375 may then be communicated and or supplied to mixing subsystem 340, which mixes certain amounts of each of the collected fractions and or portions thereof and stores beverage extract mixture 385 in BET 345. There too, mixing subsystem 340 and or BET 345 may be further configured to similarly modify gas headspace and content of BE mixture 385.

As a further example for illustration without limitation, BE mixture 385 may be formed from BE portions 390 according to a mixing protocol that may be graphically represented by the horizontal dotted lines boxes appearing along the top edge of FIGS. 3 and 4 (and in corresponding examples of FIGS. 5 and 6) above curved brace lines labeled 355, 365, 375. In each of such arrangements of system 100, each of BE fractions or portions 390 are extracted from media M in extractor(s) 135, and are subsequently modified and adjusted by thermal subsystem 260 and separator and mixing subsystems 265, 285.

Thereafter, over varying time spans, collection subsystem 320 captures respective first, intermediate, and tail fractions 355, 365, 375, in the respective separate vessels 325, 330, 335. Those skilled in the related fields of technology of the disclosure may comprehend that the BE portions 390 and or collected fractions 355, 365, 375 may be utilized in whole and or in part to be mixed and to generate BE mixture 385.

Figure 6:
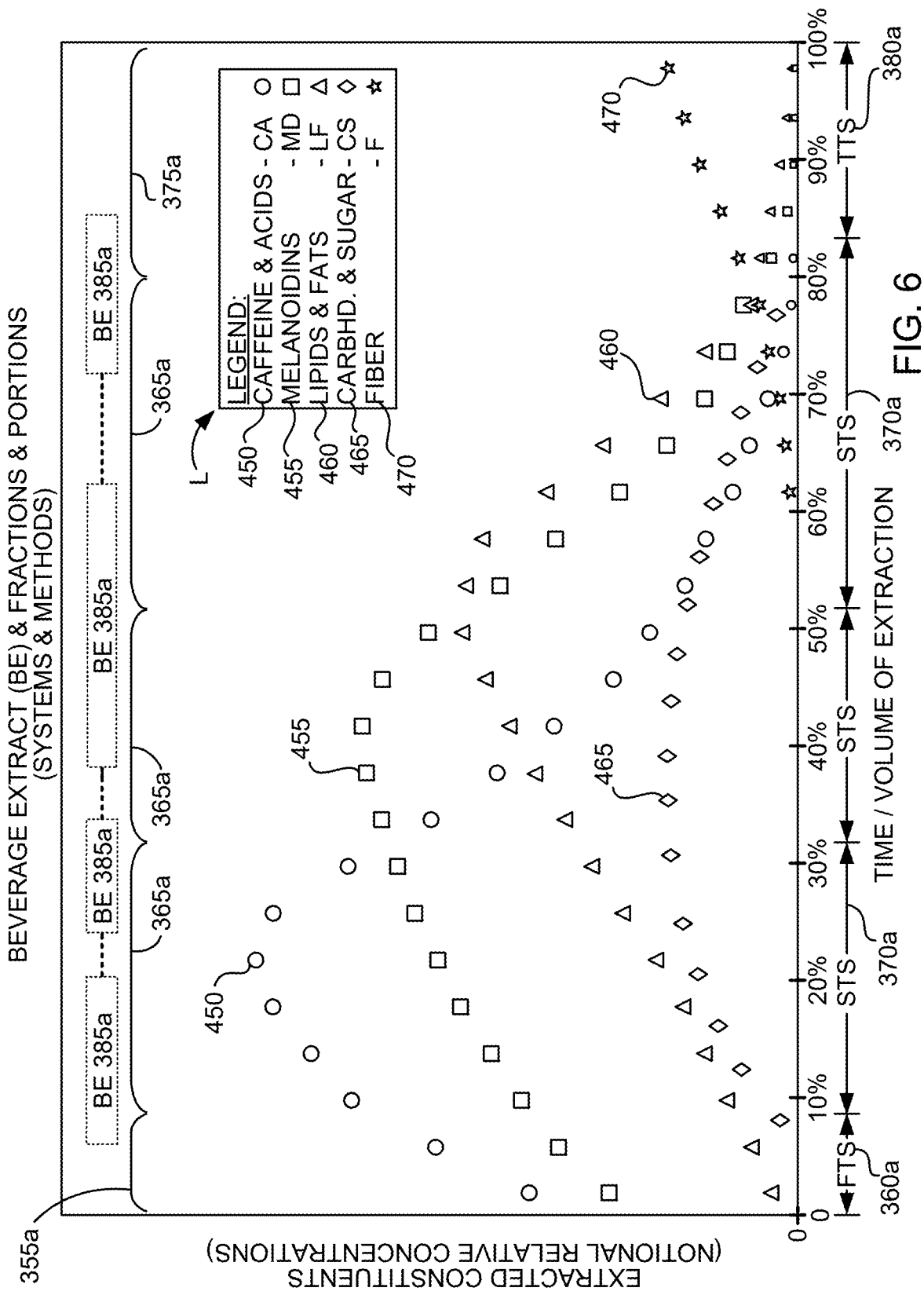
FIG. 6 includes additional notional aspects of FIG. 5 and according to the disclosure and other preceding figures.

These features and capabilities of system 100 as illustrated in FIGS. 3 and 4 are also depicted in FIGS. 5 and 6 in modified arrangements of the manufacturing and operation of system 100. Here, graphical representations depict each of BE fractions or portions 390*a* as extracted from media M, and as modified and adjusted by other subsystems 260, 265, 285, 295, and collected by subsystem 320 into separate vessels 325, 330, 335. Different manufactured BE portions 390*a* are extracted from media M, during FTS 360*a*, STSs 370*a*, and TTS 380*a*, in the form of volumes collected as BE fractions 355*a*, 365*a*, 375*a*, which are collected in respective separate vessels 325, 330, 335. Thereafter, BE mixture 385*a* is manufactured mixed therefrom by fraction blending and mixing subsystem 340, and captured in BET 345.

In exemplary configurations, and for purposes of example without limitation, BE mixtures 385, 385*a* are blended and mixed utilizing various components of system 100, including fraction mixing subsystem 340, by combining BE portions 390, 390*a* from one or more collected, manufactured beverage extract fractions 355, 355*a*, 365, 365*a*, 375, 375*a*. In a notional example, optionally preferred portions and fractions are automatically identified by system 100 to assess suitability for use in manufacturing BE mixture 385, 385*a*, utilizing the variously described sensors that are coupled to fraction collection subsystem 320 and vessels 325, 330, 335. System 100 identifies collected portions and or fraction having predetermined and or desired properties, characteristics, and or parameters, to enable the quantities of portions and or fractions needed to enable the contemplated blending and or mixing.

As described elsewhere herein, collected first extract fraction 355, 355*a* will be detected by system 100 to have a desired refractive index in degrees Brix and a corresponding TDS %, as well as other preferred properties and parameters. Similarly, also automatically identified by system 100 are subsequent, intermediate collected extract fractions 365, 365*a* that have respective, desired properties and parameters, such as refractive indices (° Brix) and corresponding TDS % s, and other respective sensed properties and parameters. System 100 detects and assesses the properties and parameters of collected tail fraction 375, 375*a*, to discern whether its respective properties and parameters are suitable for use in manufacturing BE mixture 385, 385*a*.

System 100 by it various control systems 105, 110 operates the various valves and components to dispense, blend, mix, and or combine into BET 345 various amounts of the portions 390, 390*a*, and fractions 355, 355*a*, 365, 365*a*, 375, 375*a*, to manufacture BE mixture 385, 385*a* to have desired properties and parameters resultant from blending and mixing. Such resultant characteristics, properties, and parameters may include a refractive index (measured in degrees Brix), TDS %, specific gravity and or density, pH, temperature, conductivity, colorimetry absorbance, and concentrations of certain constituents that impart preferred aromatic and organoleptic characteristics, and other suitable resultant parameters, properties, and characteristics.

In a further specific example, BE mixture 385, 385*a* is manufactured, preferably under an optionally inert and or optionally conditioned atmosphere, to have a resultant refractive index ranging between about 22° Brix and about 26° Brix, or between about 23° Brix and about 25.5° Brix, or about 24° Brix. These variations also may include BE mixture 385, 385*a* to have a resultant TDS % ranging between about 18.7% and about 22.1%, or between about 19.5% and about 21.7%, or about 20.4%.

Modifications contemplate BE mixture 385, 385*a* manufactured to have a resultant density. In one adaptation, the density ranges between about 1.07 and about 1.13 kg/liter (about 8.90 to about 9.40 pounds per gallon), or between about 1.08 and about 1.11 kg/liter (about 9.00 to about 9.30 pounds per gallon), or about 1.10 kg/liter (about 9.15 pounds per gallon), among other resultant properties, characteristics, and parameters. In any of such variations, BE mixture 385, 385*a* may be manufactured including the various portions and fractions, but may further exclude tail or final extract fraction 375, 375*a*. In some applications, such as coffee and coffee concentrate manufacturing, the tail fraction may exclude certain undesirable tail fraction constituents as discussed elsewhere herein.

Although FIGS. 1 through 6 depict only several separate collection vessels, the number of such collection vessels 325, 330, 335 included in system 100 may range between several, to 10, 50, or 100 vessels, or more or less. The total number of separate collection vessels 325, 330, 335, is determined by the precision with which beverage extract BE portions 390, 390*a*, and fractions 355 (355*a*), 365 (365*a*), 375 (375*a*) are to be collected into discrete quantities during operation of system 100. As higher numbers of portions and fractions or smaller discrete quantities thereof are to be collected, so too must the number of separate collection vessels 325, 330, 335 be increased.

For example, in arrangements of system 100 wherein multiple extractor(s)/autoclave(s) 135 communicated eluted extracted to one fraction collection subsystem 320, a higher number of separate collection vessels 325, 330, 335 may be desired. Also, in other arrangements wherein each extractor/autoclave 135 of the plurality communicated eluted beverage extract to a single collection subsystem 320, five, ten, or perhaps as many as 20 or so separate collection vessels 325, 330, 335 may suffice to enable more fractions to be collected during the extraction process.

In any such arrangements of multiple collection vessels 325, 330, 335, typically the first and last such vessels 325, 335, are incorporated with a series of subsequent/intermediate vessels 330 sufficient to satisfy the total number required. For example, if 20 separate collection vessels 325, 330, 335 are required, one first separate collection vessel 325, and one separate tail collection vessel 335, are accompanied by 18 subsequent/intermediate vessels 330. In FIGS. 1 and 2, first separate collection vessel 325 is also labeled "1", and separate tail collection vessel 335 is also labeled "N," which in this example will be labeled "20." The 18 subsequent/intermediate vessels 330 are labeled in FIGS. 1 and 2 in part as "2" and "3", and in actual practice will also include additional vessels 330 labeled from "4" up to "N-1", with "N-1" actually being labeled "19", since in this example "N" equals 20 and "N-1" therefore equals 19.

The disclosure further contemplates separate collection vessels 325, 330, 335 to have internal collection volumes that may be identical or different from vessel to vessel for various applications. In applications wherein lower volume test extractor(s)/autoclave(s) 135 are utilized to manufacture between about several to about 60 liters or so (between about one to about 15 gallons), of beverage extract BE, system 100 may in one notional example incorporate five separate collection vessels 325, 330, 335.

Here, each vessel (if having identical volumes) can have a portion or fraction collection volume ranging respectively between at least one liter (about 0.25 gallons) and about 12 liters (about 3 gallons), or so. If a finer resolution of the characteristics, parameters, and properties of the collected portions or fractions 390, 390*a*, and fractions 355 (355*a*), 365 (365*a*), 375 (375*a*) is required, collecting smaller, discrete volumes of the portions and fractions is possible if a greater number of separate collection vessels 325, 330, 335 is utilized.

In this notional example, ten collection vessels 325, 330, 335 can be incorporated, and these vessels can be selected to have smaller collection volumes. Such finer resolutions or smaller collected volumes can enable more precise control by fraction blending/mixing subsystem 340 of the properties, characteristics, and parameters of the manufactured BE 385. As described elsewhere herein, The aromatic, organoleptic, and other properties of BE 385 can be adjusted by blending and mixing only certain quantities of collected beverage extract BE portions 390, 390a, and fractions 355 (355a), 365 (365a), 375 (375a), from separate collection vessels 325, 330, 335.

Moreover, for large-scale production runs utilizing thousands of kilograms or pounds of source media, to manufacture large volumes of beverage extract, many types of process control anomalies can be obviated, wherein undesirable, discrete, collected portions or fractions can be excluded from the blended/mixed beverage extract 385.

In further examples based upon those contemplated elsewhere herein, the large-scale, continuous or batch manufacture of 5,000 liters (about 1,320 gallons) or so of concentrated coffee extracts, some applications require approximately 6,600 kg (about 14,550 pounds) of coffee grounds source media M, and about 66 autoclave(s)/extractor(s) 135. If such a configuration is arranged with 66 extractor(s) operating in parallel, each extractor/autoclave will elute about 76 liters (about 20 gallons) of beverage extract BE.

If each extractor 135 in this exemplary variation notionally incorporates five separate collection vessels 325, 330, 335, then each vessel will be sized to collect about 16 liters (about 4 gallons). In other notional arrangements, groups of five extractor(s)/autoclave(s) 135 are coupled to a single fraction collection subsystem 320 that incorporates ten separate collection vessels 325, 330, 335. Here, 14 fraction collection subsystems 320 are required, and each will receive about 358 liters (about 95 gallons), such that each of the ten collection vessels in each subsystem 320 may receive 36 liters (about 9.5 gallons), assuming each vessel collects similar volumes of beverage extract BE.

Provided however, these exemplars imply that each collection vessel 325, 330, 335 is sized identically, which is not required. Varying sizes may be employed. Similarly, larger sized collected vessels may be incorporated, and collected portions 390, 390a, and fractions 355 (355a), 365 (365a), 375 (375a), may be automatically adjusted in real-time from one vessel to the next, and discretely collected in varying volumes such that each vessel may have received different volumes of manufactured beverage extract BE. Many other arrangements of extractors/autoclaves and vessels sizes are contemplated by the disclosure.

With continuing reference to FIGS. 3, 4, 5, and 6, and also again to FIGS. 1 and 2, system 100 also incorporates various components such as solenoid, pressure, and computer controlled valves and similar components flow and process control components. For example, such components are each and all networked, in communication with, and or electronically coupled, by one or more of network 115 and WAPs 120, to one or more master and subsystem control systems/controllers/hardware processors MCSs 105, CSs 110.

Such components also communicate various control/data signals CS 125 and other signals 130, which may be automatically, real-time measurements and sensed process control data, about the network 115. Such valves include many types of actuatable valves 400, which may be configured to be automatically and or manually operated, and may be further pressure controlled, temperature controlled, solenoid controlled, and combinations thereof. In all contemplated configurations, collection of BE portions 390, 390a, collected as first, intermediate, and tail fractions 355 (355a), 365 (365a), 375 (375a), is controllable by operation of the valves 400 and other similar components.

In these arrangements, processors, controllers, and or control systems 105, 110, and networks and WAPs 115, 120 cooperatively manage and control system 100 and its constituent components and other controllers, sensors, and actuators, including for continuing example without limitation, the noted solenoids, and or servos or servomotors or servo-actuators for valves, denoted in the various figures by reference numeral 400. Specifically, such solenoid and servo actuated valves 400 are contemplated for use throughout system 100, and are depicted in the various figures as square symbols labeled with "S" therein, and referenced when spacing within the drawings permits.

Further, those having skill in the relevant arts may understand that the symbology used herein for such solenoids and valves include symbols intended herein to represent mechanical valves—depicted in the figures such valves 400 include in one example two, adjacent, mirror-image triangles joined at a vertex. This symbol also typically includes a "T" extending from the joining apex to represent the valve to be manually actuatable, as well as being automatically actuatable by a solenoid and or servo labeled "S" connected to network 115 by wire and or WAP 120, which enables real-time monitoring and operation by system 100.

Other annotations for such automated valves 400 include a half-circle extending from the triangle vertex, which is intended to represent mechanical and or analog real-time pressure actuation capability of the automated valves 400, in some optional configurations. Such solenoid/servo/pressure actuatable valves 400 are schematically depicted in the various figures of system 100 to represent manual and or automatic control and or operation capabilities of various components, systems, devices, valves, manifolds, and other equipment, elements, and components of system 100, during operation and manufacture of the contemplated beverage extracts.

In further variations of the disclosure, the processors, controllers, and or control systems 105, 110, and networks and WAPs 115, 120, also receive data and signals from, communicate with, and establish bidirectional communications with internal and external signal and data sources of system 100. These variations communicate real-time, automatically sensed measurements from various sensors and valves, as well as control commands, logic, and instructions and code, data, information, and signals to and or from various devices, equipment, valves, and or sensors. Various exemplary types of sensors are contemplated for implementation, incorporation, and utilization with system 100, and are denoted generally in the various figures to have circular or round symbols labeled with an exemplary reference letter and reference numerals where space in the figures permits.

Additionally, each of the components of system 100, such as valves 400, are controllable in response to predetermined, preferred, and or real-time measured parameters and characteristics of solvent, media, and beverage extract BE during manufacture by monitoring of various sensors. Such sensors may be positioned throughout system 100 and include for purposes of illustration and example but not for limitation, temperature sensors 405 also labeled "T", pressure sensors 410 also labeled "P", acidity/alkalinity or pH sensors 415 labeled "pH" (which refers to the "power of Hydrogen" and measures the negative log of hydrogen ion concentration in a water-based solution).

Various types of chemical concentration, conductivity, and or turbidity sensors 420 labeled "C" (which can measure respective conductivity, turbidity of BEs, and or concentration of various constituents of the contemplated BEs). The conductivity/chemical concentration sensors 420 "C" also may include, among others, automated head space and single drop solid-phase microextraction (HS-SPME, SD-SPME) systems and real-time gas chromatography and mass spectrometry sensors. Exemplary sensors 420 include, for example without limitation, those available from Hiden Analytical of Warrington, United Kingdom, and electronic "nose" sensors such as the PEN2 "e-nose" model available from Airsense Analytics of Schwerin, Germany, among others.

Also contemplated are TDS and or degrees Brix constituent concentration sensors 425 labeled "B" (which measures BE solids concentrations as described in more detailed examples below), fluid and gas flow rate sensors 430 labeled "F", fluid and gas level, volume, or quantity sensors 435 labeled "L", and many other types of sensors.

Each and all of such sensors of system are and or may be addressable and in electronic, hydraulic, pneudraulic, and or fluid communication with one another, with the various components of system 100 as reflected in the various exemplary figures, and or with MCSs 105, CSs 110 via network 115 and or WAPs 120. These arrangements enable precise control of manufacture of beverage extract BE portions 390 collected as fractions 355, 365, 375, and in turn control of the gaseous and liquid constituents, and preferred flavor, aromatic, and organoleptic properties and characteristics thereof, and the resultant properties of the final BE mixture 385 captured in BET 345.

As depicted for purposes of illustration and explanation, but not for purposes of limitation, FIGS. 3, 4, 5, and 6 are multi-dimensional graphical representations of various BE parameters, characteristics, and or properties as notionally measured during manufacture and elution of the contemplated beverage extracts BEs. In the exemplary arrangements depicted in FIGS. 3 and 5, the vertical or ordinate axes depict a notional scale of a ratio percentage entitled "TDS" that refers to "total dissolved solids" contained in the extracted BE portions 390, 390a. In corresponding, respective FIGS. 4 and 6, the vertical or ordinate axes are dimensionless and only generally represent notional, relative concentrations between the variously described, extractable constituents, for purposes of example but not for purposes of limitation.

As contemplated herein and as used in various food processing fields of technology, including for example beverage extractions, those having skill in the field often refer to "TDS %" to identify a percentage ratio of solute dissolved, dispersed, and or emulsified in the BE. For example, such skilled person should be able to comprehend that reference to a notional TDS % of "1%" refers to the BE to have one part solute per 99 parts total eluted solution.

In one of many possible exemplary examples of the operation and manufacturing capabilities of system 100, the disclosure contemplates applications for manufacturing concentrated coffee beverage extracts BEs. Those skilled in the art sometimes may also refer to an alternative measure of TDS % using another unit of measure often referred to as "degrees Brix," which is also denoted by some working in the field as "°B" or "° Bx" or "°Brix" or "deg.Brix".

"Degrees Brix" is a unit of measure that is named for a German mathematician and engineer of the same name, who developed techniques for measuring the specific gravity of liquids, among other contributions. Degrees Brix has been adopted as a unit of measure by many working in various food and beverage processing fields of technology to generally refer to a measurement of a refractive index of a liquid to ascertain an amount of sucrose dissolved therein.

Those knowledgeable in the relevant field of coffee beverage extract manufacturing may be able to also comprehend that various industry experiments have determined that refractive index in degrees Brix can be calibrated to measure TDS % of coffee extracts. See, for example, Specialty Coffee Association of America ("SCAA") data and information available electronically on the internet at www.scaa.org.

Accordingly, degrees Brix is also reflected in FIGS. 3 and 5 as an alternative scale, which is notionally calibrated to the TDS % scale, according to data available from the SCAA and many other sources, wherein 1° Bx is correlated to and or defined to equal 0.85× TDS %. Further detailed literature describing TDS % and degrees Brix units of measure is available from many sources, including for example, blog.hannainst.com/tds-in-coffee, http://www.coffeed.com/viewtopic.php?t=2489, en.wikipedia.org/wiki/Brix, www.researchgate.net/publication/335608684_Converting_Brix_to_TDS_-An Independent Study, among other sources.

For purposes of the disclosure and system 100 and in the exemplary and illustrative application-specific context of manufacturing concentrated coffee BE, the TDS % vertical or ordinate axes or scales of FIGS. 3 and 5 range between zero TDS and about 30% TDS. These vertical or ordinate scales also have a corresponding and correlated scale for degrees Brix ranging from zero degrees Brix (0° Bx) to about 35° Bx.

FIGS. 3, 4, 5, and 6 also each include horizontal or abscissa axes or time/volume scales that reflects a percentage of time of extraction and or a volume of BE extracted, and combinations thereof. The horizontal time/volume scales or axes range between zero and 100% of the total time elapsed and or the total volume of BE extracted from media M.

A series of vertical or columnar, dashed-line rectangular bars span FIGS. 3 and 5 from left to right, and generally represent a BE portion 390 (FIG. 3), 390a (FIG. 4) of manufactured, BE extracted. Either or both of the extracted volume and or time of extraction of the respective BE portion 390, 390a is notionally represented by and or generally correlated to the horizontal width of the respective dashed-line vertical bars. In variations, the height of the vertical dashed-line bars may be representative of a total TDS % and or degrees Bx of the respective BE portion 390, 390a. The height of each portion 390, 390a reflects a notional TDS % and or degrees Brix, which is shown in the exemplary FIGS. 3 and 5 to generally decrease over time, and as the BE is extracted from extract media M.

Provided however, the disclosure also contemplates that each extracted BE portion 390, 390a may sometimes be equal to and or approximately equal to BE portions 390, 390a that are extracted close together in time, since in some applications the BE TDS % and or degrees Brix may not change substantially from moment to moment during manufacturing operations.

Further, the contemplated TDS % and degrees Brix may also sometimes repeatedly increase and decrease over time as various types of constituents are released and or extracted from the extract media M. In turn these parameters may sometimes increase, then decrease, then again increase, and so on, as the extracted TDS constituents of the BE change in real-time, responsive to the released and extracted constituents, thereby changing the measured TDS % and degrees Brix.

While each of the graphical representations in FIGS. 3 and 5 of portions 390 have different heights relative to one another, they are depicted in FIG. 3, for purposes of example without limitation, to have approximately equal widths to represent the approximately equal notional time spans for collection and or notional volumes of each extracted BE portion 390. In a modified extraction application, FIG. 5 illustrates each dashed-line vertical to have different widths to represent that each extracted BE portion 390a is collected over differing time spans and to have differing volumes than other extracted BE portions 390a.

However, FIGS. 3 and 5 are notional and exemplary, and not intended to limit the scope of the disclosure and claims that follow. Instead, the disclosure contemplates that such time spans and or volumes represented by the widths of the dashed-line vertical bars may be unequal and varying over time despite the depicted equal widths.

Each of the illustrative extracted BE portions 390, 390a contemplated in FIGS. 4 and 6 include various symbols representing categories of solutes, extractives, and the like, which are dissolved, dispersed, suspended, emulsified, entrained, and otherwise contained as such constituents in the BE during elution. The relative vertical positions and changes in such vertical positions of such symbols are intended to reflect exemplary, notional, and relative concentrations, as well as by inference solubility, dispersion, suspension, emulsification, and entrainment, and rates of change thereof.

According to data available from various food processing, beverage extraction, and coffee beverage extraction technology information sources, including SCAA, those skilled in the arts often recite that ground coffee media M (e.g. FIGS. 1, 2) includes between about 25% to about 35% and sometimes about 28% of extractable and or soluble materials and or constituents. Exemplary eluted beverage extracts are described and depicted graphically in various aspects in FIGS. 3, 4, 5, and 6, wherein various macroscopic properties are illustrated in the variations of FIGS. 3 and 5, with notional constituent concentrations are described respectively in corresponding FIGS. 4 and 6.

Such extractable/soluble constituents include, for example without limitation (i) caffeine, acids, flavonoids, phenolics, and volatile organic compounds ("VOCs"), referred to herein as "CA" 450, (ii) melanoidins ("MD") 455, (iii) lipids and fats ("LF") 460, (iv) about 72% soluble and or insoluble carbohydrates and uncatalyzed sugars ("CS") 465, and (v) insoluble fiber ("F") 470. Although not discussed in detail herein, it has been found some such insoluble constituents are extracted in part in suspension and in emulsions during elution due to mechanical/frictional solvent action. These extractable constituents, whether soluble or insoluble, are described and depicted graphically in FIGS. 4 and 6, and elsewhere herein, in notional, exemplary relative concentrations.

FIGS. 4 and 6 also include symbology to represent notional and exemplary relative concentrations of such constituents. As depicted in Legends "L" in FIGS. 4 and 6, a circle symbol labeled with reference numeral 450 represents a notional, relative amount (relative to other noted constituent concentrations) of such highly dissolvable solutes CA 450 that are contained in any specific extracted BE portion 390, 390a of respective FIGS. 3 and 5. For purposes of example, such CA 450 may include the noted caffeine, acids, polyphenolics such as flavonoids, other phenolics and flavor and aroma exhibiting VOCs, and similar coffee compounds, which typically dissolve, disperse, and form colloids rapidly than other constituents and compounds, during extraction and elution by solvent action in extractor 135 from media M.

Also in FIGS. 4 and 6, square symbol labeled with reference numeral 455 represents a notional relative concentration or amount of extracted melanoidins MD contained as a soluble, miscible, emulsified, dispersed, and or entrained constituent in the extracted BE 390, 390a. A triangle symbol labeled with reference numeral 460 is representative of a notional relative concentration of lipids and fats LF emulsified, dispersed, and or entrained in the extracted BE 390, 390a.

Reference numeral 465 labels a diamond symbol in FIGS. 3 and 5, which is utilized to represent the notional and relative concentration or amount of soluble and insoluble carbohydrates and uncatalyzed sugars CSs that are dissolved, mixed, dispersed, emulsified, and or entrained in the extracted BE portions 390, 390a of respective FIGS. 3 and 5. Such uncatalyzed sugars are those that remain in source media M such as roasted, ground coffee beans, after other sugars have been catalyzed with amino acids during the Maillard reactions that occur during roasting.

Reference numeral 470 of FIGS. 4 and 6 label a star symbol that is utilized to represent the notional relative concentration or amount of insoluble fiber that is mechanically and or frictionally broken away from particles of source media M during elution. Such fiber F 470 is thereby mixed, dispersed, emulsified, and or entrained in the extracted BE portions 390, 390a of respective FIGS. 3 and 5.

For exemplary coffee and concentrated coffee beverage extracts BEs 390, 390a manufactured and collected according the disclosure, the at least one first fraction 355 collected during FTS 360 is depicted as having various relative concentrations therein of caffeine and acids CA 450, melanoidins MD 455, lipids and fats LF 460, and or carbohydrates and soluble fiber CS 465. These constituents are illustrated in the figures to have respective concentrations of CA 450, MD 455, LF 460, and or CS 465 that change during the manufacture and extraction or elution of the exemplary coffee beverage extract BE portions 390, 390a. Some skilled artisans may also know that for coffee extracts, CA 450 constituents dissolve rapidly in the initial phase of manufacture and elution, which results in initially higher concentrations thereof.

Other constituents dissolve or are colloidally dispersed, entrained, and or emulsified into the solution of the extracted BE portions 390, 390a more slowly initially, and then sometimes more rapidly as manufacture and elution continues, and heating occurs. FIGS. 4 and 6 also further notionally depict these changes in the relative concentrations of CA 450, MD 455, LF 460, and or CS 465 in the subsequent or intermediate fractions 365 collected during respective STSs 370, as well as in the at least one tail or final fraction 375 collected during TTS 380. It has been generally observed as reflected generally in the figures, that TDSs of certain of the constituents of coffee and coffee concentrate extracts rise initially during elution of first extract fractions 355, 355a, and initial intermediate extract fractions 365, 365a. Thereafter, the respective TDSs decrease in later intermediate extract fractions 330, and are the lowest during elution of the tail extract fractions 375, 375a.

Those having knowledge and skill in the beverage extraction fields of technology may be able to comprehend, with reference to FIGS. 3, 4, 5, and 6, that CAs 450 and MDs 455 constituents of BE portions 390, 390a are extracted more rapidly during initial elution, and then peak at intermediate times, and then drop off or diminish thereafter as such constituents are nearly completely extracted. LFs 460 are eluted more slowly, peak later, and diminish later than the CAs 450 and MDs 455, while CSs 465 take longer to begin elution, and may not reach peak elution until the later BE portions 390, 390a are eluted. Further, the fiber F 470 may not begin to be extracted until late in the elution cycle, such that much of the fiber F 470 may be mostly collected in tail fraction 375, 375a. Some exemplary applications of system 100, including for example without limitation, coffee and coffee concentrate manufacturing, are in some circumstances directed to manufacturing beverage extract BE that excludes all, much of, and or part of tail fraction 375, 375a.

In each of the arrangements and variations of the disclosure, each of the time spans FTS 360, STS 370, TTS 380, and volumes of the extracted BE portions 390, 390a and collected fractions 355, 365, 375 may be adjusted according to preferred profiles or parameters, and or predetermined or real-time adjusted start-stop times. Any and all of these parameters can also be adjusted according to a predetermined sequenced profile and in real-time according to measurements of various BE extract parameters detected during extraction and elution by the various sensors located throughout various positions in the extraction chain of system 100.

In modifications of the resultant blended or mixed beverage extracts BE 385, 385a of the disclosure, various and adjustable volumes of one or more collected first, intermediate, and tail BE 355, 355a, 365, 365a, 375, 375a fractions and or extracted BE portions 390, 390a are mixed or blended according to start-stop times. These times are adjusted in response to actual respective taste/flavor, aromatic, and organoleptic properties and characteristics thereof as well as according to predetermined taste/flavor, aromatic, and organoleptic BE preferences for the resultant, mixed, blended BE product 385, 385a.

For example, in variations reflected by FIG. 3, a mixed or blended BE 385 may be obtained by utilizing the extracted BE portions 390 and or first, subsequent, and tail fractions 355, 365, and 375 that correspond to the volume thereof as is represented by the graphically representative overlap with the horizontal dotted-line rectangles labeled "BE 385." These dotted-line rectangles extend in a generally horizontal direction parallel to the time/volume abscissa scale, across the top or uppermost portion of FIG. 3.

In another exemplary arrangement reflected in FIG. 5, a different blended BE 385 may be obtained by utilizing extracted BE portions 390a and or first, subsequent, and tail fractions 355a, 365a, and 375a, which are graphically represented as rectangles having an area that notionally corresponds to the volume thereof. These illustrative icons graphically overlap or correspond according to the time/volume axis, to the representative, horizontal dotted line rectangles labeled "BE 385a," which extend horizontally parallel to the time/volume abscissa scale, across the top or uppermost portion of FIG. 4.

The predetermined taste/flavor, aromatic, and organoleptic BE preferences may be developed by sampling, testing, and measuring a plurality of extracted BE portions 390, 390a manufactured from a variety of different media M, and extraction times, temperatures, pressures, solvents, separated gases and liquids, and mixed and remixed gases and liquids. The preferred taste/flavor, aromatic, and organoleptic BE preferences may also be obtained during manufacturing and elution by real-time and or periodic recordation of data points from one or more of the sensors positioned throughout system 100.

Such sensors may for example as depicted in the figures be positioned specifically about extractor 135, and various points located throughout the elution piping network, gas/liquid separators 265, 285, and about the separate collection vessels 325, 335, and 335, among other places. The recorded data points are communicated about network 110, and utilized in feedback and or feedforward relationships to process control algorithms in MCS 105 and or CS 110. Various components of system 100 are thereby adjusted in real-time to precisely control the elution characteristics and parameters of various components of system 100.

In further examples, the sensors 405, 410, 420 in-line with, and or adjacent or proximate to the piping of gas separator 265 may be utilized along with various contemplated sensors, such as sensors 425 "C" to detect various elute constituents and related characteristics and parameters. Such constituents, may be captured, separated, and or stored, and may be reinfused along with other preferential constituents and mixed into BE 385, 385a in preferred quantities.

For further example, such constituents may include for example without limitation, preferred aromatic phenols and VOCs, such as 2-furfurylthiol (and other desirable melanoidins, polyphenols, aldehydes, guaiacol, pyrroles, thiophenes, and other flavonoids and desirable compounds and chemicals. These are among the many desirable constituents of the beverage extract, which are formed from green coffee beans during Maillard reactions induced by roasting, which reactions occur between amino acids and reducing sugars).

In another exemplary arrangement of system 100, about 200 to 250 pounds of dried and or prewetted roasted and ground coffee extract media M (FIG. 1) is loaded into extractor(s) 135. Thereafter, extractor(s) 135 are sealed, outgassed/degassed, depressurized, pressurized, cycled, and or conditioned with a preferred and or an inert atmosphere "A" and or inerting nitrogen gas or other conditioning gas or vapor, by utilizing gas control subsystem(s) 200.

The media M is settled in the extractor 135 with resonator, oscillator, mechanical vibrator agitation subsystem 205. Extractor 135 may be thermally heated and or thermally controlled to uniform and or with to have a thermal gradient that differs vertically in the extractor 135, with thermal management subsystem 210 and by utilizing various temperature sensors T 405 positioned about a plurality of positions on extractor 135.

Other sensors may also be utilized to control elution, extract manufacturing, and beverage extract BE quality, concentration, and other parameters, during operation in cooperation with MCS 105, CSs 110, and other controllers. Such sensors can further include pressure sensor P 410, pH sensor 415, concentration/conductivity/turbidity and or colorimetry absorbance sensors "C" 420 (which according to the Beer-Lambert Law enables measurement of dissolved solids/concentrations of beverage extracts),/TDS/Brix sensors "B" 425, fluid and gas flow rate sensors "F" 430, and or liquid level/volume sensors "L" 435. These contemplated sensors may be positioned about extractor/autoclave 135 and or taps 180, 185, 190, 195, among other types of sensors and possibly preferred locations on or about extractor 135.

During operation of system 100, a water and or water-based solvent may be prepared via one or more of the contemplated solvent processing subsystems and components SST, 215, 220, 225, 230, 235, 240, 245. The solvent may be precision infused by pump 250, controlled by MCS 105 and or CSs 110. The solvent may also be adjusted to have a preferred uniform and or increasing/decreasing thermal profile, which is further controlled by thermal management and heat exchanger subsystem 255 in cooperation with MCS 105 and or CSs 110. System 100 contemplates utilization with a wide range of flow rates, and pressurized, ambient pressure, low pressure applications, and varied temperature extraction methods that include cooled, ambient, and heated techniques.

Solvent temperature, pressure, and flow rate may be controlled in real-time and or according to a predetermined sequential profile, which is also automatically controlled by MCS 105 and or CSs 110. Such control is also automatically informed by and adjusted according to real-time measurements from temperature sensor T 405, pressure sensor P 410, and flow rate sensor F 430, among other sensors, before being introduced into extractor(s) 135 by fluid supply line 150. The temperature, pressure, and flow rate controlled solvent is then infused into extractor(s) 135 to initiate elution of beverage extract.

As solvent is infused into extractor 135, further debubbling/degassing/pressurization may be employed utilizing one or both of gas subsystem 200 and vibration/agitator/shaker subsystem 205 "V". As eluted BE is extracted from media M under controlled environmental conditions of flow rate, temperature, and pressure, eluted BE rises up within and is collected from extractor(s) 135 through top side extract effluent line 155, and then further thermally adjusted by cooling/heating and maintained at a controlled temperature, while being further introduced downstream in system 100. As extractor(s) 135 are saturated with solvent, the instant extractor(s) 135 become full may be detected automatically by check valve 165 detecting flow and generating a signal OS 130 that is communicated to and which may initiate further process control operations of system 100.

As manual control and or MCS 105 and or CSs 110 controllers manage manufacturing operations with various valves 400, sensors, and or gas/liquid/pressure/infusion subsystem 295, the eluted and processed BE is communicated downstream. After leaving extractor(s) 135, eluted BE is communicated to one or more of gas/liquid separator 265 and or mixer 285, to further adjust various properties and characteristics of extracted/eluted BE. Separation and mixing are further controlled therein according to predetermined and or real-time determined start-stop times, and or according to predetermined, preferred, and or real-time actual measurements from various sensors, as reflected and contemplated elsewhere herein and in the various figures.

Thereafter, eluted BE may be further tested, sampled, and captured via extract tap line 300, and or is communicated to extract manifold supply line 305, and extraction manifold 310. Gas subsystem 295 may also be utilized to degas, control pressure, and establish an inert atmosphere "A." Subsystem 295 may be coupled to gas/liquid separator to capture gas and liquids therefrom. Subsystem 295 also controls headspace and establishes a preferred and or inert atmosphere A in one or more of extraction manifold 310, extract fraction collection subsystem 320, each of the separate first, intermediate, and tail fraction collection vessels 325, 330, 335, mixing/blending subsystem 340, and the mixed BE 385 and BET 345, among other components of system 100.

Establishing, controlling, and maintaining the contemplated inert and or otherwise preferred, and or controlled atmosphere "A", in turn enables system 100 to optimize the properties and characteristics of extracted BE portions 390, 390a during collection as the first, subsequent, and tail fractions 355. 355a, 365, 365a, 375, 375a. Subsystem 295 may also be coupled to and in communication with fraction mixing subsystem 340 MX to enable optimization of the properties and characteristics of blended and mixed BE communicated to BET 345. Thermal management subsystem and heat exchanger 350 may also intermittently and or continuously manage, maintain, and or control the temperature of the extract fraction collection subsystem 320, BET 345, and or each of the separate first, intermediate, and tail fraction collection vessels 325, 330, 335, and mixing subsystem 340.

After and or during fraction collection, all or some of each collected fraction 355. 355a, 365, 365a, 375, 375a may then be communicated to fraction mixing subsystem MX 340. After further processing therein, it is collected in BET 345 for subsequent utilization, under automated control in cooperation with MCS 105 and or CSs 110, and according to one or more real-time actual measurements from various sensors coupled to the separate vessels 325, 330, 335, mixing subsystem 340, and or BET 345.

In other examples of the disclosure, elution of BE portions 390, 390a from extractor(s) 135 and collection into separate vessels 325, 330, 335 is accomplished for coffee extracts over a time of between about one and ten hours, between about two and eight hours, between about five and seven hours, and or in some applications about two hours, or more or less. This contemplated time span may be adjusted in similar ways to that of the contemplated start-stop times, and as a function of predetermined, preferred, and or sensor-measured properties, characteristics, and parameters of the eluting solvent, BE portions 390, 390a, and collected BE fractions 355, 365, 375.

In a notional example with reference to FIGS. 3 and 4, a total manufacturing time span of five to seven hours is contemplated, such that the horizontal axis spans a total of 300 to 420 minutes. In turn, the 25 equal-width, vertical, rectangular, dotted-line bars, graphically representing beverage extract BE portions 390, each span about 12 to 16.8 minutes or 720 to 1,008 seconds.

Consequently, it can be estimated for an exemplary 5 hour total elution time that first extract fraction 355 is collected over about the first three and ⅓ vertical bars or portions 390, or over an FTS 360 of about 40 minutes or about 2,400 seconds. The start time for FTS 360 is zero minutes, and the stop time is at the end of minute 39 and 59 seconds, just before the start of the first second of minute 40.

The next subsequent or intermediate fraction 365 is estimated to span about three of the portions 390 depicted by the vertical, rectangular, dotted-line bars, spanning a STS 370 of about 36 minutes. The first STS 370 starts at minute 40, and stops at the end of minute 75 and 59 seconds, just before the start of minute 76. The later intermediate fractions 365 can be similarly estimated as can the respective start and stop times. The tail or final extract fraction 375 is estimated to span about the last two and ½ portions 390, of TTS 380 having a duration of about 30 minutes. The start time of TTS 380 is therefore the beginning of minute 270, and the stop time is the end of minute 299 and 59 seconds. Similar estimations can be derived from the notional elements of FIGS. 5 and 6, and similar charts may be developed for a wide variety of beverage extract applications and implementations of system 100.

These exemplary manufacturing processes may also be accomplished for various sizes of production batches, at an exemplary solvent temperature range, in one variation, of approximately between about 82 degrees Celsius or "° C."

and about 93° C. (between about 180 degrees Fahrenheit or "°F" and 200° F.). The manufacturing processes may also utilize a predetermined flow rate of solvent being pumped through source media M of multigrind coffee, whereby a total desired quantity of concentrated coffee beverage extract BE is eluted.

In further variations, the flow rate may be varied and may be combined with pressure cycling of the solvent and or atmosphere "A". As elution is commenced and solvent is pumped into extractor(s) 135, a vacuum may be established to accelerate moving through the column of source media M within the extractor(s) 135. In variations, such solvent and or atmospheric pressure-vacuum cycling may also be utilized to establish a piston-type mechanical action to further precisely control elution of constituents from source media M.

For applications that include ground coffee source media M, such solvent/atmospheric piston action can enable improve and more rapid extraction when interstitial, microscopic, cellulosic-walled voids or interstices of ground coffee particles are breached by high pressure "pistoning" solvent, which is then extracted as lower pressure is introduced during such elution pressure cycling. Here, reference to pistoning is directed to rapidly changing and or pulsed solvent pressure over predetermined pressure ranges during extraction, which in one exemplary approach utilizes small, but quickly changing pressures induced in the solvent. Such modifications can enable new and improved extraction methods than otherwise available from osmotic elution processes alone.

The eluted beverage extract BE is collected and cooled after extraction to between about zero or 0° C. and about one or 1° C. (between about 32° F. and about 34° F.). The cooled BE is then collected in the separate fractions 355, 355a, 365, 365a, 375, 375a, during respective times spans FTS 360, 360a, STSs 370, 370a, and TTS 380, 380a, in the respective, separate collection vessels 325, 330, 335. After collection of the eluted beverage extract BE across vessels 325, 330, 335, BE mixture 385 is thereafter manufactured by MX subsystem 340 blending and mixing BE portions 390, 390a of the collected fractions, and then communicated to and stored in BET 345.

Figure 7:
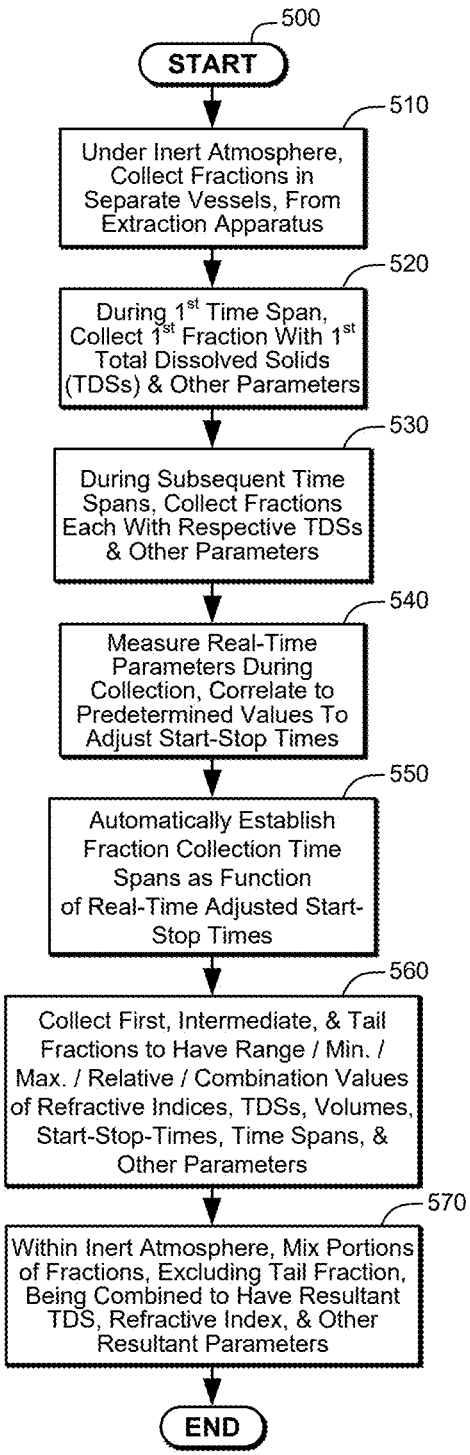
FIG. 7 illustrates various added examples of methods of manufacturing the beverage extracts and systems therefor, as described and contemplated in the preceding figures, as well as the following detailed descriptions.

With continued reference to the various figures and also now to FIG. 7, additional methods of manufacturing a beverage extract is illustrated. Such methods include for example without limitation, starting step 500, followed by step 510 that includes collecting, within an inert and or preferentially controlled and conditioned, and or pressurized/vacuum cycled atmosphere "A", a plurality of fractions 355, 355a, 365, 365a, 375, 375a, in separate, respective vessels 325, 330, 335. These are collected from autoclaves (s)/extractor(s) 135 in fluid communication with vessels 325, 330, 335.

In a concurrent and or next step 520, the method also includes collecting a first fraction 355, 355a of the plurality, during a first time span FTS 360, 360a, to have a first total dissolved solids (TDS) and other parameters. Next, step 530 includes collecting subsequent fractions 365, 365a of the plurality, during subsequent time spans STSs 370, 370a, each having subsequent respective TDSs unequal to the first TDS. As with other examples, variations include utilizing predetermined, preferred, and or real-time adjusted start-stop times.

Alternatively preferred methods may further also include a sequential, concurrent, and or continuously executed step 540 directed to measuring in real-time during elution, collection, and or mixing, TDS, TDS %, a refractive index such as degrees Brix, colorimetry absorbance, and or other parameters of one or more of the fractions 355, 355a, 365, 365a, 375, 375a. These measurements are utilized, during or automated control by MCS 105 and or CSs 110, to establish start and stop times. The start and stop times, as with other variations, are established as a function of predetermined, preferred, and or real-time sensor-detected parameters, properties and or characteristics of the BE.

As before, the start and stop times established time spans that are determined for collecting different BE portions 390, 390a, as well as fractions 355, 355a, 365, 365a, 375, 375a, and or mixed/blended BE 385. In variations, the time spans are established according to respective refractive indices that are predetermined and then detected or measured during processing for each of the fractions 355, 355a, 365, 365a, 375, 375a and or BE portions 390, 390a.

In modifications of these methods, step 550 may also be incorporated to include establishing automatically in real-time during collection, as a function of predetermined or real-time, sensor-detected BE properties, the start and stop times for each of the first and subsequent time spans 360, 360a, 370, 370a. The respective start and stop times may also be established according to the respective, established time spans FTS 360, 360a, STSs 370, 370a, and TTS 380, 380a, such that each of the fractions and or BE portions, have predetermined respective TDSs, TDS % s, refractive indices such as degrees Brix, colorimetry absorbance, and or other parameters.

In additional examples of methods of the disclosure, any of the arrangements and methods may be further modified to include a step 560 that includes collecting the first fraction 355, 355a of the plurality to have at least one of various parameters. Such various parameters may include for example without limitation (a) a refractive index exceeding 24.9° Brix, and (b) the TDS exceeding 21.1%, and other fractions 365, 365a, 375, 375a to have respective other equal or unequal volumes, and similar, relative, and or different parameters, characteristics, and properties.

In variations, step 560 may adjust such parameters wherein the first fraction 355 has a first volume collected to have a refractive index exceeding about 24.9° Brix, and a corresponding TDS exceeding about 21.1%. In further exemplary modifications, the first fraction 355 refractive index ranges approximately between about 23.0° Brix and about 33.0° Brix, with a corresponding TDS ranging approximately between about 19.5% and about 28.1%. Use of "about" and "approximately" is intended to refer to a tolerance of +/−1%, 2%, and or 5% of the recited values.

In yet other exemplary arrangements and methods, a step 570 may be incorporated to include mixing within the inert atmosphere "A", at least one of the plurality of BE portions 390, 390a, and collected fractions 355, 355a, 365, 365a, thereof in the respective vessel 325, 330, 335, and excluding the tail fraction 375, 375a. Wherein the mixed or blended BE portions 390, 390a, and fractions 355, 355a, 365, 365a, are combined to manufacture beverage extract mixture 385, 385a, to have one or more of a resultant TDS, resultant refractive index, colorimetry absorbance, and other resultant parameters.

Among many benefits, utilization of the contemplated separate vessels 325, 330, 335, sensors, and MCS 105, CSs 110, among other components of system 100, enables new ways to capture eluted beverage extracts and to create blended and mixed manufactured extracts. The configurations and methods of the disclosure enable further processing, blending, and or mixing of separately collected fractions for optimization of taste, flavor, aromatics, organoleptic, and other properties and characteristics of downstream BE mixtures, while preventing intermittent manufacturing anomalies from damaging or ruining an entire batch or continuously produced eluted BE.

The improvements of system 100 and its methods are further amplified by utilization of the various BE parameter-controlled start and stop times, among other capabilities, which are established as a function of various predetermined, monitored, measured, and or measurable properties and characteristics of the contemplated beverage extract. Such measurements are made automatically, in real-time, during processing as solvent is forced through extractor(s) 135, and during further processing of the eluted BE portions 390, 390a, collected fractions 355, 355a, 365, 365a, 375, 375a, and mixed BE 385.

Prior extraction machines have in the past been fluidly coupled in parallel to enable production of large batches of extracts such as coffee, tea, and others, which may include groups of 5 to 20, as well as 100 or more extractors, all configured to be run in parallel and concurrently. Such prior arrangement had the shortcoming of typically being configured to communicate extract from all extractors to a single extract collection tank that receives extract from all extractors.

In these arrangements, any undetected anomalies occurring during extraction in any of the extractors, ruins the entire batch collected in the receiving tank. Further shortcomings include that unavoidable ruin of an entire batch when anomalies arise even only during a short duration of the extraction process, and or in an extraction anomaly occurring for a brief period in one or more of the plurality of extractors.

During operation of the various arrangements of the disclosure, multiple extractors 135 may also be coupled in parallel to various other components of the disclosure, to enable production of large batches of extract. However, problems that occurred in prior extraction plants are avoided such that extracts eluted according to the disclosure are captured in multiple, independent, separate collection vessels 325, 330, 335. These contemplated separate collection vessels may be arranged to have groups of such vessels 325, 330, 335, wherein each group is coupled to a single extractor 135 of a plurality of extractors.

Each vessel 325, 330, 335, is configured to separately collect beverage extract BE 355, 355a, 365, 365a, 375, 375a from the respective one or more extractor(s) 135. In one exemplary arrangement, each extract fraction collection subsystem 320, and respective group of vessels 325, 330, 335, is fluidly coupled to one such extractor 135 of the plurality. In other arrangements, a single or multiple distribution manifolds 310 may be included and configured to couple multiple extractors 135 in a many-to-many configuration to one or more groups of subsystems 320 and collection vessels 325, 330, 335. In other adaptations, the contemplated distribution manifolds 310 may also fluidly couple one particular subsystem 320 and group of vessels 325, 330, 335 in a one-to-many configuration to more than one extractor 135 of the plurality.

Other variations of the disclosure contemplate the one or more manifolds 310 and subsystems 320 and respective groups of collection vessels 325, 330, 335, to one or more blending and mixing subsystems MX 340 and BETs 345 of a plurality. Still other modifications contemplate each manifold 310 and collection subsystem 320 coupled to a single MX 340 and BET 345. Other arrangements have a single collection subsystem 320 and MX 340 coupled to multiple BETs 345.

Further, these arrangements further overcome problems in prior methods and system, and which enable improved capabilities to detect specific possible anomalies that previously were undetectable. System 100 enables such improvements with various innovations that include sensors and taps and other components and features that monitor eluted extract during communication through the extractor(s) 135, and downstream components and subsystems. With these improvements, system 100 monitors extracted BE portions periodically, in real-time, during elution in extractor(s)/autoclaves 135 and as portions and fractions are processed and collected, to detect, pinpoint, and correct possible anomalies during all phases and aspects of the elution and manufacturing processes of the disclosure.

With continuing reference to the preceding disclosure and FIGS. 1 through 7, the disclosure also contemplates variations directed to alternatives wherein extract is collected in one or more collection vessels and which incorporates at least one and one or more extractors, autoclaves, and or vessels that are reconfigured and modified to enable periodically and or continuously moving media beds traveling in an opposite direction and or a cross-flow arrangement with a solvent supply, to create the extract. In one exemplary configuration, such an alternative autoclave, extractor, and or vessel apparatus defines a longitudinal axis and which extends between an inlet and a discharge port, similar to the top inlet 145 and bottom inlet 140 already described for extractors or autoclaves 135.

Figure 8:
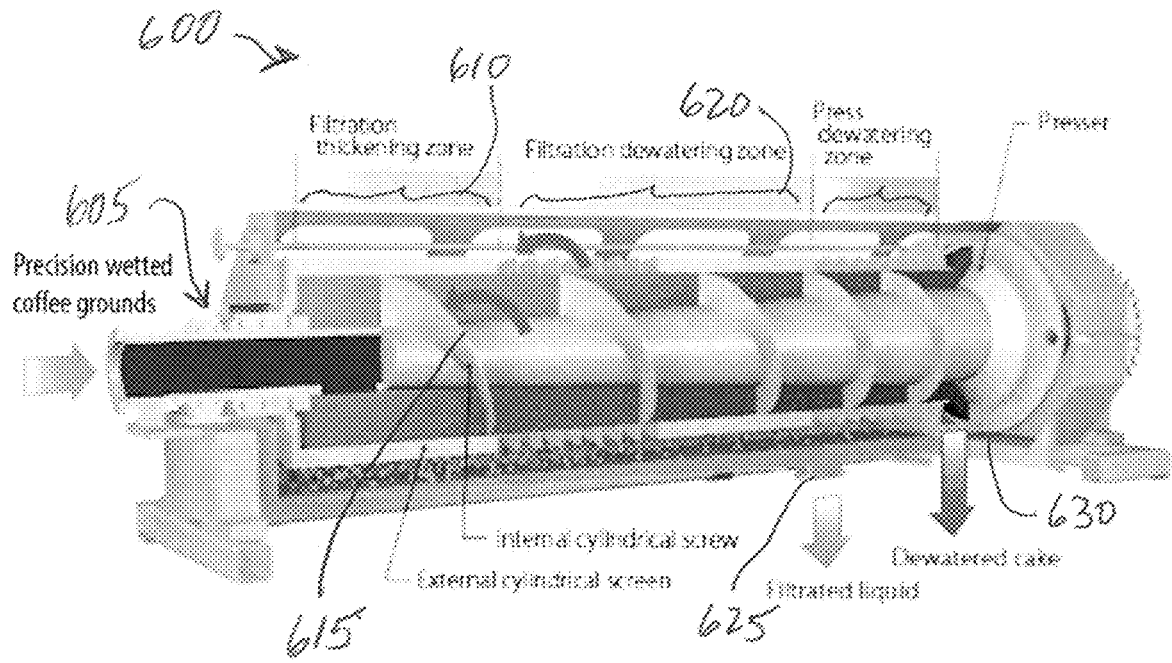
FIG. 8 depicts an elevated cut-away view of another exemplary extraction autoclave, extractor, or vessel that incorporates various features that may be modified according to the disclosure to enable new capabilities described elsewhere herein.
Figure 9:
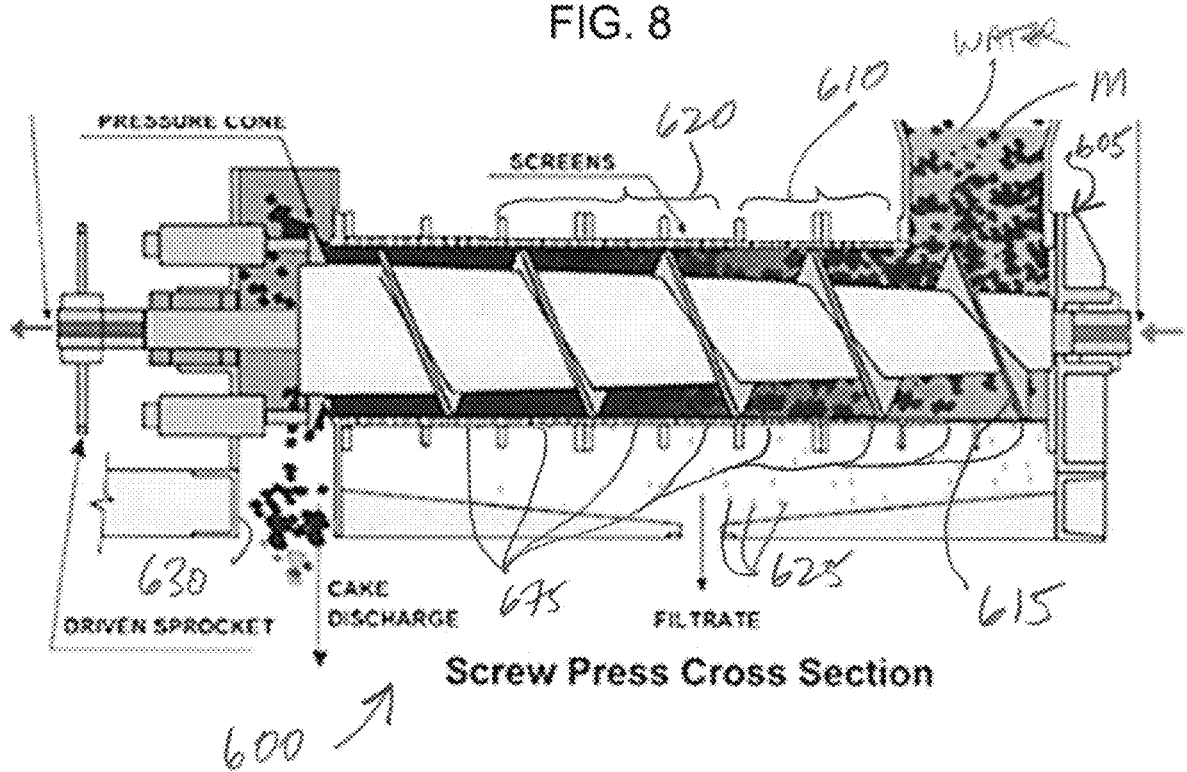
FIG. 9 is a rotated cross section view of the arrangement of FIG. 8, with certain elements removed or modified for further illustration purposes.

With specific reference also now to FIGS. 8 and 9, prior attempts at a horizontal, continuous fluid extraction machine are shown. With reference to the various implementations of the disclosure and the following figures, it may be understood that modifications to the extraction autoclaves, extractors, or vessels of this disclosure can be made and may include certain aspects of these prior devices to enable periodic and or continuous movement of media and media beds to generate an extract. While a version of an extract vessel that incorporates a screw or auger feed and extraction assembly is depicted in FIGS. 8 and 9, such components fall short in many ways from the improvements of the disclosure, and must be modified and rearranged in new ways to overcome such short comings and to enable improvements over prior systems.

FIGS. 8 and 9 are limited to a horizontal screw press 600 that receives wetted coffee grounds media M and water at one end 605, which in a filtration thickening zone 610 are mixed, compressed, and moved by the screw auger 615 through a dewatering zone 620, while filtrated liquid 625 is expressed underneath the press 600. Thereafter, dewatered cake is discharged through an exit orifice 630.

Figure 10:
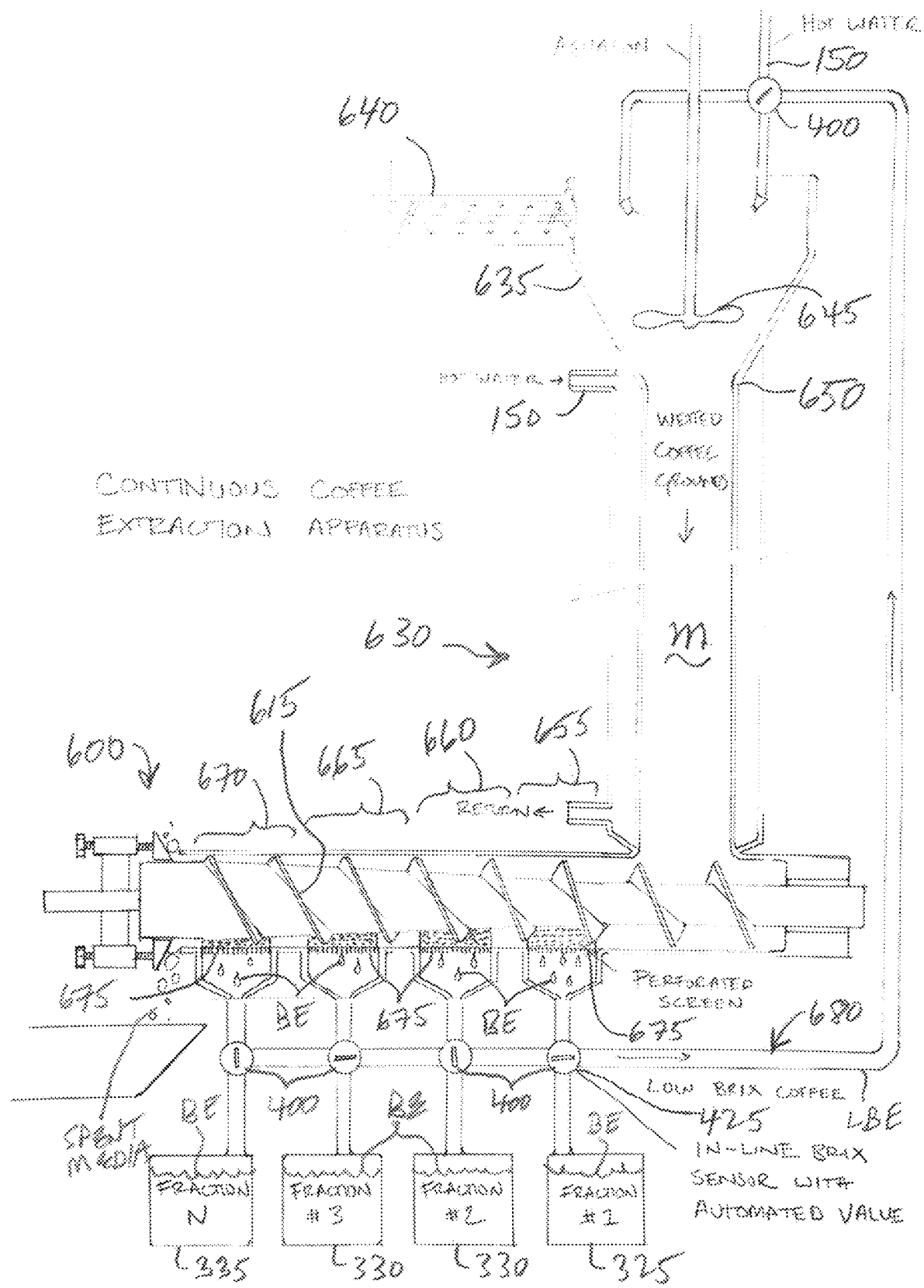
FIG. 10 is a schematic sketch depicting further arrangements of the preceding figures of the disclosure.
Figure 11:
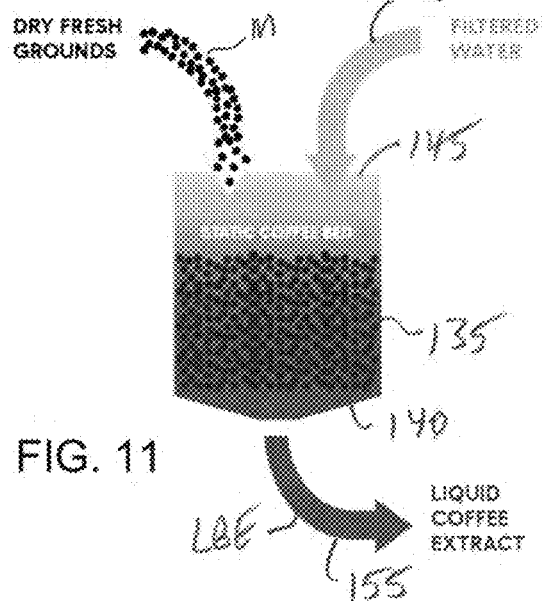
FIG. 11 schematically illustrates aspects of various elements, adaptations, and capabilities of the disclosure directed to discontinuous batch cycle extract processing capabilities contemplated herein.

For further example, as depicted in FIG. 10, some concepts from the prior attempts of FIGS. 8 and 9 may be modified and rearranged to enable operation in alternatively adapted autoclaves, extractors, and or vessels 630 for continuous and or periodic extraction of beverage extracts BE, such as coffee for example and without limitation. In these exemplary adaptations the horizontal screw press 600 includes the rotating screw auger 615 and the discharge port 630, but is otherwise substantially modified to remove many prior components, and further modified with new components. Such new components include many from the previously described implementations of the disclosure, and now also include a funnel or gravity feed hopper 635 incorporating a dry media feeder 640 and an agitator 645 that mixes a fluid or solvent with the media, and also presses the mixed fluid-media into an inlet port 650.

The mixed media is communicated downward to the screw press 600 and further moved along by the screw auger 615. In variations of the disclosure, a plurality of extraction zones are arranged to include first, second, third, fourth, and more extraction zones 655, 660, 665, 670, which are adapted to communicate a beverage extract through perforated liquid/solid separation screens 675 to separate collection vessels, such as those described previously that include a first separate collection vessel 325, second and third or more subsequent separate collection vessels 330, and in some variations a last or tail separate collection vessel 335. In further modifications, a valve 400 and low-quality/low-concentration/low Brix beverage extract conduit 680 may receive fluid to be returned and combined with media and water to further adjust quality of resulting beverage extract BE.

In FIGS. 11, 12, 13, and 14, various moving media bed and flowing solvent streams are schematically depicted for purposes of further illustration without limitation of additional variations of the disclosure. These figures contemplate both static and moving media beds and solvent streams flowing in the same direction and in different directions from the moving media bed configurations. For example, in FIG. 11, a static media bed is contemplated in an extractor 135 utilized in a discontinuous, batch cycle arrangement that enables gravity induced solvent flow to generate what some may refer to as a low concentration or low Brix extract LBE, which is typified by home and commercial use coffee makers.

Figure 12:
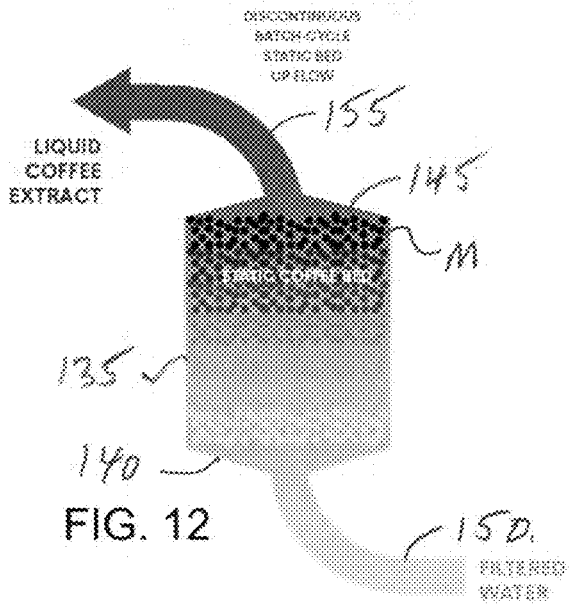
FIG. 12 is another schematic depiction of rearranged and modified aspects of the discontinuous batch cycle extract processing features of FIG. 11 and the disclosure.

In FIG. 12, a further variation is shown that is directed to another discontinuous, batch cycle adaptation according to the disclosure, which may include a pressurized solvent stream that enables higher concentration extracts. Here, the static media bed is contained in an extractor 135 and subjected to pressurized solvent injected into a bottom 140 and exiting as an extracted beverage extract BE at a top 145.

Figure 13:
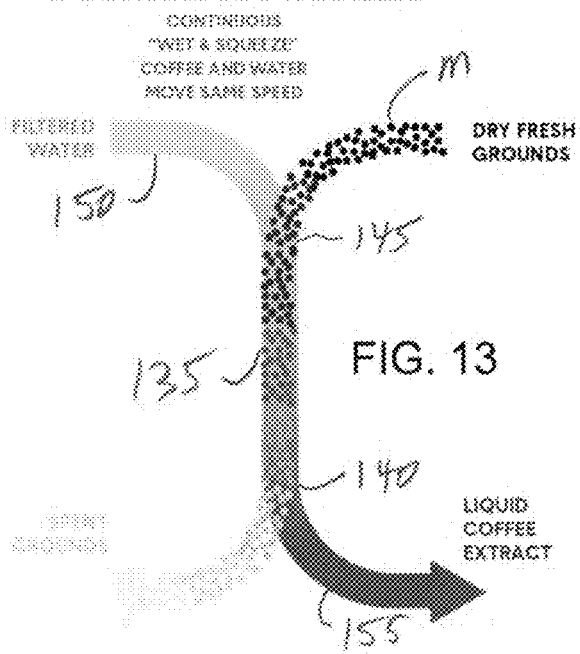
FIG. 13 portrays further aspects of the disclosure modified to illustrate additional capabilities that include continuous cycle extract processing components and concepts.

In FIG. 13, a periodically and or continuous moving media bed is contemplated that enables periodically and or continuously flowing solvent and extract production. Here, solvent is injected with media M at the top inlet 145, and spent media exits the bottom outlet or discharge port 140, while the beverage extract BE is separately captured according to any of the contemplated variations of the disclosure.

Figure 14:
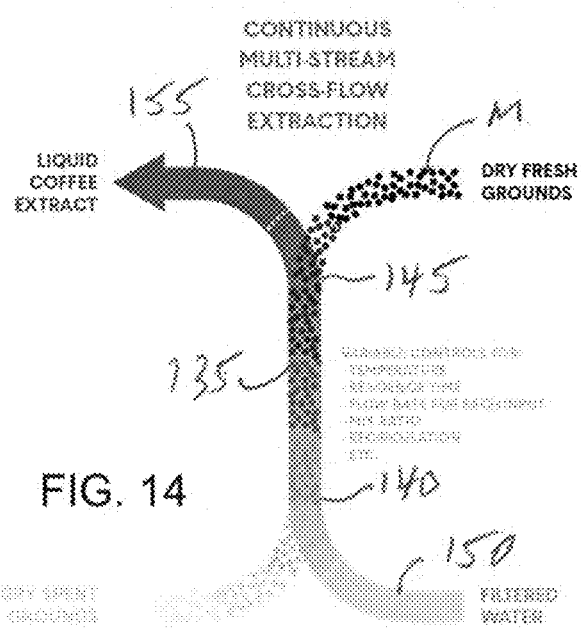
FIG. 14 is directed to yet other capabilities of the disclosure that enable continuous cycle extract processing elements and features that establish cross-flow processing and extraction capabilities.

Another periodically and or continuous moving media bed arrangement is illustrated in FIG. 14, which enables further improvements to periodically and or continuous moving media bed extraction systems of the disclosure. Here, the contemplated extractors, autoclaves, and or vessels 135 enable a moving media bed that is moved in a direction opposite the cross flowing solvent. The media bed moves from the top inlet 145 toward the bottom outlet 140 and exits as spent media.

The solvent is injected proximate the bottom outlet or discharge port 140, which also enables cross flow against the direction of movement of the media bed, as well as pulsed, periodic, pressure changing, and other multistream configurations of controlling solvent cross-flow through the media bed during operation of the extractor 135. In these novel configurations of FIG. 14, various additional improvements are enabled according to aspects of the disclosure wherein temperature, residence time, recirculation, pulsation, and flow rates of both oppositely moving media beds and solvents can be variably adjusted in real-time during the extraction process to optimize various parameters and features of a desired extract. As used herein, the phrase cross-flow is intended to refer to any arrangement of flowing solvent through a media bed in a direction different from the movement of the media bed.

In yet further modifications of extraction autoclaves, extractors, or vessels, FIGS. 15 through 24 illustrate modifications that enable additional and improved extraction capabilities of the disclosure. System 100 can incorporate the depicted modified extraction autoclaves, extractors, or vessels 700 of FIG. 15, which may include the extractor apparatus 700 defining a longitudinal axis LA (shown generally aligned vertically in FIG. 15), wherein both the autoclave or extractor and axis LA extend between an upper or top inlet port 705 and a bottom or lower discharge port 710.

In these FIGS. 15-24 and certain of the later following figures, the disclosure describes variations directed to the beverage extract BE being collected in one or more collection vessels 325, 330, 335, and which incorporates at least one and one or more extractors autoclaves, and or vessels 700, configured to enable periodically and or continuously moving media beds traveling and or cooperatively in a cross-flow arrangement with a solvent supply, to manufacture the beverage extract BE. In these arrangements the media beds are movable along a longitudinal axis in a direction through the extractors 700 in a direction opposite to a cross-flow of solvent.

Further modifications are also illustrated wherein the cross-flow solvent is adjustably pressurized such that flow of solvent can be continuous, periodic, pulsed, and or induced with rapidly changing pressure as it cross-flows through the autoclave or extractors 700, as well as modified extractors 135. In the exemplary configurations of FIGS. 15-19, such an alternative autoclave, extractor, or vessel apparatus 700 defines longitudinal axis LA, which extends between the top inlet port 705 and the bottom discharge port 710.

With continuing reference to FIGS. 15-24, a media feed assembly 715 is arranged about the inlet port 705, which may include a funnel 720 or similar device, which is coupled to the inlet 705. In this arrangement, the feed assembly 715 may also include a drive motor 725 that propels an agitator, a screw, a mixer, a compactor, a densifier, a variable speed screw, 730 and or combinations thereof.

In this configuration, feed assembly 715 these components cooperate during operation to at least one of: agitate, compact, mix, densify, and or supply the moving media bed to the inlet 705, and or with a force induced by motor 725 that enables periodic and or continuous movement through the extract vessel and along the longitudinal axis LA. The media feed assembly 715 thereby forms, agitates, mixes, compresses, tamps, compacts, and or densifies media M into a moving media bed.

The media feed assembly 715 moves media M into inlet 705, and may be assisted with gravity to push the moving media bed as a column down into the extraction vessel 700 and towards the discharge port 710. As also depicted in part in FIGS. 15 through 24, a solvent supply 735 is coupled to the extractor, autoclave, and or vessel 700 near and or proximate to the lower discharge port 710, and is configured to establish pressurized cross flow through the oppositely moving media bed. Such cross flow periodically and or continuously moves oppositely and concurrently, and or simultaneously, to movement of the media bed, thereby dissolving, entraining, emulsifying, and otherwise capturing solids from the constituents of the moving media bed to form the beverage extract BE.

In any of such arrangements, an extract port 740 is also included and is coupled to the extract autoclave or vessel 700 near and or proximate to the upper inlet 705, and is configured to extract from the extract vessel 700, the beverage extract BE and or cross-flowed solvent BE from the moving media bed proximate the inlet 705.

Further adaptations may also include the feed assembly 715 including a sealing end 745, which is configured to cooperate with an interior surface of the autoclave or extractor 700 to establish a pressurized seal against the inlet 705, such that solvent flow is resisted and or prevented from being communicated into the media feed assembly 715 beyond the sealing end 745. Also contemplated is an arrangement wherein sealing end 745 is maintained under pressure from the influx of media being forced into the inlet port by media feed assembly 715, with sufficient force and pressure to prevent solvent from flowing upwards past the inlet port 705.

Figure 15:
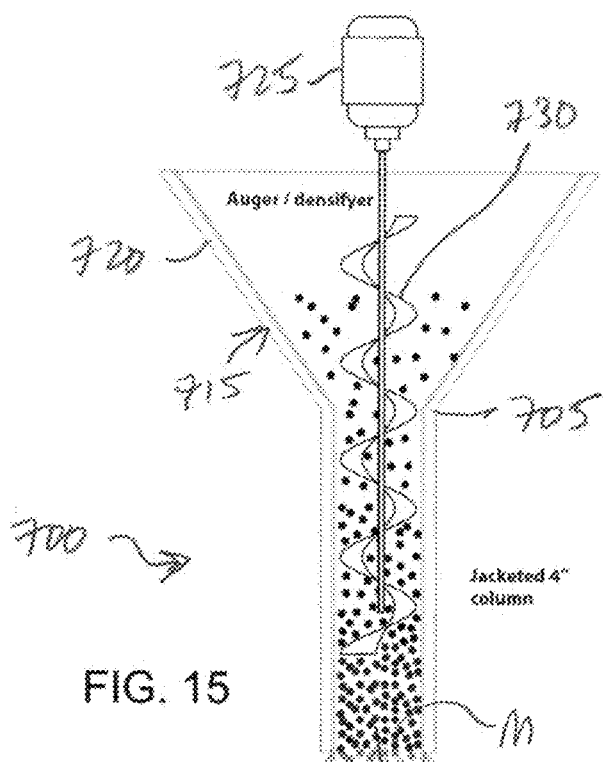
FIG. 15 depicts further schematic illustrations in a cross-section view arrangements of extraction autoclaves, extractors, or vessels of the disclosure, including an overlay depiction of two modes of operation, and which adaptations include modified feed funnels or hoppers as well as spent media capture assemblies, among other features, and which also enable cross flow, periodic and continuous extraction, among other improved aspects contemplated herein, and illustrates overlays of multiple modes of operation.
Figure 16:
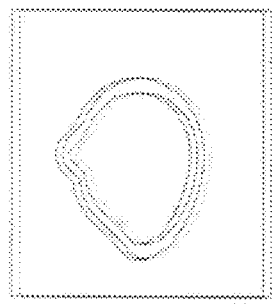
FIG. 16 illustrates a plan view in enlarged scale of features of FIG. 15 that are configured to incorporate and or cooperate with elements of FIGS. 17, 18, and 19 among others, wherein certain features and elements of FIG. 16 are removed for illustration purposes of the elements and components.
Figure 17:
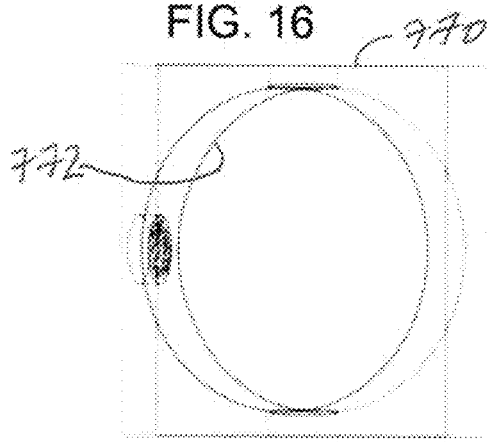
FIG. 17 depicts a plan view in enlarged scale of certain components of FIG. 15, while excluding other features to enable further illustration of elements and capabilities that cooperate with those of FIGS. 18 and 19, among others.
Figure 18:
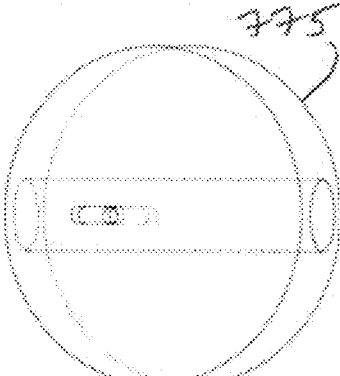
FIG. 18 also shows a plan view in enlarged scale of certain elements of FIG. 15 that are configured to cooperate with those of FIG. 16, and in some arrangements be received within the component of FIG. 17, and also with those of 17 and 19, among others.
Figure 19:
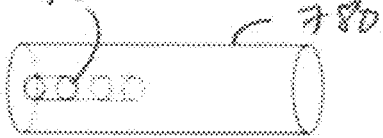
FIG. 19 reflects a plan view in enlarged scale of components of FIGS. 15 and 18, which in certain configurations may be received within those of FIG. 18, and which are adapted to cooperate with those of FIGS. 15, 16, and 17 among others.

Also contemplated by the disclosure and as depicted in multiple modes of operation in FIG. 15, and by way of developing an understanding of the disassembled components in FIGS. 16, 17, 18, and 19, is a spent media capture assembly 750 that may be coupled to lower end of the extractor assembly and extraction vessel, and also arranged and or coupled about discharge port 710. The capture assembly 750 is configured to capture spent media and or to also extract residual solvent and or beverage extract BE therefrom. Such residual extract or solvent extracted from the spent media before discharge may be captured and further utilized as an extract product having a quality lower, such as a lower Brix value, than the primary, higher quality, higher Brix value solvent or beverage extract BE extracted from system 100 and extractor 700.

In typical exemplary applications, the higher quality beverage extract BE or solvent can have a Brix value exceeding 24, and in certain configurations a Brix value that exceeds 40 or more. The lower quality solvent extracted by the capture assembly 750 from the spent media will have less dissolved and entrained solids than the higher quality solvent that is extracted at extract port 740. In examples, it was determined that such lower quality extract may have a quality measure that may be less than about 5 Brix.

Capture assembly 750 may also be further adapted and or configured to discharge the solvent extracted from the spent media, and or to communicate, re-entrain, recycle, and or recirculate the extracted solvent via a recirculation conduit 755 (FIG. 15), back to the extract vessel or autoclave proximate to the solvent supply 735 and or media discharge port 710 and or to other parts of the apparatus and or systems of the disclosure. Capture assembly 750 may also be further configured to discharge the spent media utilizing various assemblies that may include a circularly or linearly actuatable capture assembly 760.

Figure 20:
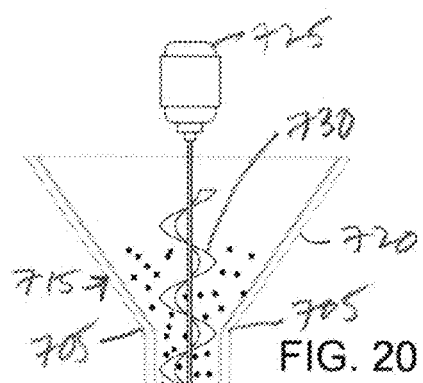
Figure 22:
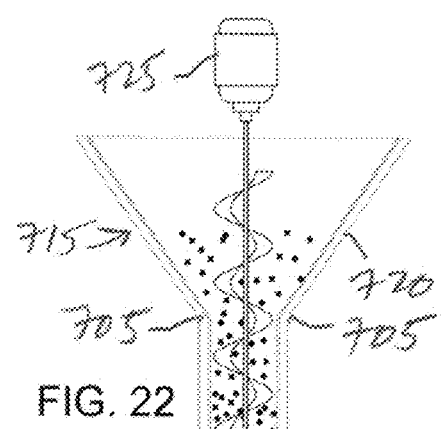
Figure 21:
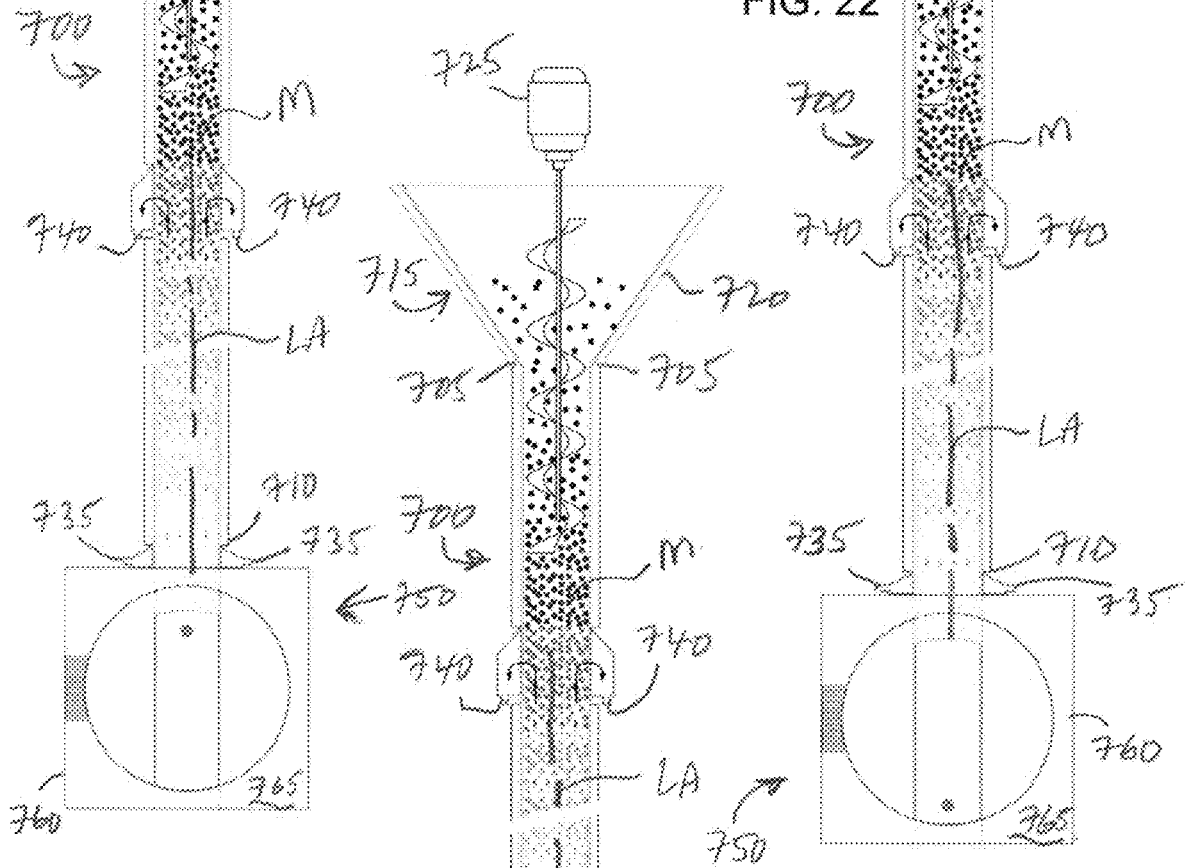
Figure 23:
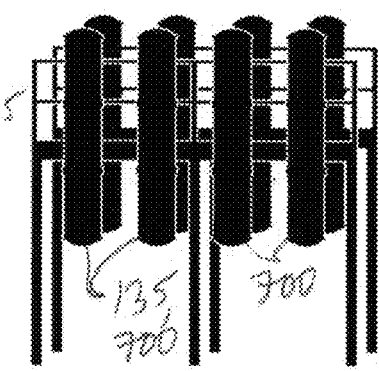
FIG. 23 is an elevated view illustration in modified scale of multiple extraction autoclaves, extractors, or vessels cooperatively arranged according to various aspects of the disclosure to operate independently, in series, in parallel, and in combinations thereof.
Figure 24:
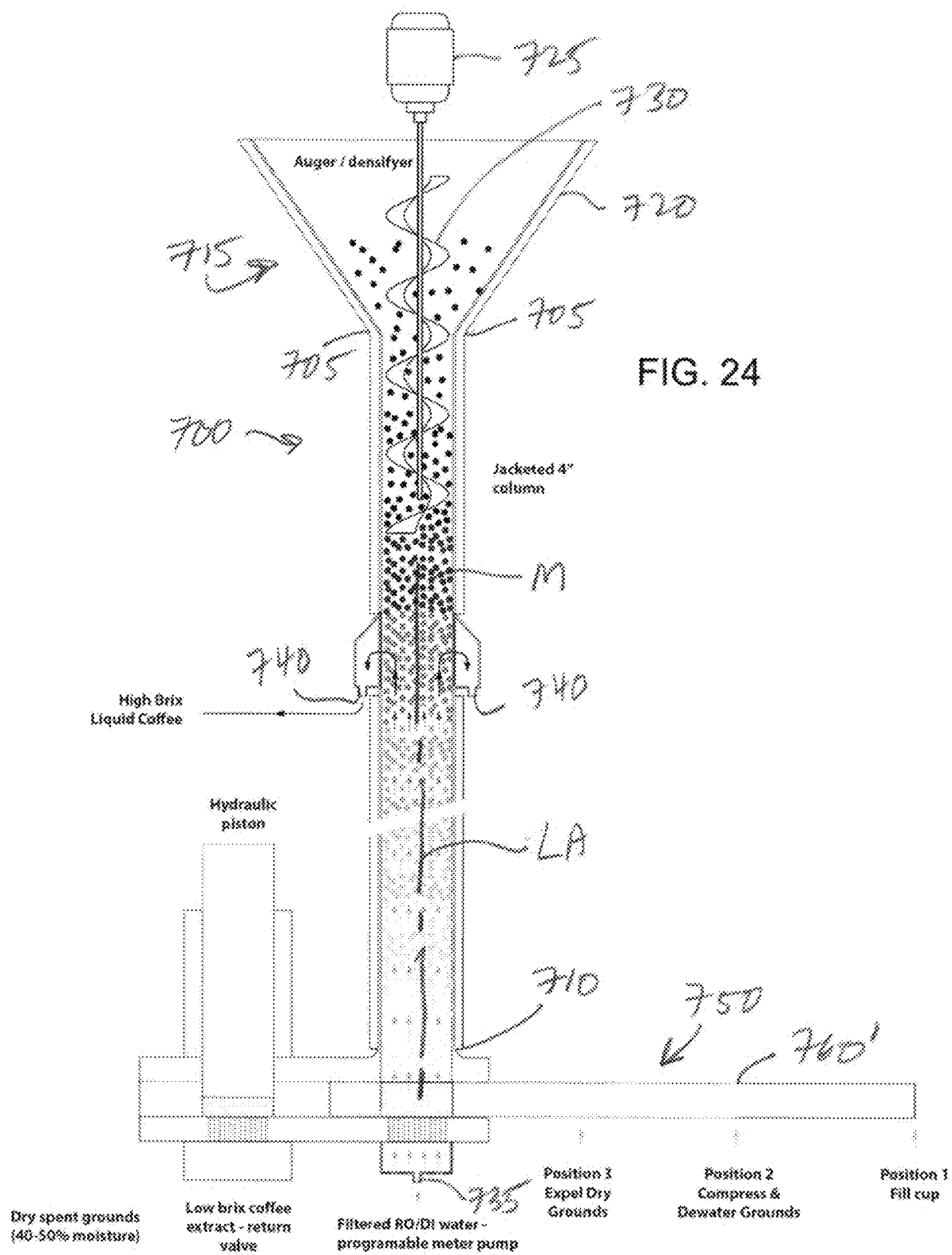

FIGS. 15, 16, 17, 18, and 19 depict variations of circularly operable capture assembly 760, while FIG. 24 depicts linearly operable capture assemblies 760'. FIGS. 20, 21, and 22 depict further modes operation. For example, circularly operable capture assembly 760 have cooperative components that include a keyway plate 765 (FIG. 16), a frame 770 defining a receiver 772 (FIG. 17), a rotating disc 775 (FIG. 18), and a piston 780 (FIG. 19) having a pin 782 that cooperates with keyway plate 765 when assembled together as in FIGS. 15 and 20 through 24.

During operation and rotation of circular capture assembly 760, disc 775 is received in receiver 772 of frame 770, and rotated by a motor (not shown) such that piston 780 (as received within a through lateral hole in disc 775) is articulated by movement of the attached pin 782 as it is guided through a predetermined pattern established by the keyway of plate 765. As piston 780 is articulated between the positions shown in FIGS. 15, and 20-24, spent media is captured from discharge port 710 (FIG. 20), is dewatered as piston 780 compresses the captured spent media (FIG. 21), and then the spent media is discharged (FIG. 22).

With continued reference to FIGS. 15-23, and now also to FIG. 24, the disclosure is directed to a linearly actuatable spent media capture assembly 760'. The disclosure is also directed to variations wherein the alternative autoclave, extractor, or vessel 700 further includes or incorporates any of the various other components described elsewhere herein, such a jacket assembly 210 (FIGS. 1, 2) that is configured to thermally control temperature of the moving media bed and flowing solvent.

The modified, alternative extractor, autoclave, and or vessel 700 may further include, for example without limitation, a gas and or pressure control assembly 295 (FIGS. 1, 2) that is coupled thereto, and which is configured to control at least one of vapor and gas pressure and content of the moving media bed and flowing solvent. In variations hereto, the gas/pressure control assembly 295 includes an inert gas supply, which is configured to communicate inert gas to an interior of the autoclave, extractor, or vessel 700. Other alternative modifications contemplate feed assembly 715, solvent supply 150, and inlet, discharge, and extract ports 705, 710, 740 being adjustable with valves or other components to cooperate together and to establish a periodically and or continuously moving media bed and solvent cross flow about the longitudinal axis, and to discharge spent media from the autoclave, extractor, or vessel 700.

With continued reference to FIGS. 15-24, and now also to FIGS. 25-59, further implementations are described that include additionally contemplated implementations of the autoclaves, extractors, or vessels and related components of the disclosure. With specific reference to FIGS. 25 through 32, it may be further understood that the disclosure is directed to an autoclaves, extractors, or vessels 800 that each define an interior that extends along longitudinal axis LA, between opposite media top inlet ports 805 and bottom discharge ports 810. A modified feed assembly 815 is also incorporated and coupled to the top inlet port 805, to supply media to the interior during operation.

Feed assembly 815 establishes a media bed that is movable about the longitudinal axis LA from the inlet port 805 at the top of the extractor, through the interior and to the discharge port 810 at the bottom of the extractor. Feed assembly 815 further includes many of the components already described, as reflected by use of identical reference numerals from earlier figures, including without limitation funnel 720, which may be offset from longitudinal axis LA with neck 722 as shown in the figures.

Here, feed assembly 815 further includes a reciprocating piston 820 having a sealing end 825, and being movable by actuator 830, and sized with a stroke length that is sufficient to introduce dry media into inlet port 805, and establish the moving media bed. In variations, piston 820 may include a mesh surface having interstices sized to enable piston 820 to move media into inlet and below, wherein the size permits media to pass through the interstices when the piston is retracted upwards during reciprocation as shown in the figures. In further variations, the extended stroke of piston 820 has a length about half the height of autoclave, extractor, or vessel 800, such that a single stroke of piston 820 moves about half of the media bed with each stroke. Other modifications contemplate solvent supply 150 intermittently being injected during various positions of operation as is annotated in the figures, and for example to be paused to enable movement of the media bed and capture of spent media.

In modifications, the autoclaves, extractors, or vessels 800 also include a modified spent media capture assembly 835 that incorporates a valve 840 having a spent media capture chamber 845, which is actuated by a valve actuator 850. As can be understood with reference to FIGS. 26 through 31, spent media capture assembly is actuatable between at least five positions. Cooperating with valve 840, as annotated further in the figures, a discharge piston assembly 855 actuates and receives spent media from capture chamber 845 of valve 840 as it rotates into the position of FIGS. 27 and 28. When valve 840 rotates again to a closed position of FIGS. 26 and 29 through 32, solvent supply 150 can again inject a cross-flow into the interior. In other variations, depending upon the selected arrangements of spent media capture assemblies 835, the piston 820 stroke may also be adjusted to reflect the length of a capture valve spent media capture chamber 845, such as that shown in FIGS. 25-32.

Concurrently, or thereafter, discharge piston assembly 855 may be actuated to compress the captured spent media to remove residual solvent or extract therefrom, which may be discarded, collected, and or re-entrained as described previously. Once the captured spent media is dewatered, discharge piston assembly 855 actuates downwardly to discharge the dewatered spent media as shown in FIG. 30 via exit ports 860.

Figures 25, 26:
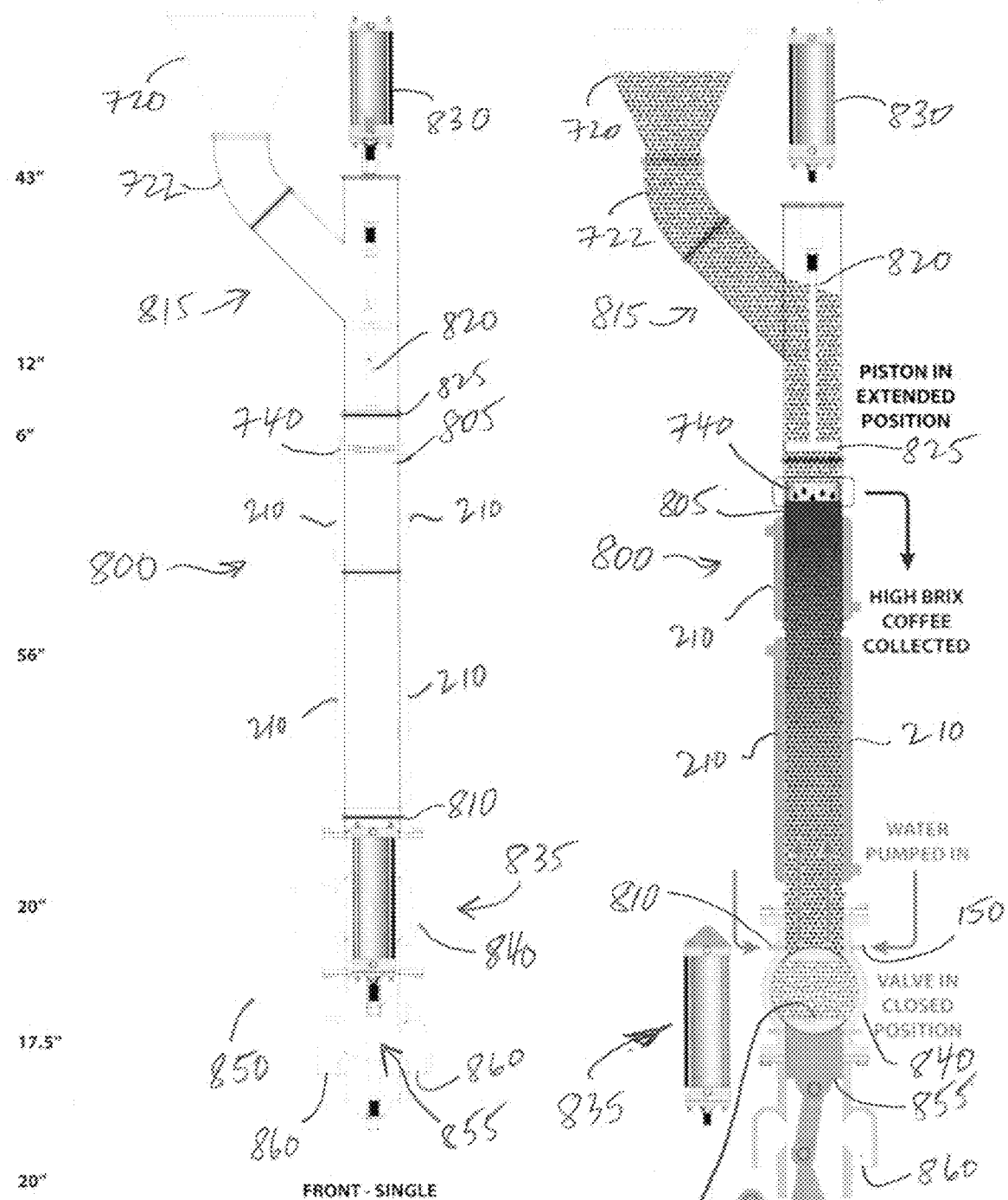
FIG. 25 is a schematic side-view representation in modified scale of further alternative configurations of the autoclaves, extractors, or vessels of the preceding figures and the disclosure, which now also contemplate further various arrangements of feed funnels or hoppers, actuators to enable movable media beds, and different spent-media capture, dewatering, and discharge assemblies, among many other features and capabilities.
FIGS. 26 through 32 illustrate the arrangements of FIG. 25 in cross-section and modified scale, and further describing various capabilities, components, and features of the autoclaves, extractors, or vessels of the disclosure and preceding figures, and reflecting various modes and positions of operation, as described further elsewhere herein.
Figure 27:
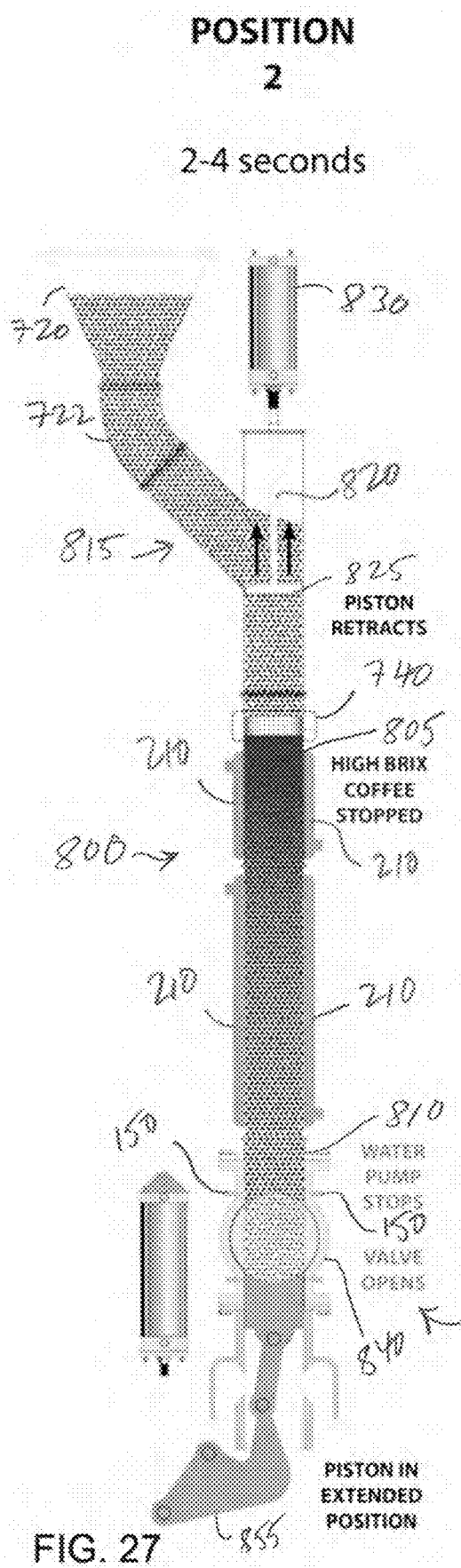
Figure 28:
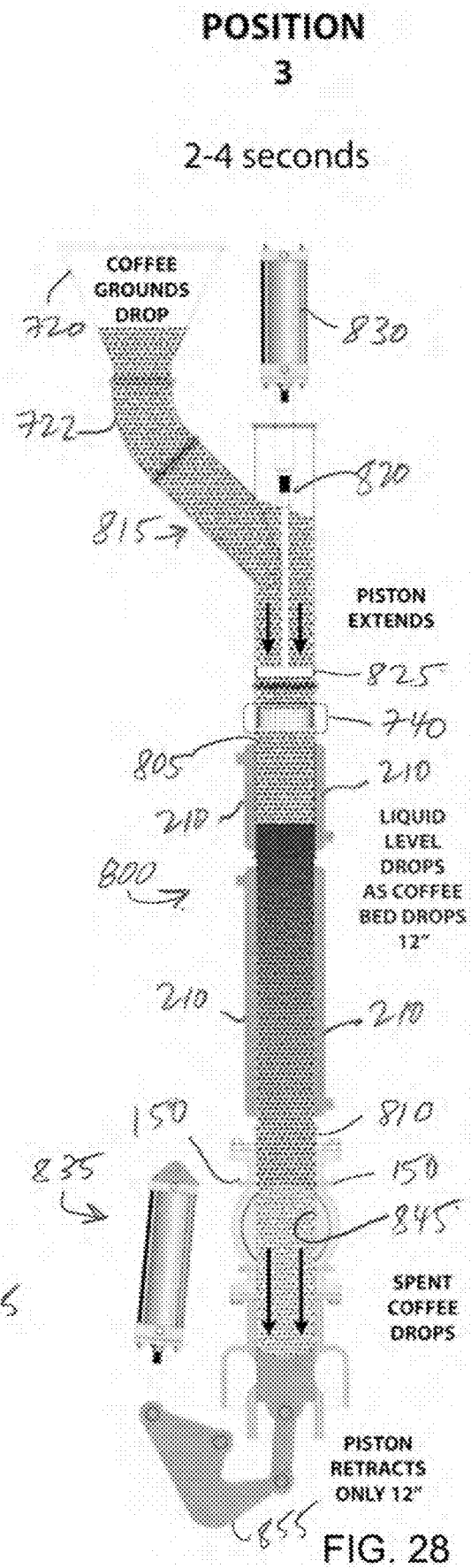
Figure 29:
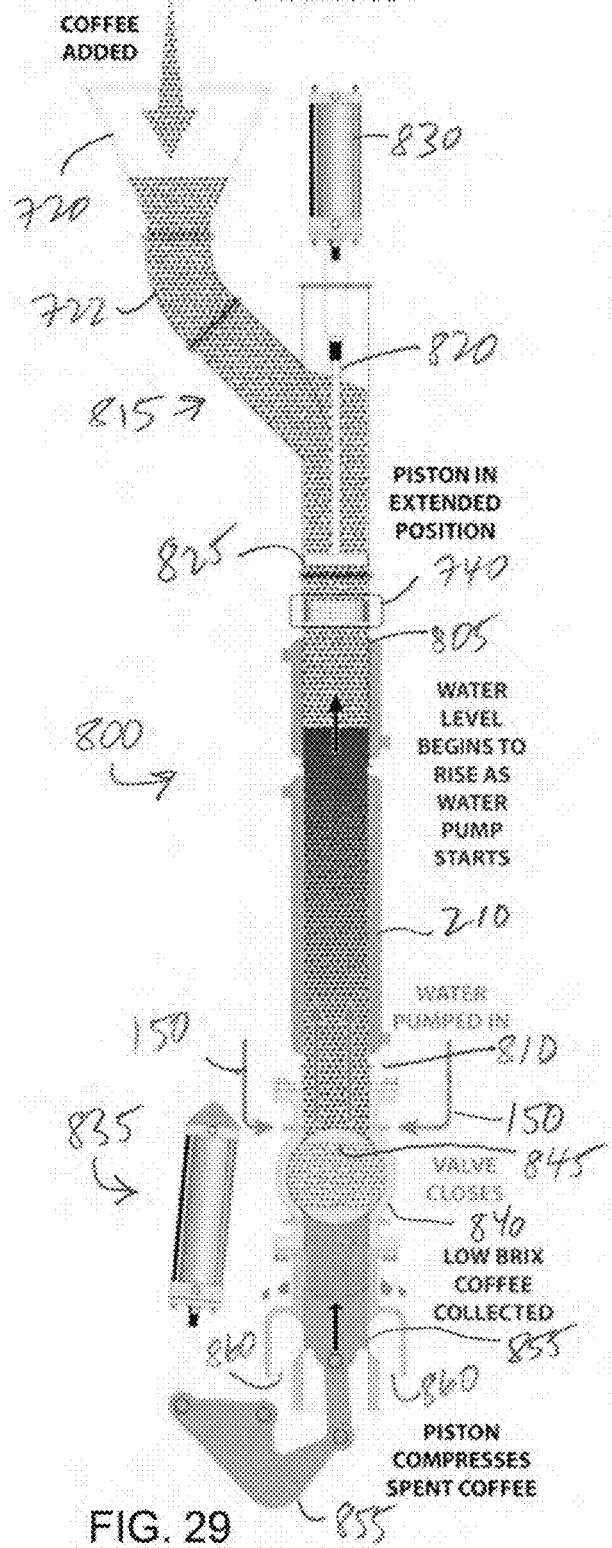

With these components in mind, it can be further understood from the first position of FIG. 26, that valve 840 is closed and while a solvent such as water is injected into the media bed while it is temporarily at rest. The second position of FIG. 27 reflects valve 840 being open to receive spent media in chamber 845, and the third position of FIG. 28 shows how the spent media is captured as the moving media moves downward from force exerted by piston 820. The fourth position of FIG. 29 illustrates valve 840 closed again, while discharge piston assembly 855 is actuated to dewater the captured spent media.

Figure 30:
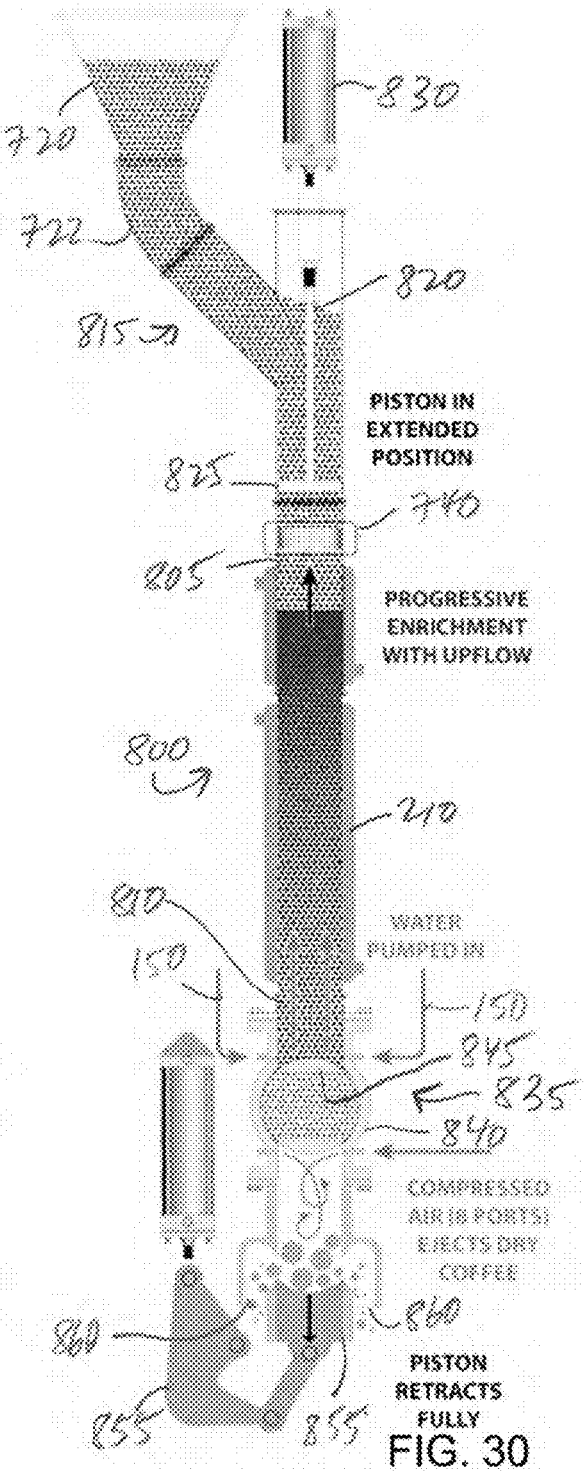
Figure 31:
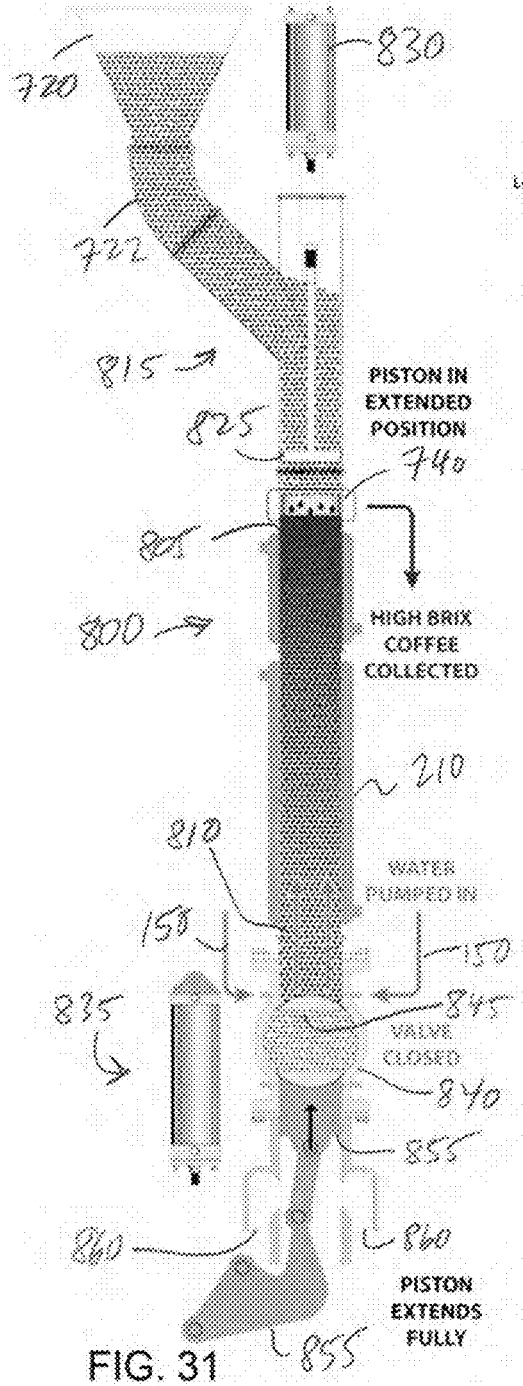
Figure 32:
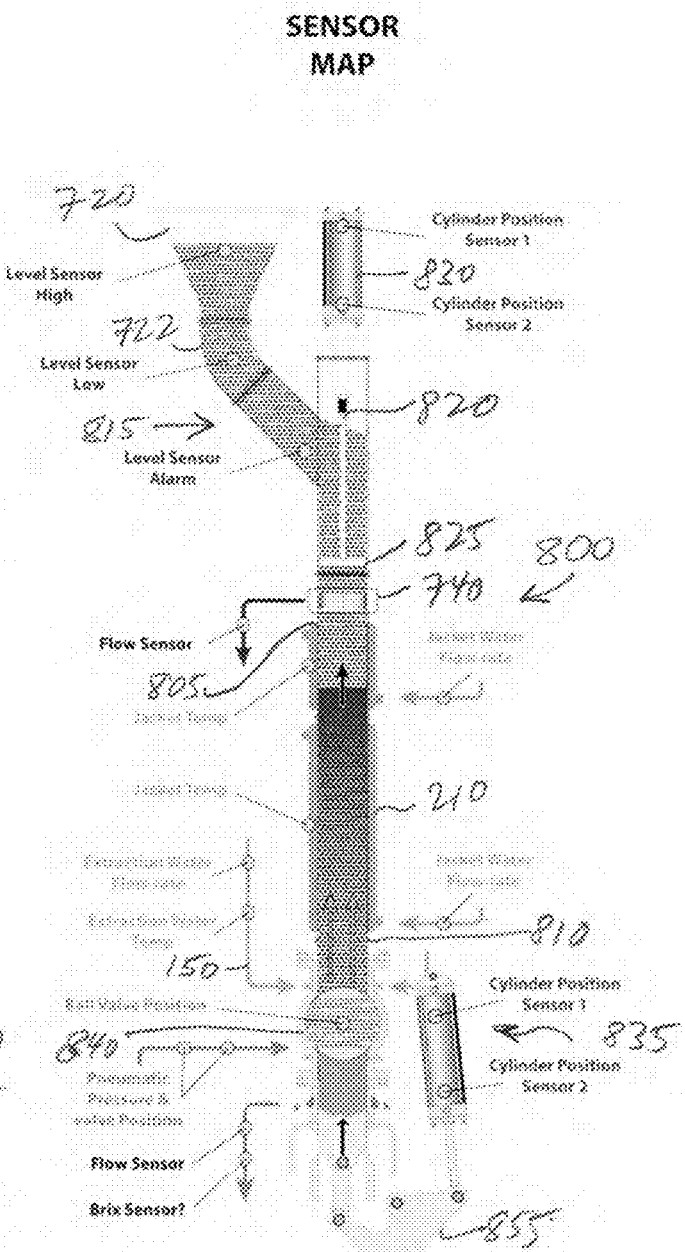

The fifth position of FIG. 30 reflects discharge of the dewatered and spent media through the exit port 860, which may be configured as a circumferential ring, but which is shown in cross-section for purposes of illustration. In further variations, any of the already sensors and fluid control valves described elsewhere herein may be incorporated as reflected in FIG. 32, for purposes of example and without limitation.

With continuing reference to the various figures, and now also to FIGS. 33 through 45, further variations contemplated by the disclosure can be incorporated using any of the arrangements and variations described herein. For further illustrative examples, FIGS. 33 through 45 are directed to arrangements of single and dual operation autoclaves, extractors, or vessels 900, 900', 900". In dual operation arrangements, autoclaves or extractors 900' can be paired with and mirrored by assemblies 900", as reflected in FIGS. 37 through 41. In these additionally modified autoclaves, extractors, or vessels 900, 900', 900", variations of spent media capture assemblies 905 are illustrated. In these figures, identical reference numerals used in preceding figures are incorporated and annotated.

The modified spent media capture assembly 905 further incorporates rotatable valve and piston assembly 910, which is actuatable between at least four positions as reflected, respectively, in the single autoclave/extractor 900 arrangements of FIGS. 33, 34, 35, and 36. In these modified spent media capture assemblies 905, a linearly actuatable piston assembly 910 is captured in a recess defined within a rotatable frame 920.

Figures 33, 34:
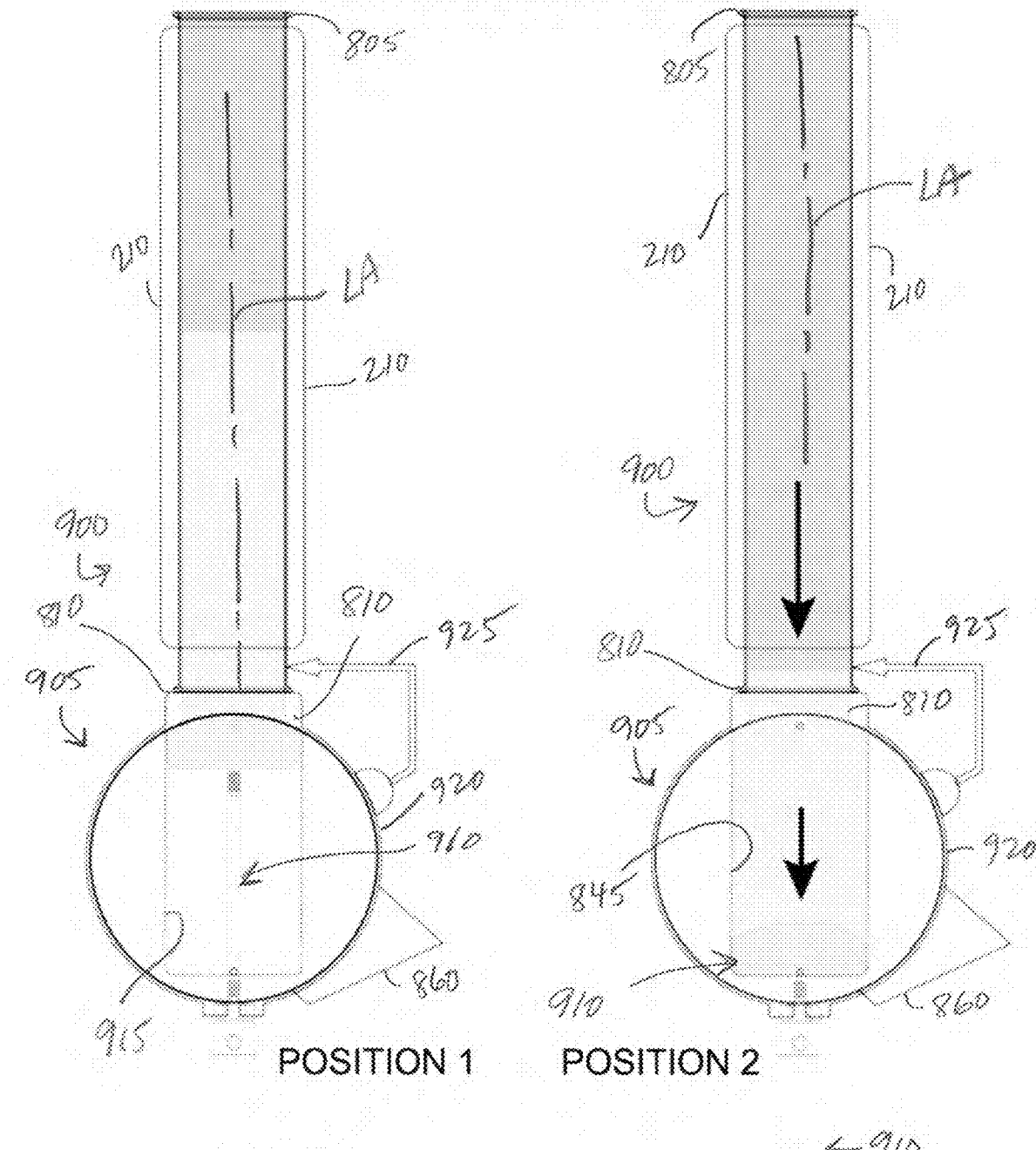

In the first position of FIG. 33, piston assembly 910 is fully extended to an edge of recess 915, and is in contact with the bottom discharge port 810 and a portion of the superior media bed. In the second position of FIG. 34, the piston assembly 910 has been fully retracted, while the media bed is moved downward from above. FIG. 35 reflects a third positon wherein the piston assembly is actuated to compress and dewater the captured spent media, which enables discharge, collection, and or recirculation of residual solvent or extract via a recirculation conduit 925 that may be in fluid communication with the interior of the autoclave/extractor 900, proximate the bottom discharge port 810.

With continuing references to the preceding figures, and reference now also to FIGS. 37 through 41, further arrangements are contemplated by the disclosure. Here, the above-described dual autoclave/extractor 900', 900" arrangements incorporate a further modified spent media capture assembly 930, which includes a rotationally actuatable piston assembly 935 with a slidable piston 940, and which may be driven by a single actuator or motor (not shown) and or a linear actuator 945. This modified assembly 935 may in part be combined with and incorporate the keyway arrangements of FIGS. 15 through 19, to enable rotation between various positions.

In a first position as reflected in FIG. 37, piston 940 begins movement along the path of the annotated arrow away from discharge port 810, to receive spent media from extractor 900', and to begin discharge of spent media previously captured from extractor 900". As reflected in FIG. 38, a second position reflects the ejection from spent media capture chamber 845 of spent media via exit port 860 about one side of piston 940, while spent media from autoclave/extractor 900 is received in spent media capture chamber 845. In FIG. 39 a third positon is depicted wherein spent media capture chamber 845 is received with spent media from extractor 900, which in FIG. 40 is prepared to be discharged from exit port 860. FIG. 41 reflects continued actuation of piston 940 to discharge the spent media in capture chamber 845.

Figure 42:
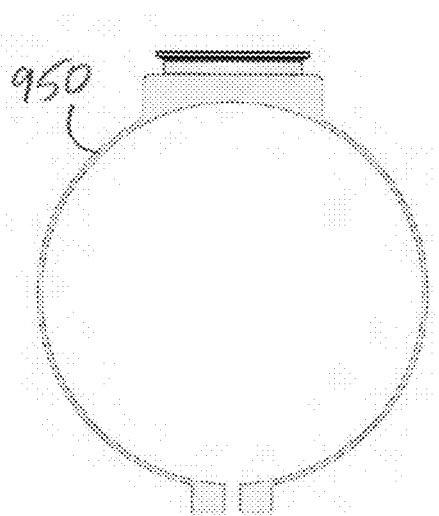
FIG. 42 highlights a front view in enlarged scale of aspects of a component of spent-media capture assembly arrangements of FIGS. 37 through 42.
Figure 43:
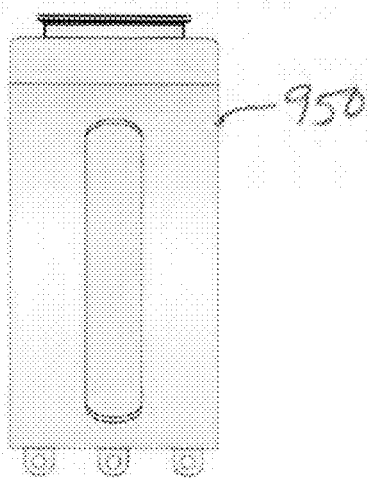
FIG. 43 is a rotated side view of the component of FIG. 43 showing an interior recess thereof.
Figure 44:
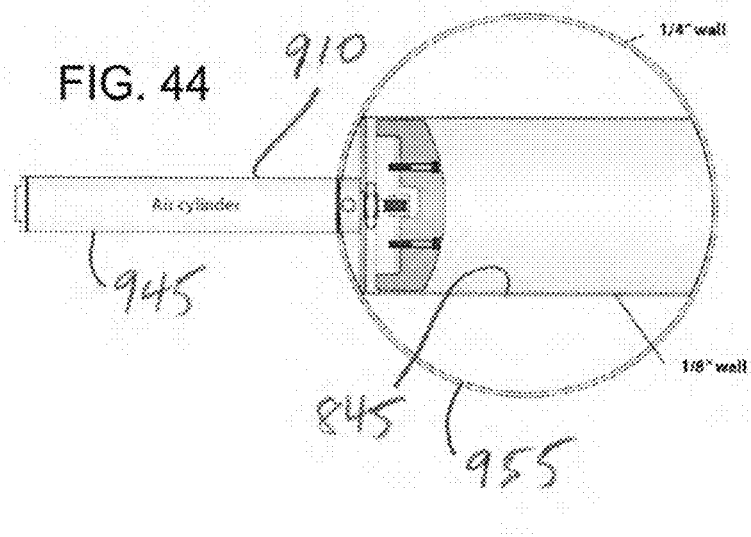
FIG. 44 shows a different front view of the component of FIG. 42 with certain features removed for purposes of illustration, and received with various additional components for further illustration.
Figure 45:
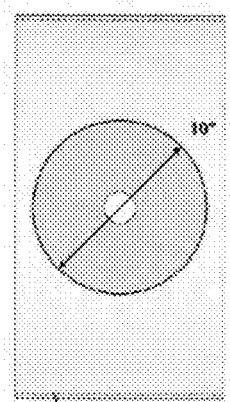
FIG. 45 describes a different side view of the components of FIG. 44 for purposes of describing further features and elements thereof.
Figure 46:
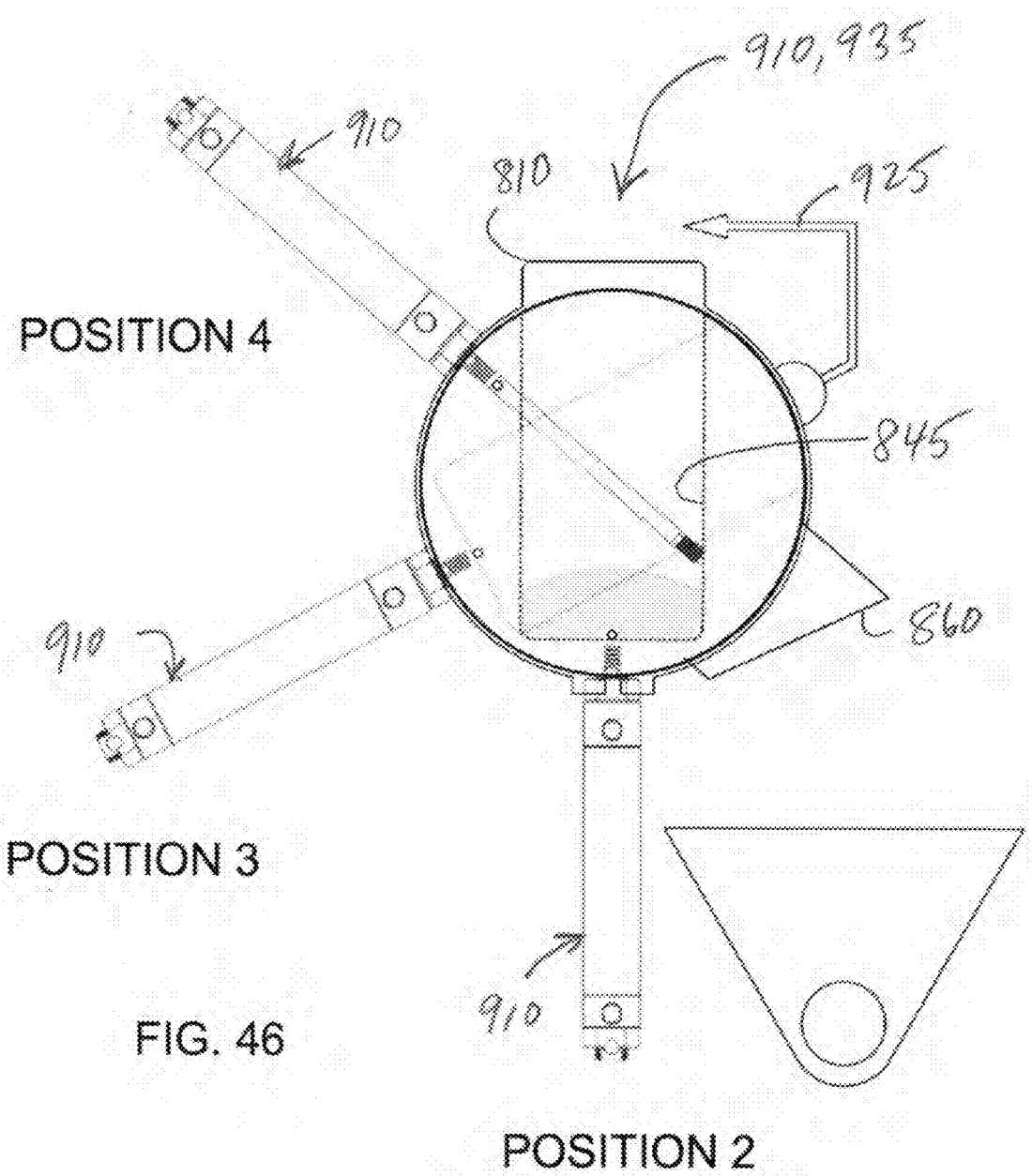
FIG. 46 is directed to a schematic front view in modified scale of components and elements of FIGS. 37 through 46, with certain elements removed and added for further illustration purposes and depicting various modes and positions of operation thereof.

FIGS. 42 through 46 further illustrate components and capabilities of the previously described spent media capture assemblies 835, 905, with various components removed for illustration purposes. FIG. 42 depicts a front view while FIG. 43 shows a side view of a frame 950 that enables the rotational capabilities described elsewhere herein and in FIGS. 33 through 41. FIGS. 44 and 45 reflect respective front and side views of a rotatable disc 955 that can be received within frame 950, and which defines the spent media capture chamber 845, and which is received with linearly actuatable piston assembly 910 in a fully retracted position. FIG. 46 depicts various positions of these components, which positions correspond generally with those described in connection with FIGS. 33 through 36, and in part and with respect to other aspects of FIGS. 37 to 41.

Figure 47:
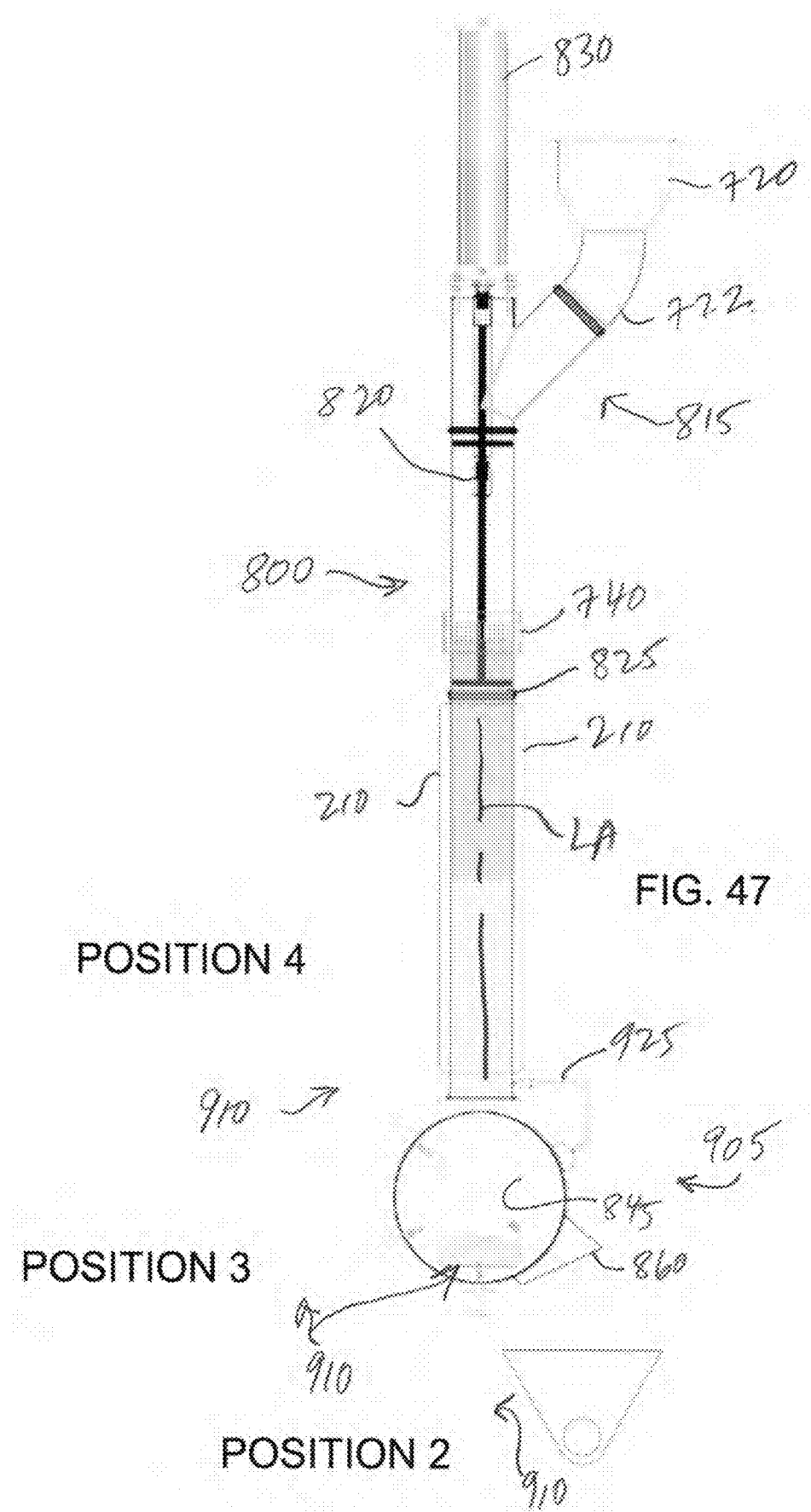
FIG. 47 includes a schematic cross-section view rotated and in modified scale of aspects, components, and elements of the autoclaves, extractors, and vessels of FIGS. 25 through 46, with certain structure removed and added to illustrate further various modes and positions of operation thereof.
Figure 48:
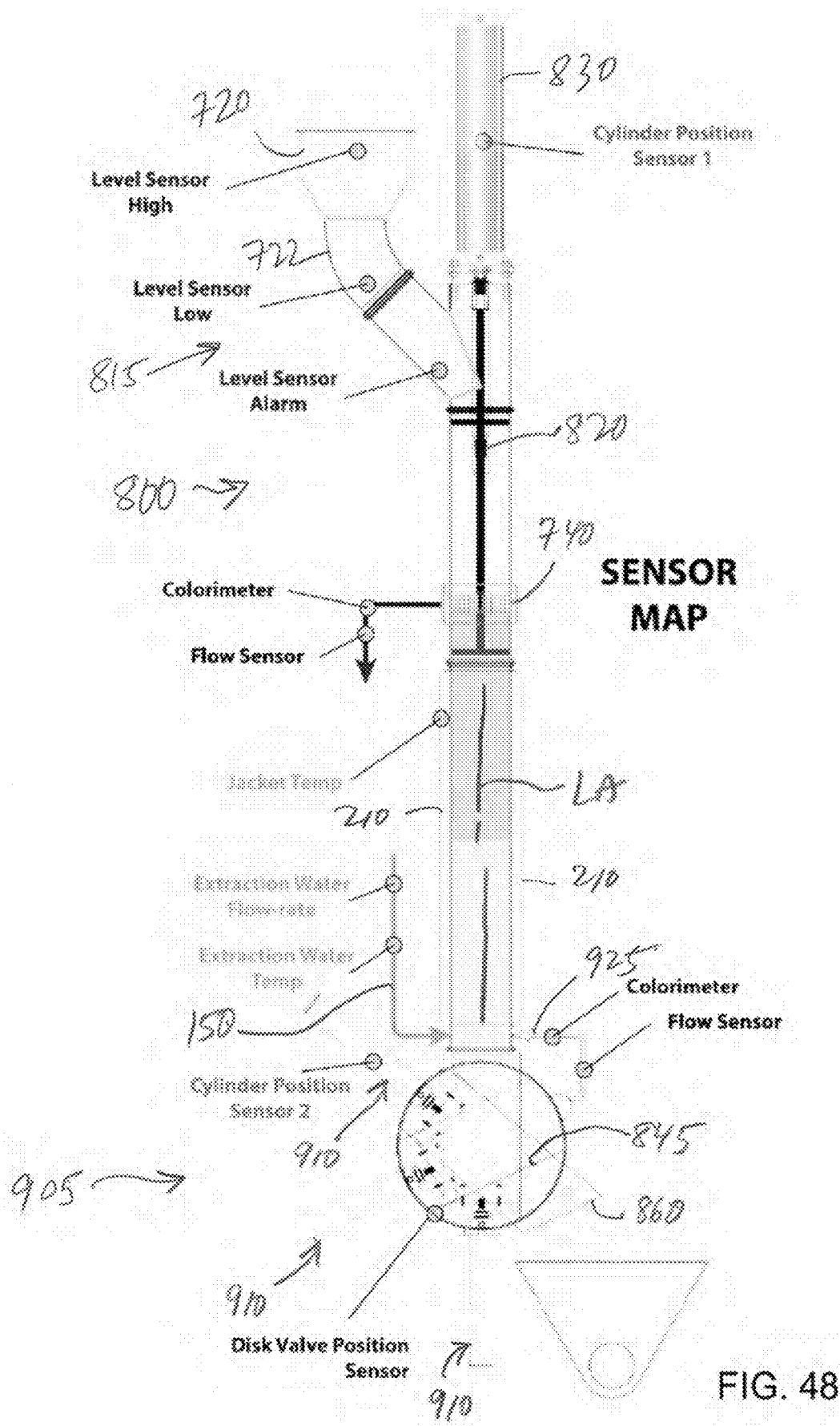
FIG. 48 reflects another schematic cross-section view of FIG. 48 with some elements removed and others added for purposes of further illustration of other aspects of the disclosure.
Figures 49, 50:
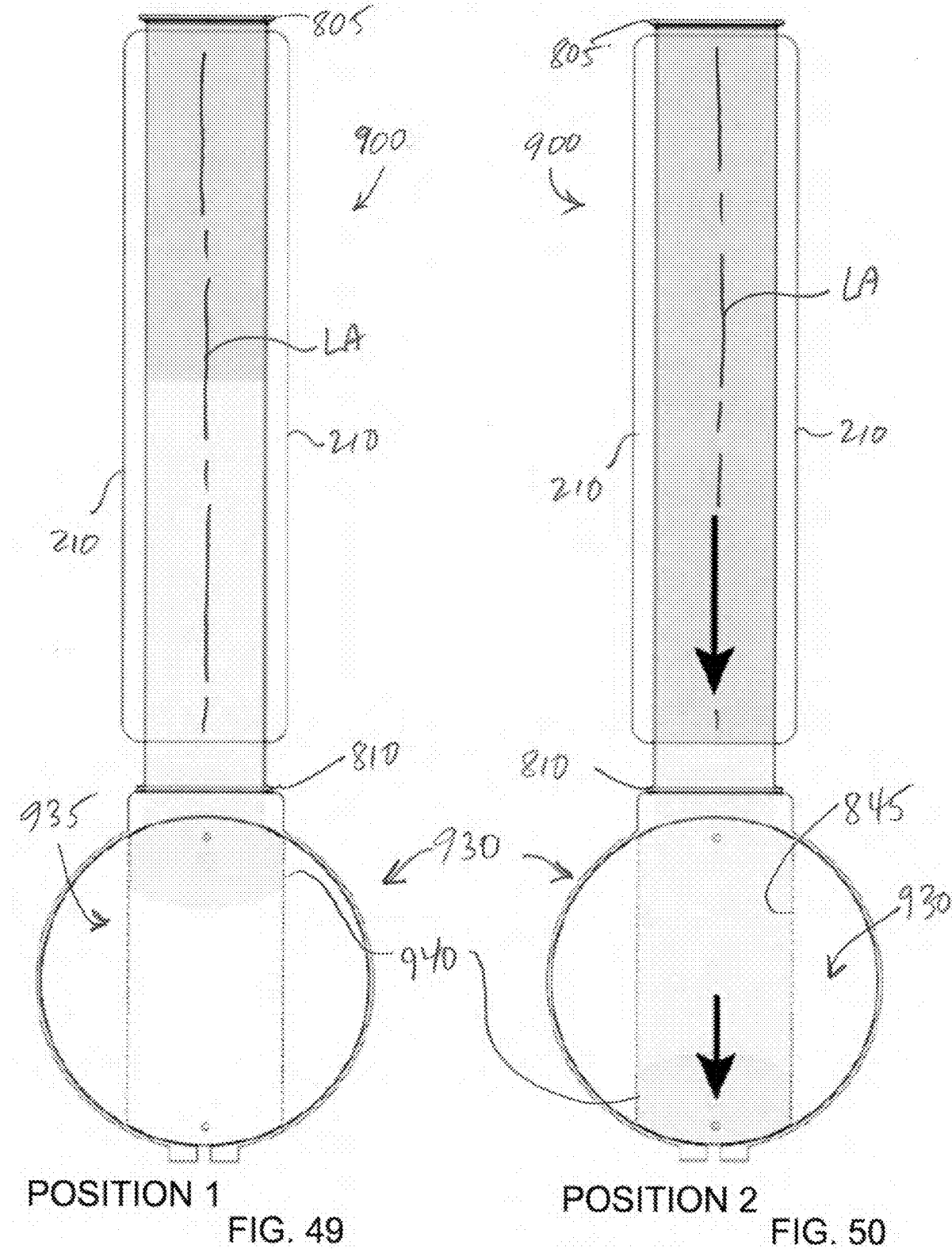
Figure 53:
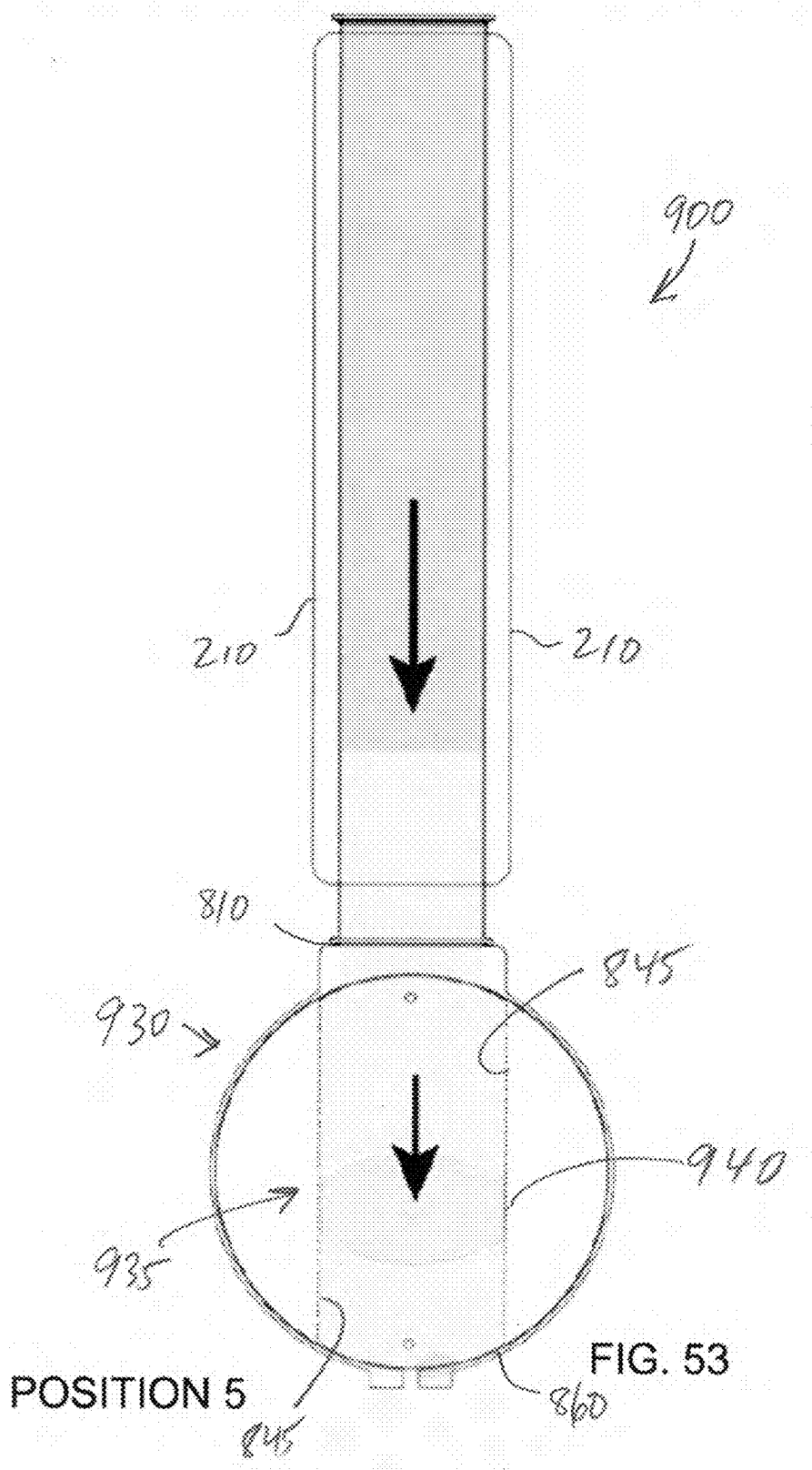

With reference now also to FIGS. 47 and 48, additionally contemplated modifications are described that include modified autoclaves, extractors, or vessels and components thereof, which incorporate various features in different arrangements and in new combinations. As with preceding examples, identical reference numerals are used herein to reflect components and features described elsewhere herein. For example, FIGS. 47 and 48 depict extractors/autoclaves 800 (FIGS. 25 through 32) and include many of the components and capabilities of extractors/autoclaves 800. However, spent media capture assemblies 905 are utilized herein to establish another exemplary implementation.

The disclosure is also directed further modifications of any of the various implementations herein, and with reference to FIGS. 49 through 53, it may be understood that the autoclaves, extractors, or vessels and components thereof already described may be further modified to establish additionally exemplary arrangements. In FIGS. 49 through 53, any of the other adaptations herein may incorporate spent media capture assembly 930 and rotatably actuatable piston assembly 935, as described elsewhere herein in connection with FIGS. 37 through 45. Here, for added examples, autoclaves, extractors, or vessels 900 may be modified and combined with rotatably actuatable piston assembly 935 to enable capabilities similar to those of dual extractors/autoclaves 900', 900" described in connection with FIGS. 37 through 41. As with preceding examples, positions one through five are reflected in the figures and correspond to the positions described in connection with FIGS. 37 through 41.

FIGS. 54 through 59 illustrate additionally contemplated implementations that combine any of the autoclaves, extractors, or vessels 900 and components thereof, as described elsewhere herein, with variations of a spent media capture assembly. In these variations, spent media capture assembly 960 is depicted in various operational positions. Capture assembly 960 is linearly actuated with cylinders 970 or other actuators (not shown), and receives and biases a piston 965 within sidewalls 975.

As the media bed is continuously and or periodically moved through the interior about longitudinal axis LA of autoclaves/extractors 900, as depicted in FIGS. 54 and 55 (respectively corresponding to first and second positions), biased piston 965 is urged downward relative to sidewalls 975 and by action of the superior moving media bed. As piston 965 moves downward, a spent media capture chamber 980 is established within capture assembly 960 and sidewalls 975. As the movable media bed continues to move downward, cylinders 970 are linearly actuated to urge and extend sidewalls 975 downward out of capture assembly 960, as illustrated in FIGS. 56 and 57 (respectively corresponding to third and fourth positions).

As actuation proceeds, spent media is forced into and received within spent media capture chamber 980 as depicted in FIGS. 55, 56, and 57. Thereafter, capture assembly 960 is actuated as shown in FIG. 58 to move into a fifth position to compress the spent media for dewatering, which can be discharged, collected, and or recirculated via conduit 925 (FIG. 58). Simultaneously, capture assembly 960 actuates and urges piston 965 upward against the superior media bed. As next illustrated in FIG. 59, while piston 965 continues upward towards its original position of FIG. 54, cylinders 970 linearly actuate sidewalls 975 to extend further to enable spent media to be ejected and discharged to exit port 860. Here, an air or fluid supply may be coupled in fluid communication with spent media capture chamber to inject high pressure air or fluid into spent media capture chamber 980 to facilitate discharge of spent media through exit ports 860.

In further variations of any of the extractors, autoclaves, vessels 135, 630, 700, 800, 900, 900', 900", and with continuing reference to the various figures, one or more and various types of circumscribing jacket assemblies 210 may be incorporated and coupled to, carried from, positioned within, and or included about the extractors/autoclaves 135, 630, 700, 800, 900, 900', 900". As described in part elsewhere herein, jacket assemblies 210 may further incorporate adjustable thermal elements that during operation control temperature of the movable media bed and flowing solvent within the extractors/autoclaves/vessels. In other exemplary arrangements, the jacket assemblies extend around the interior and or exterior circumference of the extractors/autoclaves. The thermal elements may be heated and cooled with fluids such as water and or gases, and or may include electrically controlled thermal heating and cooling elements.

These example configurations also are directed to the extractors/autoclaves further including circumscribing jacket assembly 210 incorporating a plurality of injection ports, which are in communication with the interior of the extractors/autoclaves, and which are arranged circumferentially about the interior and or exterior thereof, to inject into the interior, during operation, one or more gases and or liquids that may be thermally controlled and or pressurized or otherwise include additives.

The features and elements of the extractors/autoclaves 135, 630, 700, 800, 900, 900', 900" contemplated by the disclosure may also be coupled to other devices and systems. These may include for added examples, fluid (gas or liquid phase) pressure control assembly 295 (see, e.g., FIGS. 1 and 2) that may be coupled to and or in communication with the interior of the autoclaves/extractors, and which has one or more pressure and or vacuum ports positioned thereabout such that, during operation, the gas pressure and or vacuum of these ports control at least one of vapor and gas pressure, and vapor and gas composition, of the movable media bed and cross flowing solvent. In alternative adaptations, fluid pressure control assembly 295 may optionally also include an inert gas supply in communication with the ports and or interior (FIGS. 1 and 2).

The extractors/autoclaves 135, 630, 700, 800, 900, 900', 900" described herein also may incorporate the media feed assemblies 715, 815 in additional arrangements, all of which will have a hopper 720 sized to receive the media and, during operation, to supply the media by a conduit to the inlet ports such as 705, 805. In further variations, feed assemblies 715, 815 may also include an actuatable media movers 730, 820 having respective sealing ends 745, 825, which may be replaced with components other than the contemplated spiral screw or reciprocating piston. Feed assemblies 715, 815 implement the media movers 730, 820 to periodically and or continuously establish and or form a pressurized seal against the inlet ports 705, 805 to resist solvent flow into the respective feed assemblies 715, 815 and beyond the pressurized seal.

Still more variations are possible according to the disclosure, and may also include the extract ports 740 formed as a circumscribing collar having integrated extraction ports arranged around the autoclaves/extractors 135, 630, 700, 800, 900, 900', 900", which integrated extraction ports are coupled in fluid communication with the interior and the movable or moving media bed. During operation, this implementation enables distributed extraction of the cross-flowed solvent from the movable media bed about the circumference of the extractors/autoclaves.

Similarly, in other arrangements, the disclosure is directed to the solvent supply 150 formed as a circumferential collar surrounding an interior and or exterior circumference of a portion of the autoclaves/extractors, and incorporating supply ports that are arranged to surround the circumference of autoclaves/extractors, with the supply ports coupled in fluid communication with the interior and the moving media bed to enable, during operation, distributed injection of the solvent.

While exemplary embodiments are described above, it is not intended that these embodiments describe all possible forms, combinations, and implementations of the disclosure and apparatus and system 100. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An extractor apparatus, comprising:
    an autoclave defining an interior extending along a longitudinal axis between opposite media inlet and discharge ports;
    a feed assembly coupled to the inlet port to supply media during operation to the interior establishing a media bed movable about the longitudinal axis through the interior to the discharge port;
    the feed assembly including a sealing end that establishes a pressurized seal against the inlet port during operation to resist solvent flow into the feed assembly beyond the sealing end;
    the feed assembly including a reciprocating piston sized to establish the sealing end about a distal portion during operation when the piston is extended into the inlet port, and arranged to actuate to at least one of: supply, mix, compact, and move the movable media bed to the inlet port;
    a solvent supply coupled to the autoclave proximate the discharge port to establish during operation pressurized solvent cross flow directionally opposite the movable bed; and
    an extract port coupled to the autoclave proximate the inlet port to extract cross-flowed solvent from the movable media bed during operation.

2. The extractor apparatus according to claim 1, comprising:
    the feed assembly including a variable speed screw with an approximate spiral profile arranged to establish a seal about the inlet port, and to operate to at least one of: supply, compact, mix, and move the media bed into the inlet port.

3. The extractor apparatus according to claim 1, comprising:
    a capture assembly sealingly coupled to the discharge port and to capture, during operation, spent media and to extract residual solvent therefrom, and movable to discharge the spent media.

4. The extractor apparatus according to claim 1, comprising:
    a capture assembly sealingly coupled to the discharge port and to capture, during operation, spent media and to extract residual solvent therefrom, and coupled to the autoclave to communicate the extracted residual solvent to the interior between the inlet and discharge ports, and movable to discharge the spent media.

5. The extractor apparatus according to claim 1, comprising:
    a capture assembly sealingly coupled to the discharge port to capture spent media, during operation, and to remove residual extract from the spent media before discharge, and movable to discharge the spent media.

6. The extractor apparatus according to claim 1, comprising:
    the autoclave including a circumscribing jacket assembly having adjustable thermal elements that during operation control temperature of the movable media bed and flowing solvent.

7. The extractor apparatus according to claim 1, comprising:
    the autoclave including a circumscribing jacket assembly having a plurality of injection ports in communication with the interior and arranged about the autoclave to inject into the interior, during operation, at least one of a liquid, a gas, a thermally controlled liquid, a thermally controlled gas, a pressurized gas, and a pressurized liquid.

8. The extractor apparatus according to claim 1, comprising:
    a fluid pressure control assembly in communication with the interior and having one or more pressure and vacuum ports positioned about the autoclave that during operation control at least one of vapor and gas pressure and vapor and gas composition, of the movable media bed and cross flowing solvent.

9. The extractor apparatus according to claim 8, comprising:
    the fluid pressure control assembly including an inert gas supply in communication with the pressure and vacuum ports.

10. The extractor apparatus according to claim 1, comprising:
    the feed assembly having a hopper sized to receive the media and during operation supply the media by a conduit to the inlet port; and
    the feed assembly including an actuatable media mover having a sealing end, the media mover during operation establishing a pressurized seal against the inlet port to resist solvent flow into the feed assembly.

11. The extractor apparatus according to claim 1, comprising:
    the extract port formed as a circumscribing collar having extraction ports arranged around the autoclave and in communication with the interior to enable distributed extraction of the cross-flowed solvent from the movable media bed during operation.

12. The extractor apparatus according to claim 1, comprising:
    the solvent supply formed as a circumferential collar having supply ports arranged around the autoclave and in communication with the interior to enable distributed injection of the solvent into the movable media bed during operation.

13. An extractor apparatus, comprising:
    an autoclave defining an interior extending along a longitudinal axis between opposite media inlet and discharge ports;
    a feed assembly coupled to the inlet port to supply media during operation to the interior establishing a media bed movable about the longitudinal axis through the interior to the discharge port;
    the feed assembly including a sealing end that establishes a pressurized seal against the inlet port during operation to resist solvent flow into the feed assembly beyond the sealing end;
    the feed assembly including a reciprocating piston sized to establish the sealing end about a distal portion during operation when the piston is extended into the inlet port, and arranged to actuate to at least one of: supply, mix, compact, and move the movable media bed to the inlet port;

a solvent supply coupled to the autoclave proximate the discharge port to establish during operation pressurized solvent cross flow directionally opposite the movable bed;

an extract port coupled to the autoclave proximate the inlet port to extract cross-flowed solvent from the movable media bed during operation; and a capture assembly sealingly coupled to the discharge port and to capture, during operation, spent media, and movable to discharge the spent media.

14. The extractor apparatus according to claim 13, comprising:

the capture assembly further arranged to extract residual solvent from the spent media.

15. The extractor apparatus according to claim 14, comprising:

the capture assembly further coupled to the autoclave to communicate the extracted residual solvent to the interior between the inlet and discharge ports.

16. An extractor apparatus, comprising:

an autoclave defining an interior extending along a longitudinal axis between opposite media inlet and discharge ports;

a feed assembly coupled to the inlet port to supply media during operation to the interior establishing a media bed movable about the longitudinal axis through the interior to the discharge port;

the feed assembly including a sealing end that establishes a pressurized seal against the inlet port during operation to resist solvent flow into the feed assembly beyond the sealing end;

the feed assembly including a reciprocating piston sized to establish the sealing end about a distal portion during operation when the piston is extended into the inlet port, and arranged to actuate to at least one of: supply, mix, compact, and move the movable media bed to the inlet port;

a solvent supply coupled to the autoclave proximate the discharge port to establish during operation pressurized solvent cross flow directionally opposite the movable bed;

an extract port coupled to the autoclave proximate the inlet port to extract cross-flowed solvent from the movable media bed during operation; and a capture assembly sealingly coupled to the discharge port and to capture, during operation, spent media and to extract residual solvent therefrom, and coupled to the autoclave to communicate the extracted residual solvent to the interior between the inlet and discharge ports, and movable to discharge the spent media.

17. The extractor apparatus according to claim 16, comprising:

the extract port formed as a circumscribing collar having extraction ports arranged around the autoclave and in communication with the interior to enable distributed extraction of the cross-flowed solvent from the movable media bed during operation.

18. The extractor apparatus according to claim 16, comprising:

the solvent supply formed as a circumferential collar having supply ports arranged around the autoclave and in communication with the interior to enable distributed injection of the solvent into the movable media bed during operation.

* * * * *